United States Patent [19]

Kazami et al.

[11] Patent Number: 5,559,568
[45] Date of Patent: Sep. 24, 1996

[54] INFORMATION RECORDING/REPRODUCTION APPARATUS FOR CAMERA

[75] Inventors: Kazyuki Kazami, Tokyo; Koichi Daitoku, Sagamihara; Tsutomu Wakabayashi, Tokyo; Tetsuro Goto, Funabashi; Akira Ezawa; Naoki Tomino, both of Tokyo, all of Japan

[73] Assignee: Nikon Corporation, Tokyo, Japan

[21] Appl. No.: 561,585

[22] Filed: Nov. 21, 1995

Related U.S. Application Data

[63] Continuation of Ser. No. 457,803, Jun. 1, 1995, abandoned, which is a continuation of Ser. No. 307,095, Sep. 16, 1994, abandoned, which is a continuation of Ser. No. 32,177, Mar. 15, 1993, abandoned, which is a continuation of Ser. No. 905,209, Jun. 26, 1992, abandoned, which is a continuation of Ser. No. 785,164, Oct. 31, 1991, abandoned, which is a continuation of Ser. No. 624,993, Dec. 10, 1990, abandoned.

[30] Foreign Application Priority Data

| Dec. 12, 1989 | [JP] | Japan | 1-322097 |
| Dec. 28, 1989 | [JP] | Japan | 1-338349 |
| Dec. 29, 1989 | [JP] | Japan | 1-341369 |
| Feb. 28, 1990 | [JP] | Japan | 2-45792 |

[51] Int. Cl.$^6$ ............................ G03B 17/24
[52] U.S. Cl. .................................... 354/106
[58] Field of Search .................. 354/75, 76, 105, 354/106

[56] References Cited

U.S. PATENT DOCUMENTS

| 4,832,275 | 5/1989 | Robertson | 242/71.1 |
| 4,834,306 | 5/1989 | Robertson et al. | 242/71.1 |
| 4,864,332 | 9/1989 | Harvey | 354/21 |
| 4,933,780 | 6/1990 | Wash et al. | 358/909 |
| 4,996,546 | 2/1991 | Pagano et al. | 354/76 |
| 5,272,498 | 12/1993 | Wakabayashi | 354/105 |

FOREIGN PATENT DOCUMENTS

58-67329  5/1983  Japan.

Primary Examiner—David M. Gray
Attorney, Agent, or Firm—Shapiro and Shapiro

[57] ABSTRACT

An information recording/reproduction apparatus for a camera includes a magnetic reading unit which can contact a magnetic recording medium arranged in advance on a film, and a drive control unit for, when the magnetic reading unit reaches a predetermined position with respect to the film, bringing the magnetic reading unit into contact with the magnetic recording medium.

61 Claims, 34 Drawing Sheets

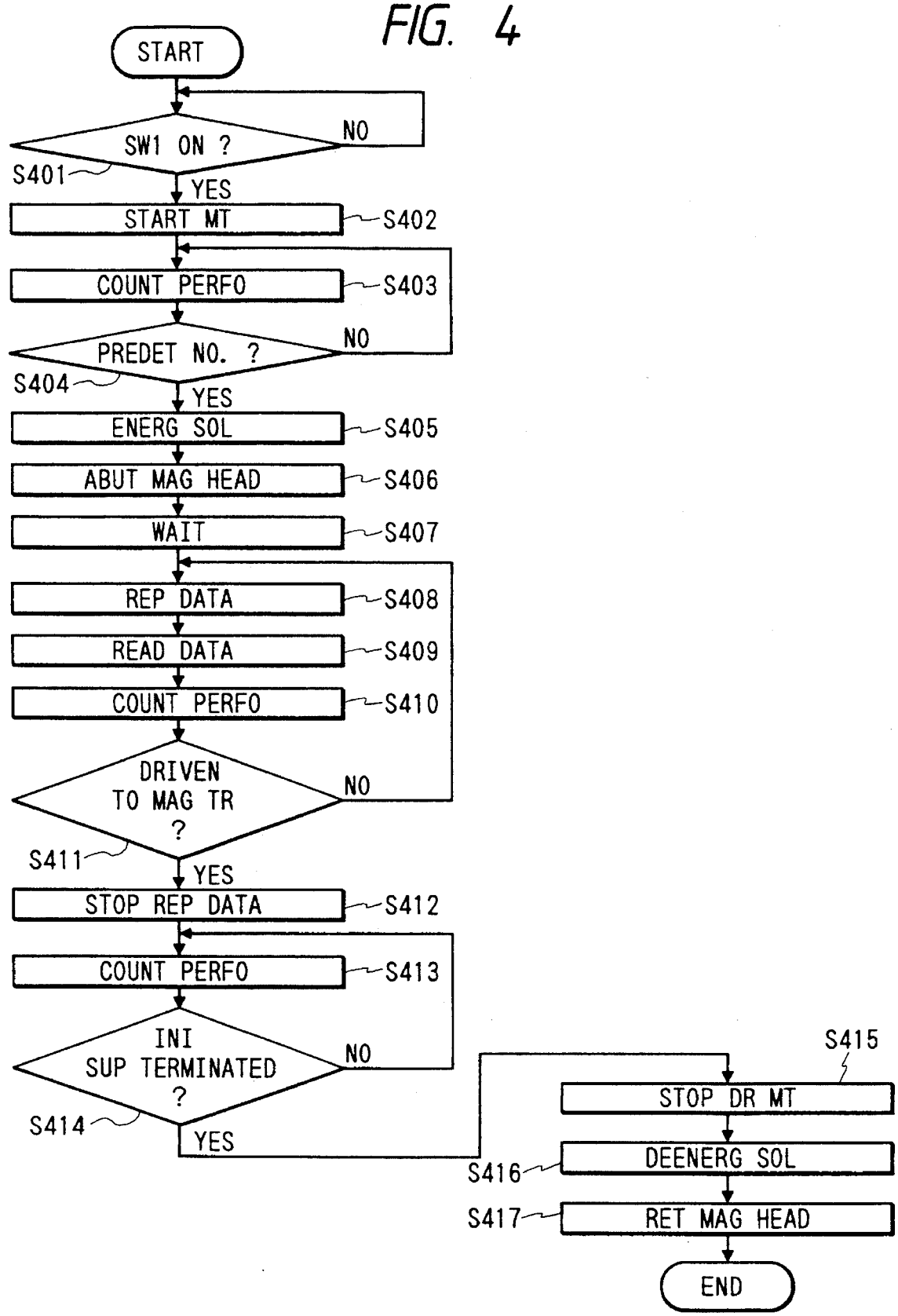

INFORMATION RECORDING/REPRODUCTION APPARATUS FOR CAMERA

This is a continuation of application Ser. No. 08/457,803 filed Jun. 1, 1995, which is a continuation of application No. 08/307,095 filed Sep. 16, 1994, which is a continuation of application Ser. No. 08/032,177 filed Mar. 15, 1993, which is a continuation of application Ser. No. 07/905,209 filed Jun. 26, 1992, which is a continuation of application Ser. No. 07/785,164 filed Oct. 31, 1991, which is a continuation of application Ser. No. 07/624,993 filed Dec. 10, 1990, all of which are now abandoned.

BACKGROUND OF THE INVENTION

1. Field of the Invention

The present invention relates to an information apparatus for a camera, which records/reproduces information recorded on a magnetic recording region of a film.

2. Related Background Art

A technique for recording a variety of information on a loaded film by a camera is known. In particular, U.S. Pat. No. 4,864,332 discloses a technique for magnetically recording/reproducing information. The information includes information associated with a photographing period, information associated with a photographer, and the like.

A partially photographed film may be temporarily rewound and unloaded from a camera, and may be loaded in the camera again to be subjected to new photographing operations. In this case, when the film is loaded again, a proximal frame of an unexposed portion must oppose an aperture. In order to attain this operation, information indicating to which frame photographing operations have been completed must be recorded on the film during, e.g., the previous rewind operation. When the film is loaded in the camera again, this information is reproduced, and the film is fed by a predetermined amount based on this information, so that the proximal frame of the unexposed portion opposes the aperture.

In this manner, when the partially photographed film is loaded again, information indicating to which frame photographing operations have been completed must be reproduced. However, when a new film is loaded or when a film, all the frames of which have been photographed is erroneously loaded, information of this type need not be reproduced.

When the above-mentioned information is magnetically recorded on a film, or when the information recorded on the film is magnetically read (reproduced), a magnetic head must abut against a region where the information is recorded. However, when the magnetic head is always in contact with a recording medium, the characteristics of the head may be impaired.

As a new film cartridge, a cartridge for feeding a film by externally rotating a shaft around which a film is wound is known, as disclosed in U.S. Pat. No. 4,834,306. However, when such a cartridge is used and information is to be magnetically recorded/reproduced, if the magnetic head is always located at a position where it is in contact with the film, the magnetic head may disturb a feed process of the film from the cartridge.

Furthermore, in, e.g., an 8-mm movie camera, an environmental noise such as a voice is magnetically recorded during a photographing operation. In a movie camera of this type, an image photographing portion and a voice recording portion corresponding to the image are separated on a film in a film travel direction since the movie camera must take motion pictures, and has a different apparatus arrangement such as mechanism arrangement conditions in an image photographing unit corresponding to a photographing optical system and a voice recording unit. Therefore, in a movie camera, a magnetic recording operation can be performed regardless of an image photographing operation on a film surface, respective units have relatively simple arrangements, and an interference between the two mechanisms need not be considered. Therefore, stable image photographing and voice recording operations can be performed on a film.

The method of magnetically recording information on a film can be applied to, e.g., a still camera. In this case, information to be recorded includes photographing information such as exposure, aperture, and film sensitivity conditions during a photographing operation, a photographing date and time, or trimming information used during a printing operation of a photographed frame. When such information is recorded on the film surface during photographing operations, the information can be read in, e.g., a processing laboratory to set exposure conditions during printing operations in accordance with those during photographing operations, thereby coping with exposure conditions which are different from each other in units of frames. In this manner, a printed photograph can be finished better. Even if a photographing operation is performed under a condition that a portion of a frame is enlarged, and a focal length of a photographing lens of a camera is limited, a printed photograph appearing as if it were taken using a telephoto lens can be obtained, thus assisting photographing functions.

For this reason, in a still camera of this type, a magnetic member may be arranged on a film surface as a magnetic information recording portion, and a magnetic recording apparatus for magnetically recording information on the magnetic member using, e.g., a magnetic head may be disposed in the camera.

However, when a magnetic recording apparatus for a still camera is arranged, practical problems in association with a film feed device are posed. More specifically, a still camera has no enough space to separately arrange an image photographing unit and a voice recording unit unlike in a movie camera. Since a film is normally cut at a proper length as a negative film after development and printing, an information recording portion is preferably formed on a side edge portion which is close to a photographing frame as much as possible or near it in terms of handling of film segments, an arrangement space of mechanism parts in a camera, and the like, and in order to realize a compact camera as a whole. For this reason, the magnetic information recording portion is formed adjacent to each photographing frame of a film, and a magnetic head for recording information on the magnetic information recording portion is urged against a film surface in a portion adjacent to a film path facing an aperture of a camera main body from a direction perpendicular to the film surface.

U.S. Pat. Nos. 4,832,275 and 4,834,306, Japanese Laid-Open Utility Model Application No. 58-67329, and the like disclose a film patrone mechanism which comprises a cylinder portion, including a spool shaft, for storing a photographing film wound in a roll, and a film feed portion, integrally extending from the cylinder portion in its tangential direction, for storing a leading end of a film in a linear state. A patrone of this type stores the leading end of the film in the feed portion so as not to externally expose it. When this patrone is loaded in a camera, for example, a sprocket which meshes with perforations of a film is driven by a driving system of the camera from an opening portion formed in a portion of the spool shaft or the feed portion, thereby sequentially feeding the leading end of the film from a feed port of the patrone.

When an automatic loading camera which employs a film patrone with this structure, and loads it in a patrone chamber formed on one side of a camera main body so as to sequentially feed a film by a driving system in the camera and to wind it around a take-up spool is to be developed, the presence of the magnetic head poses a problem. More specifically, during an automatic loading operation, when a film is fed toward the take-up spool by only a push-out force from the patrone, the leading end of the film must overcome a pressing force of the magnetic head in a direction of a film surface to pass through this portion and to keep traveling. However, as compared to a case wherein the leading end of a film is wound around a spool in advance and the film is extracted by a rotational force of the spool like in a conventional film patrone, in the film patrone structure of the above-mentioned type, the leading end of a film must pass through a magnetic head portion by only a push-out force from a film patrone, and since a pressing force of the magnetic head is considerably high, a film push-out force must be increased than necessary. If the film push-out force is increased, the leading end of the film may be caught by the magnetic head portion, and may be bent. In this state, the film can no longer travel. Thus, such problems must be solved.

SUMMARY OF THE INVENTION

It is an object of the present invention to provide an information recording/reproduction apparatus for a camera, in which a magnetic head can abut against a predetermined position of a film only when it is necessary.

It is another object of the present invention to provide an information recording/reproduction apparatus for a camera, which can smoothly feed a film.

In order to achieve the above objects, according to the present invention, there is provided a camera comprising film feed means for taking up a loaded film on a take-up spool, a magnetic head which abuts against a magnetic recording medium arranged in advance on a film, detection means for detecting a region of the film where the magnetic recording medium is arranged, drive control means for causing the magnetic head to abut against the magnetic recording medium in accordance with a detection output from the detection means, and information transfer means for reproducing information recorded on the magnetic recording medium and/or recording information on the magnetic recording medium in correspondence with a magnetic head abutting operation by the drive control means.

Furthermore, in order to achieve the above objects, according to the present invention, there is provided a camera comprising the above-mentioned film feed means, the above-mentioned magnetic head, first detection means for detecting a first region where a magnetic recording medium for recording information associated with a film is arranged, second detection means for detecting a second region for recording image information based on a photographing operation, drive control means for causing the magnetic head to abut against the magnetic recording medium in accordance with a detection output from the first detection means, and information transfer means for reproducing information recorded on the magnetic recording medium and/or recording information on the magnetic recording medium in correspondence with a magnetic head abutting operation by the drive control means.

The detection means detects a region of the film where the magnetic recording medium is arranged, and the drive control means causes the magnetic head to abut against the magnetic recording medium in accordance with the detection output from the detection means. Therefore, the magnetic head can abut against the magnetic recording medium only when information is to be reproduced or recorded.

Moreover, in order to achieve the above objects, according to the present invention, there is provided an information recording/reproduction apparatus for a camera, comprising film feed means for taking up a loaded film on a take-up spool, a magnetic head which abuts against a magnetic recording medium arranged in advance on a film, detection means for detecting a region of the film where the magnetic recording medium is arranged, identification means for identifying a use state of the loaded film, drive control means for causing the magnetic head to abut against the magnetic recording medium in accordance with a detection output from the detection means and an identification output from the identification means, and information transfer means for reproducing information recorded on the magnetic recording medium and/or recording information on the magnetic recording medium in correspondence with a magnetic head abutting operation by the drive control means.

The drive control means causes the magnetic head to abut against the magnetic recording medium in accordance with an output from the detection means for detecting the region of the film where the recording medium is arranged, and an output from the identification means for identifying a use state of the film. Thus, only when the magnetic head opposes the magnetic recording medium and information need be recorded/reproduced, the magnetic head can abut against the magnetic recording medium.

A magnetic recording apparatus for a camera according to the present invention comprises a magnetic recording magnetic head which is arranged to be able to approach or separate from a film surface from a direction perpendicular to the film surface in a middle portion of a film path along which a film fed from a patrone loaded in one side of a camera main body toward a take-up spool passes, and which portion is adjacent to an aperture, locking means for locking movement of the magnetic head in a direction to abut against the film surface at an escape position, and detection means, arranged to be able to approach or separate from the film path between the magnetic head and the take-up spool, for detecting a leading end of the film, releasing a locking state by the locking means, and causing the magnetic head to abut against the film surface.

According to the present invention, in an automatic loading mode in which a film fed from a patrone loaded in one side of a camera main body is taken up around a take-up spool on the other side of the camera main body via a film path opposing an aperture, the magnetic head opposing the film surface in a portion adjacent to the aperture is locked at an escape position by the locking means. When the detection means detects that the film passes the magnetic head portion and travels toward the take-up spool, the locking state by the locking means is released, and the magnetic head abuts against the film surface, thus setting a magnetic recording enable state. In the magnetic recording enable state, when the film is sequentially fed into the patrone from the take-up spool side, and the leading end of the film passes the detection means portion, the detection means detects this state, and the locking means is allowed to lock the magnetic head at the escape position.

BRIEF DESCRIPTION OF THE DRAWINGS

FIGS. 1 to 5B show one embodiment of the present invention, in which FIG. 1 is a schematic diagram of this embodiment, FIG. 2 is a block diagram showing the overall arrangement of this embodiment, FIGS. 4 and 5A are flow charts showing a processing sequence, and FIG. 5B is a flow chart showing a modification of the processing sequence;

FIGS. 6A to 10 show another embodiment of the present invention, in which FIGS. 6A and 6B are schematic views showing a film, FIG. 7 is a schematic view showing a portion near an aperture of a camera, FIGS. 9 and 10 are flow charts showing a processing sequence.

FIGS. 14 to 18 show still another embodiment of the present invention, in which FIG. 14 is a schematic diagram of this embodiment, FIGS. 15 and 16 are flow charts showing a processing sequence, and FIGS. 17 and 18 are flow charts showing other modifications of the processing sequence;

FIGS. 19 to 26 show an embodiment of an information recording/reproduction apparatus for a camera according to the present invention, in which FIG. 19 is a schematic perspective view of a magnetic head moving mechanism as the embodiment of the information recording/reproduction apparatus for a camera according to the present invention, FIGS. 20 and 21 are schematic perspective views for explaining the operation of the mechanism shown in FIG. 19, FIGS. 22A and 22B are schematic side views for explaining movement of a patrone detection lever, FIG. 25 is a schematic perspective view of a film patrone applied to the apparatus of the present invention, and FIG. 26 shows a modification of the apparatus of the present invention; and FIGS. 27 to 35 show another embodiment of an information recording/reproduction apparatus for a camera according to the present invention, in which FIG. 27 is a perspective view showing another embodiment of the information recording/reproduction apparatus for a camera according to the present invention, FIG. 28 is a schematic diagram for explaining the principle of the apparatus shown in FIG. 27, FIG. 29 is a block diagram of the apparatus shown in FIG. 27, FIGS. 30 and 31 are central sectional views of a camera to which the apparatus shown in FIG. 27 is applied, FIG. 32 is a developed view of a lens cam ring, and FIGS. 33 to 35 are flow charts for explaining an operation of this apparatus.

DESCRIPTION OF THE PREFERRED EMBODIMENTS

An embodiment of the present invention will be described below with reference to FIGS. 1 to 5B.

Figure 1:
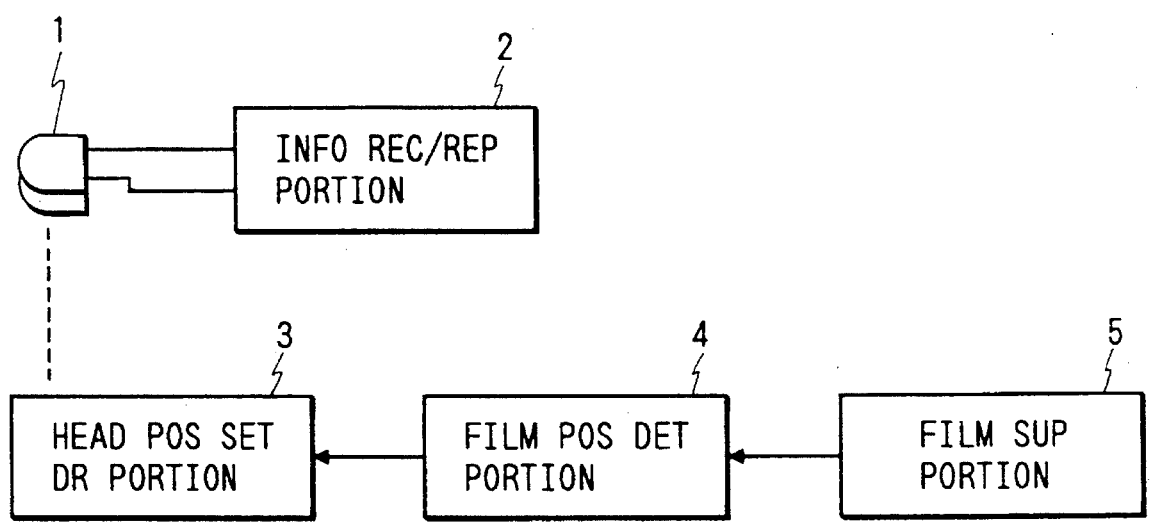

FIG. 1 is a schematic diagram of the present invention.

A film position detection portion 4 detects the position of a film supplied by a film supply portion 5. A head position setting/driving portion 3 drives a head in accordance with the detection result from the detection portion 4 to cause it to abut against a predetermined position of the film. An information recording/reproduction portion 2 records/reproduces information using an abutting magnetic head 1.

Figure 2:
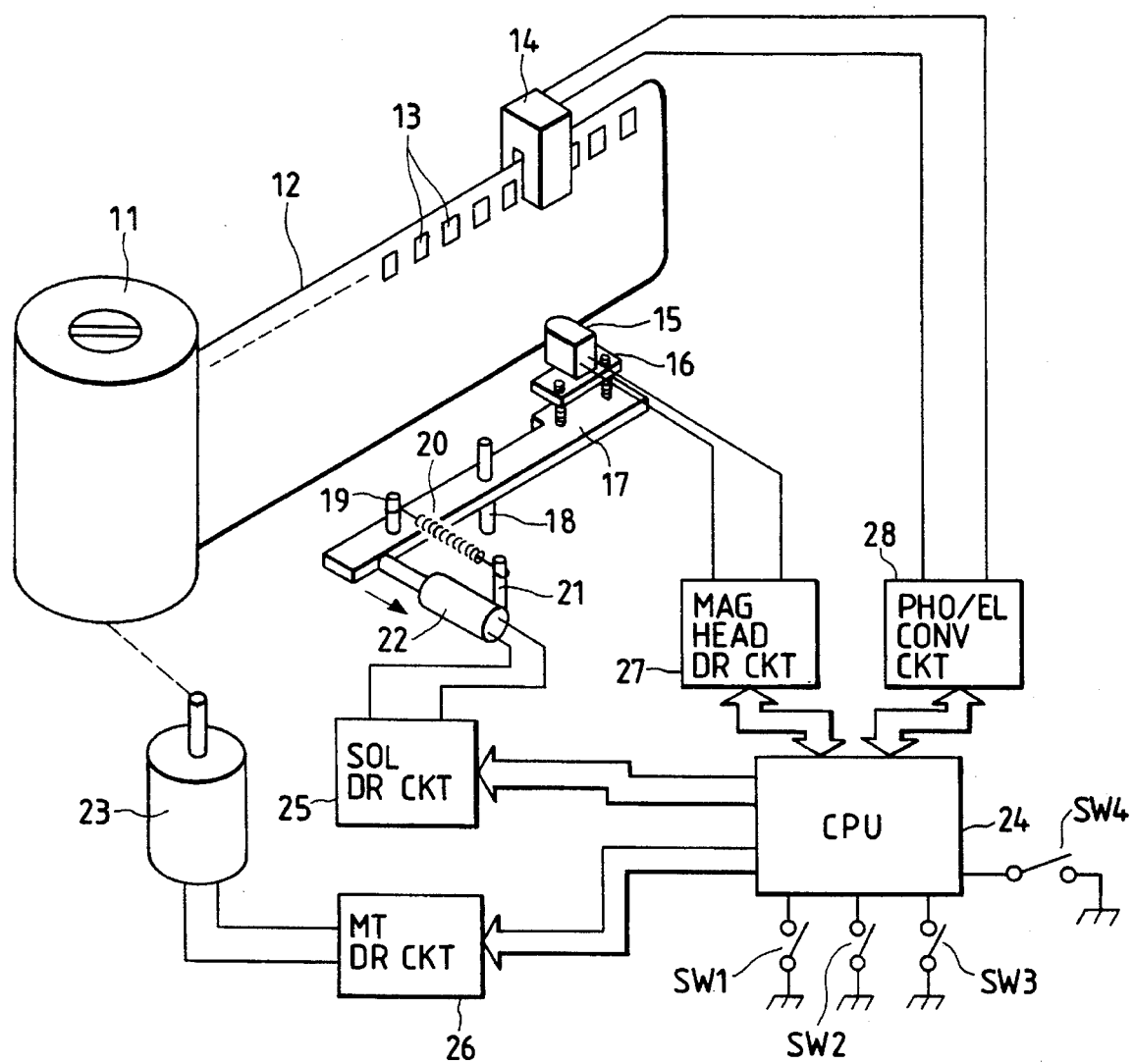

FIG. 2 is a block diagram showing the overall arrangement of this embodiment.

A film cartridge 11 incorporating a film 12 supplies the film 12 by externally rotating its central shaft, as described above. Perforations 13 are formed in the upper portion of the film 12. A photointerrupter 14 detects the number of passing perforations 13 in correspondence with a supply operation of the film 12. A detection result from the photointerrupter 14 is converted into information by a photo/electric conversion circuit 28.

A magnetic head 15 is arranged to be able to contact an end portion of the film 12 opposite to the perforations 13 so as to record/reproduce information on/from the film 12. More specifically, the magnetic head 15 is arranged on a head position adjusting plate 16 mounted on a head holding lever 17. The head holding lever 17 is rotatable about a shaft 18 as a center of rotation. A magnetic head drive circuit 27 records information on a recording region (to be described later) of the film 12 or reproduces information from this recording region via the magnetic head 15.

A spring 20 is looped between a pin 19 embedded in the head holding lever 17 and a stationary shaft 21, and biases the lever 17 counterclockwise, i.e., a direction to cause the head 15 to contact the film 12. A drive solenoid 22 is connected to the head holding lever 17, and is driven by a solenoid drive circuit 25. A motor 23 rotates the central shaft of the cartridge 11 to supply the film 12 from the cartridge 11. The motor 23 is driven by a motor drive circuit 26.

The solenoid drive circuit 25, the motor drive circuit 26, the magnetic head drive circuit 27, and the photo/electric conversion circuit 28 described above are controlled by a CPU 24. The CPU 24 is connected to switches SW1, SW2, and SW3. The operations of these switches SW1, SW2, and SW3 will be described later.

Figure 3A:
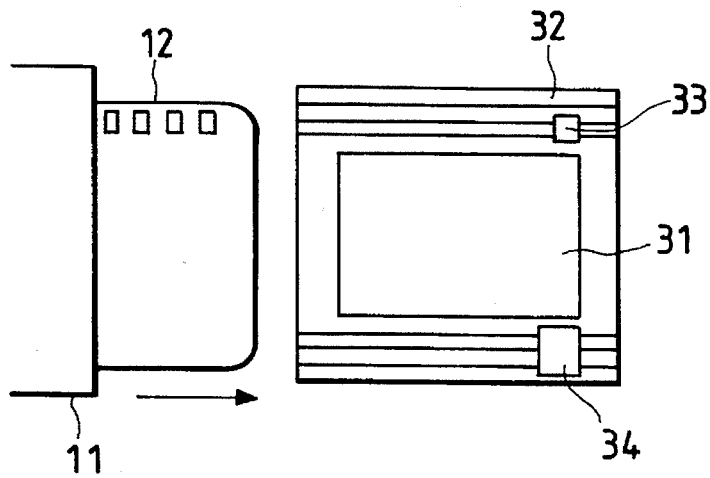
FIGS. 3A, 3B, and 3C are schematic views showing a portion near an aperture of a camera, and a film.
Figure 3B:
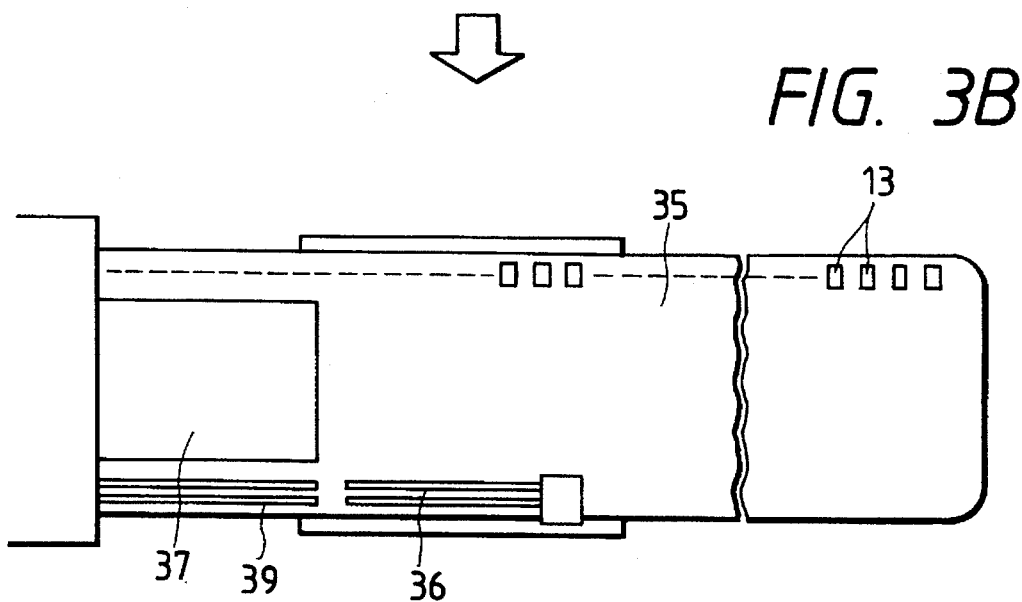
Figure 3C:
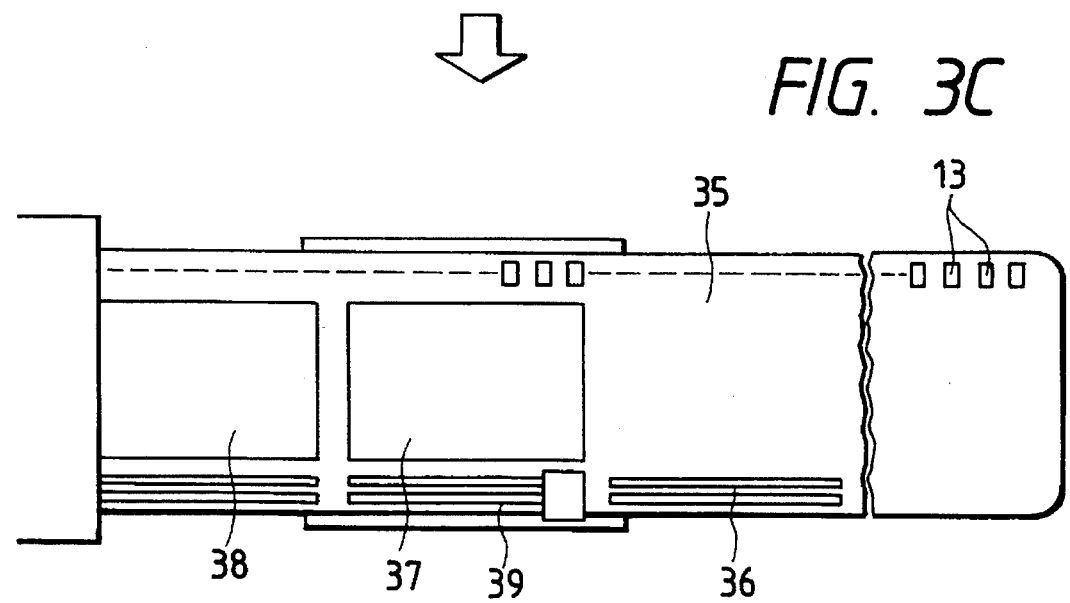

FIGS. 3A, 3B, and 3C are views for explaining movement, position detection, and magnetic recording operations of the film 12.

FIG. 3A shows a state wherein the leading end portion of the film 12 is supplied from the cartridge 11. FIG. 3A illustrates an aperture 31 of a camera, and an outer rail 32 for guiding the film. In FIG. 3A, the position of the photointerrupter 14 arranged to detect the position of the film is designated by 33, and the position of the magnetic head 15 for recording/reproducing information is designated by 34.

FIG. 3B shows a state wherein the film 12 is further supplied from the cartridge 11, and is ready to reproduce information magnetically recorded thereon. In this case, information associated with the film 12 is recorded on a magnetic track (magnetic recording medium) 36, and a portion having the magnetic track 36 is regarded as one different from a photographing frame. Note that the length of the magnetic track 36 in the longitudinal direction of the film need not always be the same as that of a photographing frame 37.

The information associated with the film and recorded on the magnetic track 36 includes information inherent to a film such as an ISO sensitivity and a photographable frame count of the film (recorded in the manufacture process of the film), or information indicating that the film is not photographed up to the final frame but is rewound halfway (recorded by the camera). The portion where the magnetic track 36 is arranged is followed by a first photographing frame 37. Magnetic tracks 39 for recording information inherent to each frame are arranged in correspondence with respective photographing frames 37 on the film 12.

FIG. 3C shows a state wherein photographing operations are completed, and the film 12 is being rewound in the cartridge 11. In the rewind operation to the cartridge 11, information associated with one film is recorded on the magnetic track 36. For example, this information may include information indicating that photographing operations are not performed up to the final frame, or information indicating a date range of photographing operations, or information indicating a photographer's name. Information associated with a corresponding frame of the film (e.g., a photographing date or the presence/absence of trimming) is recorded on each magnetic track 39.

Figure 5A:
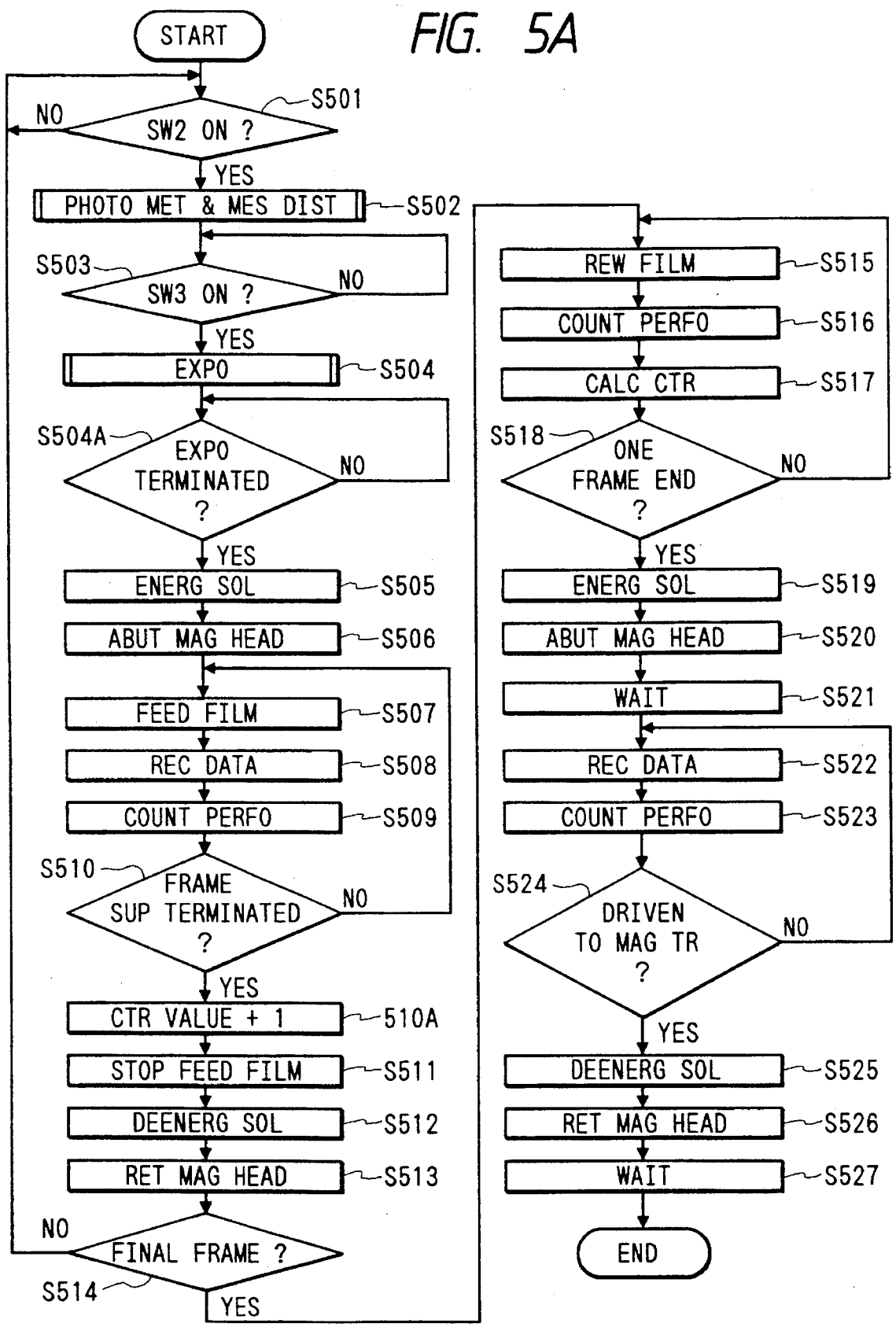

FIGS. 4 and 5A are flow charts showing an operation of this embodiment. FIG. 4 shows a portion associated with an initial supply operation of the film.

In FIG. 4, in step S401, the control waits for an ON event of the switch SW1 (FIG. 2). The switch SW1 is turned on when a rear cover (not shown) is closed after the cartridge 11 is loaded in the camera.

If the switch SW1 is turned on, and YES is determined in step S401, energization of the motor 23 is started to supply the film 12 from the cartridge 11 in step S402. When the motor 23 is energized, the central shaft of the cartridge 11 is rotated, and the film 12 is supplied.

In step S403, the perforations 13 are counted on the basis of the output from the photointerrupter 14 so as to monitor movement of the film 12 supplied from the cartridge 11. In step S404, it is checked if the number of perforations 13 has reached a predetermined value. When the number of perforations reaches the predetermined value, this means that the film 12 is driven so that the leading edge of the magnetic track 36 on the film 12 opposes the magnetic head 15. In this embodiment, the position to be subjected to magnetic recording is detected by counting the perforations of the film. However, in another embodiment, this position is detected based on the fact that a predetermined period of time has passed from the beginning of the film supply operation. In still another embodiment, this position is detected on the basis of a rotational speed of the film supply motor 23.

If NO in step S404, the flow returns to step S403; otherwise, the solenoid 22 is energized in step S405. Thus, the solenoid 22 is returned in a direction of an arrow in FIG. 2. As a result, the head holding lever 17 is pivoted counterclockwise by the biasing force of the spring 20, and the magnetic head 15 is brought into contact with the magnetic track 36 of the film 12 (step S406). After the head 15 is in contact with the magnetic track 36, the control waits for a predetermined period of time in step S407, and thereafter, the flow advances to step S408. This wait time is one required for stabilizing a contact state between the magnetic head 15 and the film 12.

In step S408, the magnetic head drive circuit 27 is driven to cause the magnetic head 15 to reproduce information recorded on the magnetic track 36. In step S409, the reproduced information is loaded. In step S410, the perforations 13 are counted to discriminate an end of the magnetic track 36. In step S411, it is checked whether or not the count value has reached a predetermined value, i.e., whether or not the film 12 is driven to a position where the magnetic track 36 passes the magnetic head 15.

If NO in step S411, i.e., if it is determined that the magnetic track 36 has not passed the magnetic head 15 yet, the flow returns to step S408, and data reproduction is continued. However, if YES in step S411, i.e., if it is determined that the magnetic track has passed the magnetic head 15, the drive circuit 27 is stopped in step S412 to end the data reproduction operation.

When the reproduction of information is completed, the perforations 13 are counted in step S413. It is then checked in step S414 if the count value has reached a predetermined value, i.e., whether or not an initial supply operation is terminated. Note that the initial supply operation generally means an idle supply operation of the predetermined number of frames, but also means a wind-up operation of all the frames in a pre-wind type camera.

If NO in step S414, the flow returns to step S413; otherwise, i.e., if it is determined that the initial supply operation of the film 12 is terminated, the motor 23 is deenergized to stop the film supply operation in step S415. In step S416, the solenoid 22 is deenergized. Thus, the solenoid 22 projects, and the head holding lever 17 is pivoted clockwise. Thus, the magnetic head 15 is returned from the magnetic track 36 (step S417).

The magnetic head 15 escapes from the film 12 to prevent the head 15 from being kept in contact with the film 12 since a time interval between the end of the film initial supply operation and an actual photographing operation, i.e., a state wherein magnetic recording is executed in correspondence with a photographing operation (to be described later) is unknown.

FIG. 5A is a flow chart showing an operation during a photographing operation and an operation after the photographing operation.

In step S501, the control waits for an ON event of the switch SW2. The switch SW2 is a so-called half-depression switch interlocked with the first stroke of a release button. If YES in step S501, i.e., if it is determined that the half-depression switch SW2 is turned on, the flow advances to step S502, and photometry and distance measurement operations are performed by a photometry circuit and a distance measurement circuit (neither are shown). In step S503, the control waits for an ON event of the switch SW3. The switch SW3 is a so-called release switch interlocked with the second stroke of the release button.

If YES in step S503, i.e., if it is determined that the release switch SW3 is turned on, the flow advances to step S504, and an exposure processing operation, i.e., a photographing operation is performed on the basis of the above-mentioned photometry and distance measurement results. Thereafter, it is checked in step S504A if the photographing operation is terminated. If NO in step S504A, the control waits until the photographing operation is terminated. If YES in step S504A, the flow advances to step S505. Whether or not the photographing operation is terminated can be determined by checking if a mirror-down operation or a travel operation of a shutter rear curtain is terminated in a single-lens reflex camera. In a lens shutter camera, the above-mentioned checking operation can be performed by checking whether or not a photographing lens is returned to a predetermined initial position.

In step S505, the solenoid 22 is energized. Thus, in step S506, the magnetic head 15 abuts against the magnetic track 39 corresponding to the frame. Thereafter, the film supply operation is started in step S507. In step S508, information associated with an exposed photographing frame, e.g., date, time, photographing conditions, and the like is magnetically recorded on the magnetic track 39 via the magnetic head 15. In step S509, the perforations are counted to supply the film by one frame. In step S510, whether or not a frame supply operation is terminated is determined based on the perforation count value.

If YES in step S510, i.e., if it is determined that the one-frame supply operation is terminated, the flow advances to step S510A; otherwise, the flow returns to step S507 to repeat the above-mentioned operations. In step S510A, a count value of a film counter is incremented by one, and in step S511, a film supply operation is stopped. In step S512, the solenoid 22 is deenergized. As a result, in step S513, the head 15 is returned from the magnetic track 39.

In this embodiment, contact and return timings of the magnetic head 15 with respect to the film 12 are determined such that the head 15 contacts the film 12 after the exposure operation is terminated, and is returned upon completion of the frame supply operation of the film. However, the present invention is not limited to these timings. In another embodiment, the head contacts the film when it is detected that the half-depression switch SW2 is turned on. When the head contacts the film in response to operation of the half-depression switch SW2, it is not preferable that the head is kept in contact with the film until the film supply operation is terminated even though the switch SW2 is turned on once in consideration of the fact that only the ON/OFF operation of the half-depression switch SW2 may be repeated. Therefore, it is preferable that the head contacts and is returned from the film in response to only the ON/OFF operations of the half-depression switch SW2.

In step S514, it is checked if photographing operations of one film are terminated. If NO in step S514, i.e., if it is determined that the photographing operations of all the frames are not terminated yet, the flow returns to step S501, and the above-mentioned processing operations are repeated. However, if YES in step S514, i.e., if it is determined that the photographing operations of all the frames are terminated, the flow advances to step S515.

In step S515, the film 12 is rewound. In step S516, the perforations are counted. In step S517, the count value of the film counter is decremented every time the film is rewound by one frame. In step S518, whether or not the first frame is rewound is checked to determine the end of the rewind operation. If NO in step S518, the operations in steps S515 to S518 are repeated. If YES in step S518, the flow advances to step S519. In this case, the end portion on the side of the film trailing end of the magnetic track 36 on the film 12 opposes the magnetic head 15.

In step S519, the solenoid 22 is energized, and in step S520, the magnetic head 15 is brought into contact with the magnetic track 36. In step S521, a stabilization time after the magnetic head contact is assured. In step S522, information is recorded on the magnetic track 36 via the magnetic head 15. A recording content of the information recording operation in step S522 includes information associated with one film, e.g., a date range of photographing operations, a photographer's name, an exposure correction value of the overall film, or the like, as described above.

In step S523, the perforations are counted in order to detect the end of the magnetic track 36. In step S524, it is checked based on the count value whether or not the magnetic track 36 is ended, i.e., whether or not the film 12 is rewound until the end portion on the side of the film leading end of the magnetic track 36 contacts the magnetic head 15. If NO in step S524, the operations in steps S522 to S524 are repeated; if YES in step S524, the flow advances to step S525 to deenergize the solenoid 22. In step S526, the magnetic head 15 is returned from the magnetic track 36. In step S527, a timer wait operation of a predetermined period of time is performed. This wait time corresponds to a time enough to wind up the film 12 in the cartridge 11.

In this embodiment, after the information for one film is recorded, the magnetic head 15 is returned from the film 12. However, in another embodiment, step S527 is inserted before steps S525 and S526, so that the magnetic head 15 is returned after the film 12 is wound up in the cartridge 11.

Figure 5B:
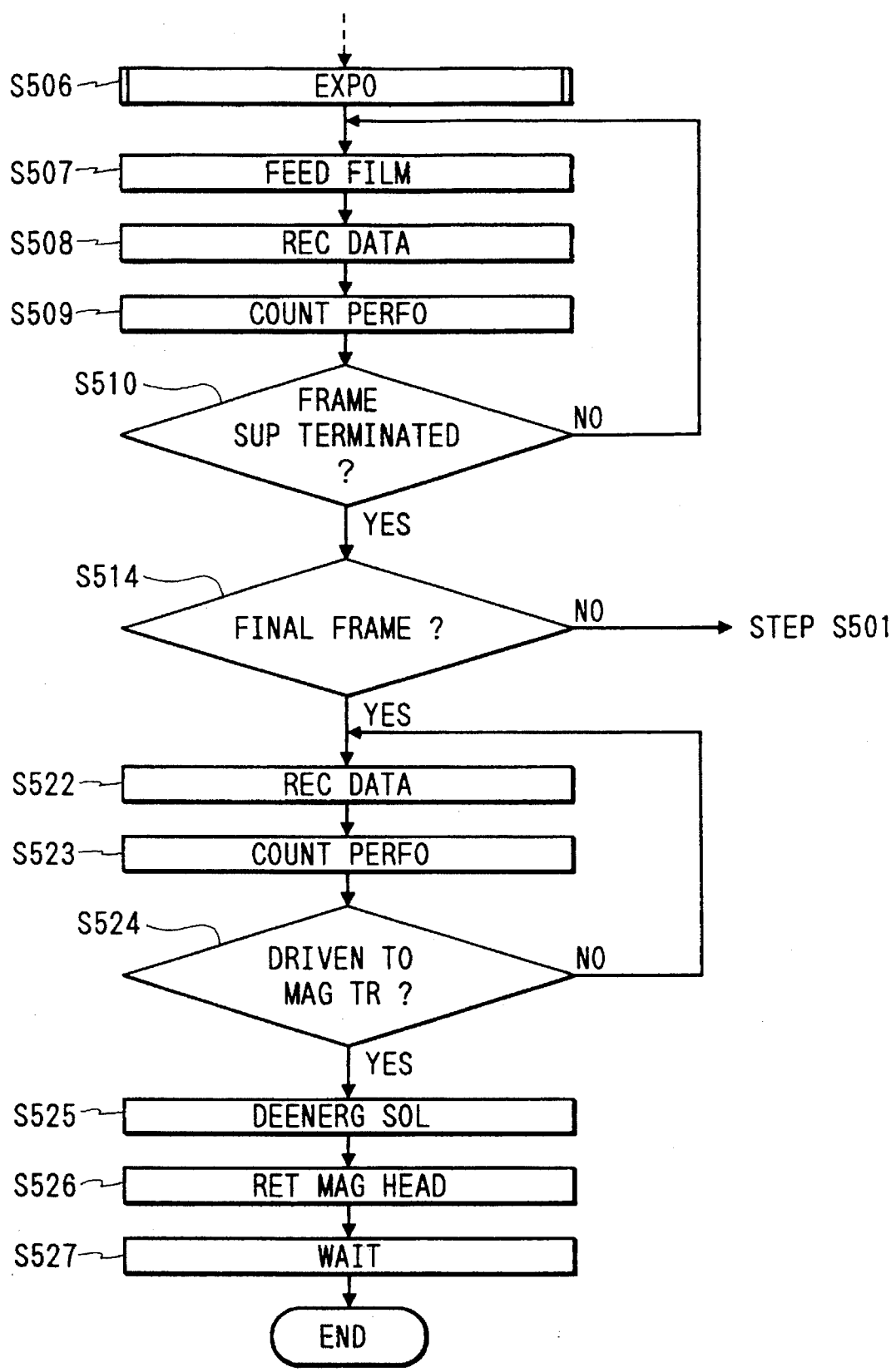

FIG. 5B shows an operation in a pre-wind type camera in association with the film rewind operation shown in FIG. 5A. In the pre-wind type camera, almost the overall film is extracted from a cartridge upon loading of the cartridge in a camera, and the film is rewound by one frame upon completion of each photographing operation. Therefore, common operations are performed in steps before step S505, and these steps are omitted. The steps of performing the same operations in FIG. 5B are denoted by the same step numbers as in FIG. 5A. When the exposure operation is terminated in step S506, a film frame feed operation of a photographed frame and an information recording operation associated with the photographed frame are performed in steps S507 to S510. In the film frame feed operation, the film is driven in a direction to be rewound in the cartridge in the pre-wind type camera.

If YES in step S510, i.e., if it is determined that the frame supply operation is terminated, it is checked in step S514 if the frame is the final frame, i.e., if it is a photographing frame closest to the cartridge. If NO in step S514, the flow returns to step S501 to execute a routine for a photographing operation. However, if YES in step S514, the flow advances to step S522. In steps S522 to S524, an information recording operation having the same content as in FIG. 5A is performed.

After the information recording operation is terminated, i.e., if YES in step S524, the head 15 is returned from the magnetic track 36 of the film 12 by the operations in steps S525 to S527. After the elapse of a predetermined period of time, the film 12 is wound up in the cartridge 11, thus ending the operation.

In this manner, the feature of the pre-wind type camera shown in FIG. 5B is that after the photographing operation of the final frame and an information recording operation for the final frame in correspondence with the film feed operation in a direction of the cartridge are completed, information associated with the film is recorded without returning the head 15 from the film 12. Thus, the feature of the pre-wind type film feed operation can be sufficiently utilized. That is, when information for one film is to be recorded, an operation for causing the head to contact the film need not be repeated, resulting in convenience.

Another embodiment of the present invention will be described below with reference to FIGS. 6A to 10.

Figure 6A:
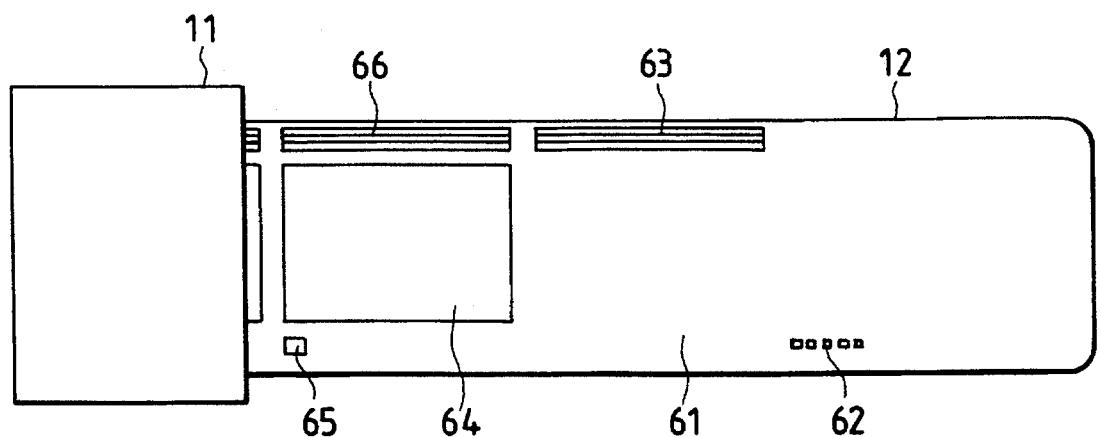
Figure 6B:
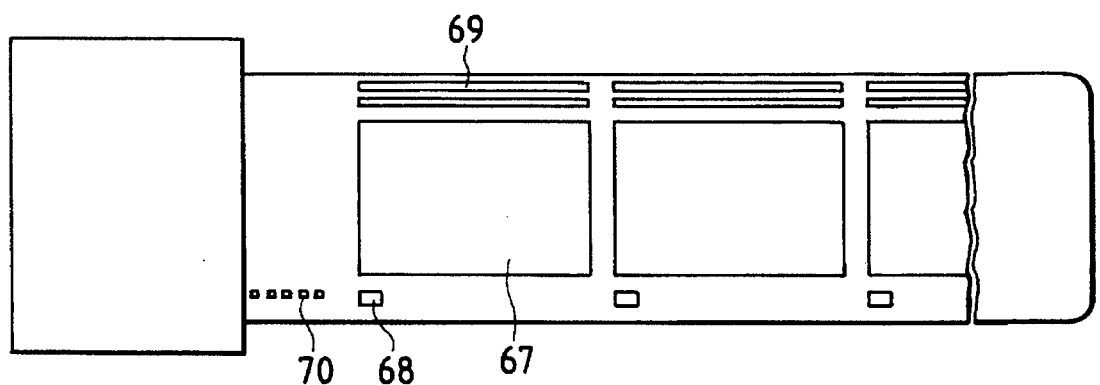

FIGS. 6A and 6B show an example of a film suitable for explaining another embodiment of the present invention. In this embodiment, a region where information associated with one film is recorded, and regions where images are actually recorded by photographing operations can be clearly distinguished from each other.

FIG. 6A shows a state wherein a film 12 is extracted from a cartridge 11. The film 12 has an information region 61 having a recording track 63 for recording/reproducing information for one film, first perforations 62 formed to identify the information region 61, image regions 64 on each of which an image is formed by an exposure operation, second perforations 65 for identifying the image regions 64, and magnetic tracks 66 corresponding to the image regions 64.

FIG. 6B shows a state wherein the film 12 is extracted from the cartridge 11 up to its trailing end portion. The film 12 also has third perforations 70 for identifying the trailing end portion of the film 12. FIG. 6B illustrates a final image region 67, second perforations 68 for identifying the final image region, and a recording track 69 corresponding to the final image region.

Note that the first perforations 62, the second perforations 65 and 68, and the third perforations 70 have been exemplified to explain the embodiment of the present invention. The positions, sizes, numbers and the like of these perforations are not limited as long as they have the above-mentioned functions. In addition, the length of the recording track 63 for recording information for one film is not limited to that of one frame of the image region.

Figure 7:
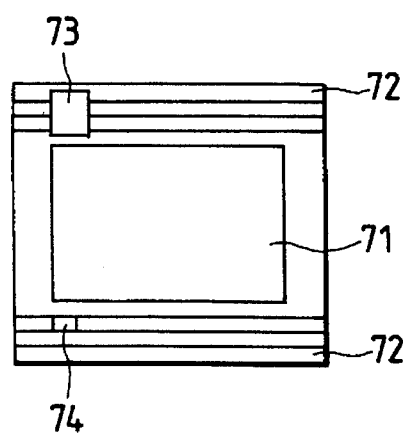

FIG. 7 shows an aperture portion of a camera which loads the above-mentioned film, and illustrates an aperture 71, outer rails 72 for guiding the film, a contact position 73 of a magnetic head for recording/reproducing information, and a position 74 of a photointerrupter for detecting the film position. FIG. 7 is premised on a pre-wind type camera.

Figure 8A:
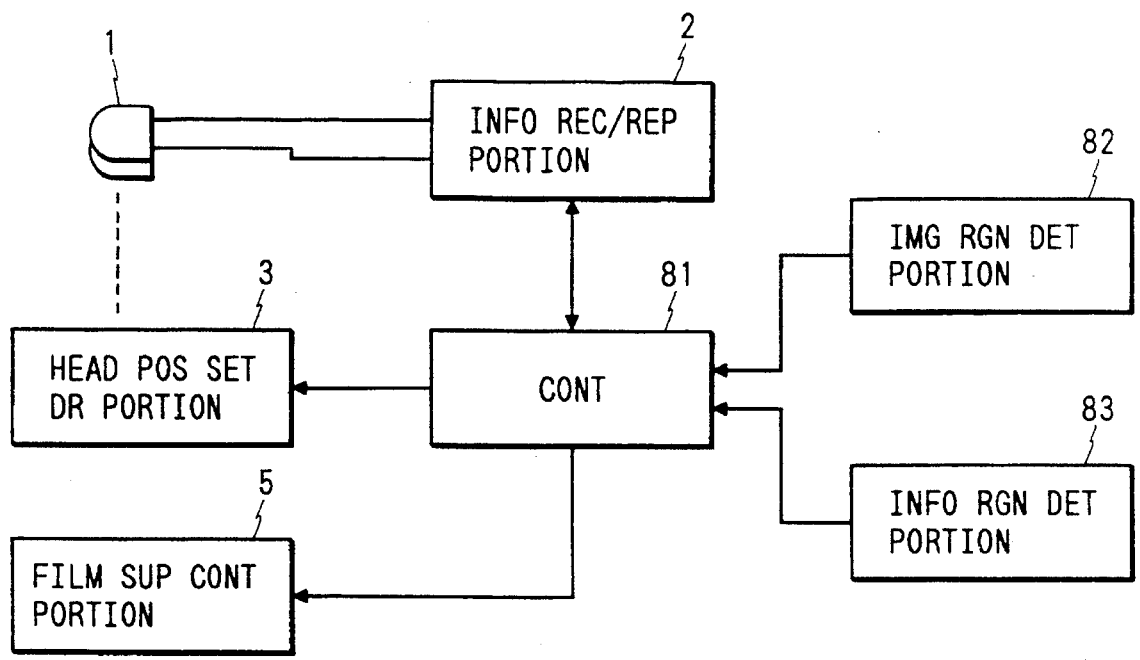
FIGS. 8A and 8B are schematic diagrams of this embodiment.
Figure 8B:
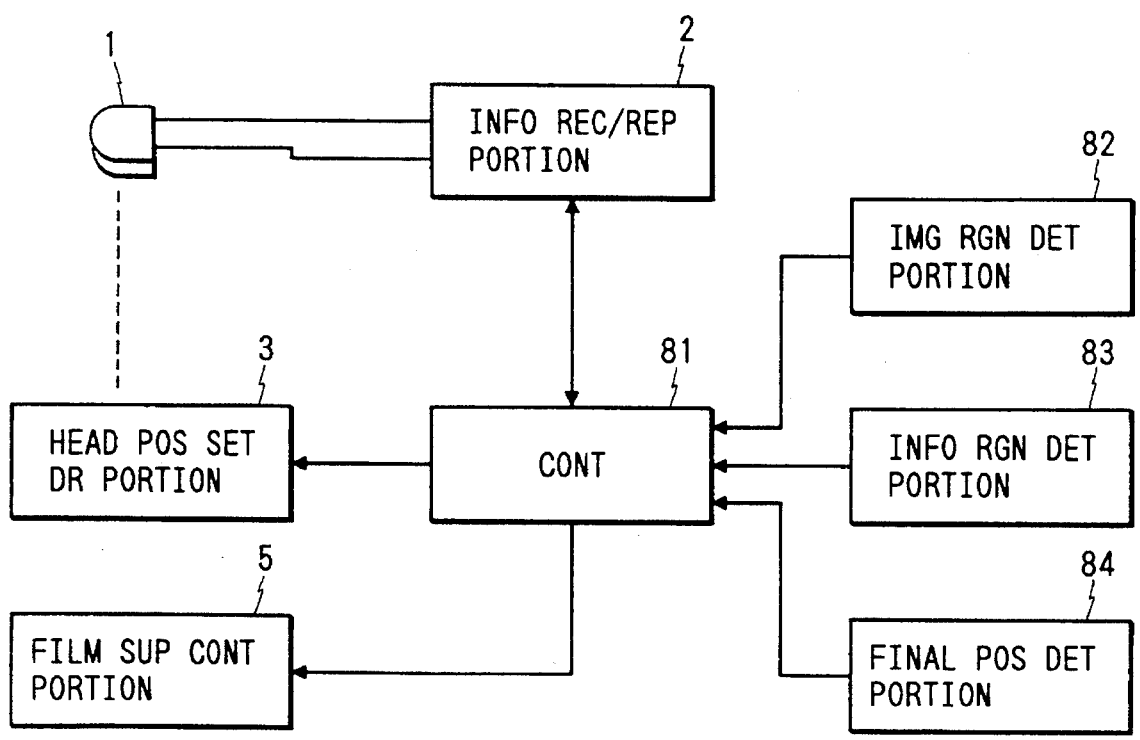

FIGS. 8A and 8B show the principle of the present invention using the film shown in FIGS. 6A and 6B.

FIGS. 8A and 8B are basically the same as FIG. 1. As the characteristic feature of FIG. 8A, a control portion 81 controls a head position setting/driving portion 3 and a film supply control portion 5 in accordance with signal inputs from an image region detection portion 82 and an information region detection portion 84. As the characteristic feature of FIG. 8B, the control portion 81 controls the head position setting/driving portion 3 and the film supply control portion 5 in accordance with a signal input from a final position detection portion 84 in addition to the above-mentioned signal inputs.

Figure 8C:
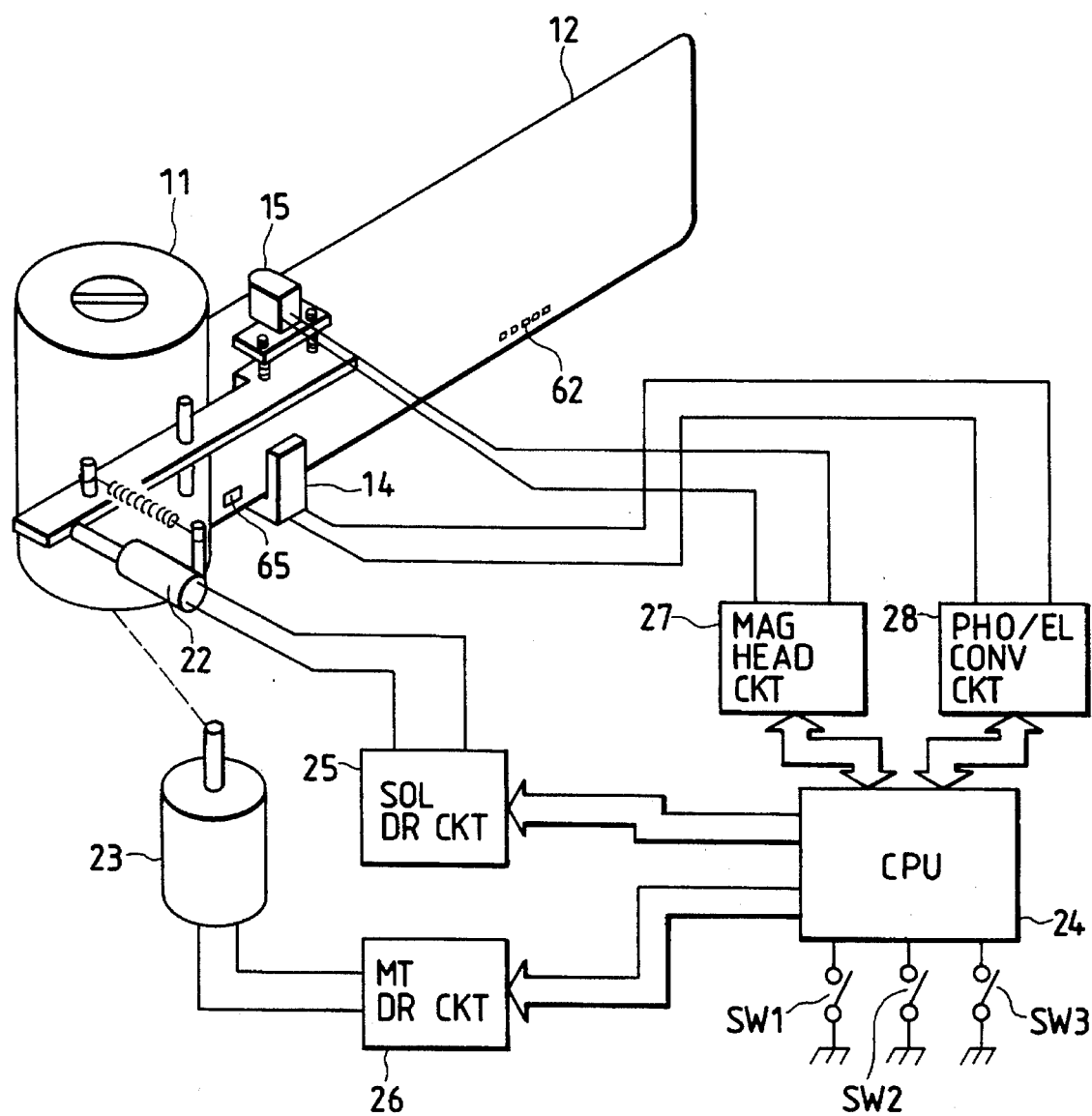
FIG. 8C is a block diagram showing the overall arrangement of this embodiment.

FIG. 8C shows an arrangement of this embodiment, and the same reference numerals in FIG. 8C denote the same parts as in FIG. 2.

Differences will be summarized below. Since the magnetic tracks 63, 66, and 69 on the film 12 are arranged on the upper portion of the film 12, the magnetic head 15 is located on the upper portion and nearer the cartridge 11 than that in FIG. 2. Furthermore, since the perforations 62, 68, and 70 are located on the lower portion of the film, the photointerrupter 14 is located on the lower portion accordingly.

With the above arrangement, a region for recording information associated with one film, and regions for recording images by photographing operations can be clearly distinguished from each other. Thus, an image by a photographing operation can be prevented from being formed on a region for recording information.

Of many kinds of cameras, some cameras have no magnetic recording means described above. If the film 12 shown in FIG. 6 is used in these cameras, an image can be prevented from being formed on a region for recording an information. More specifically, although a camera itself does not perform an operation for recording information associated with one film on the region, a processing laboratory may record information instead after development. For this purpose, it is preferable that no image is formed on an information region.

Figure 9:
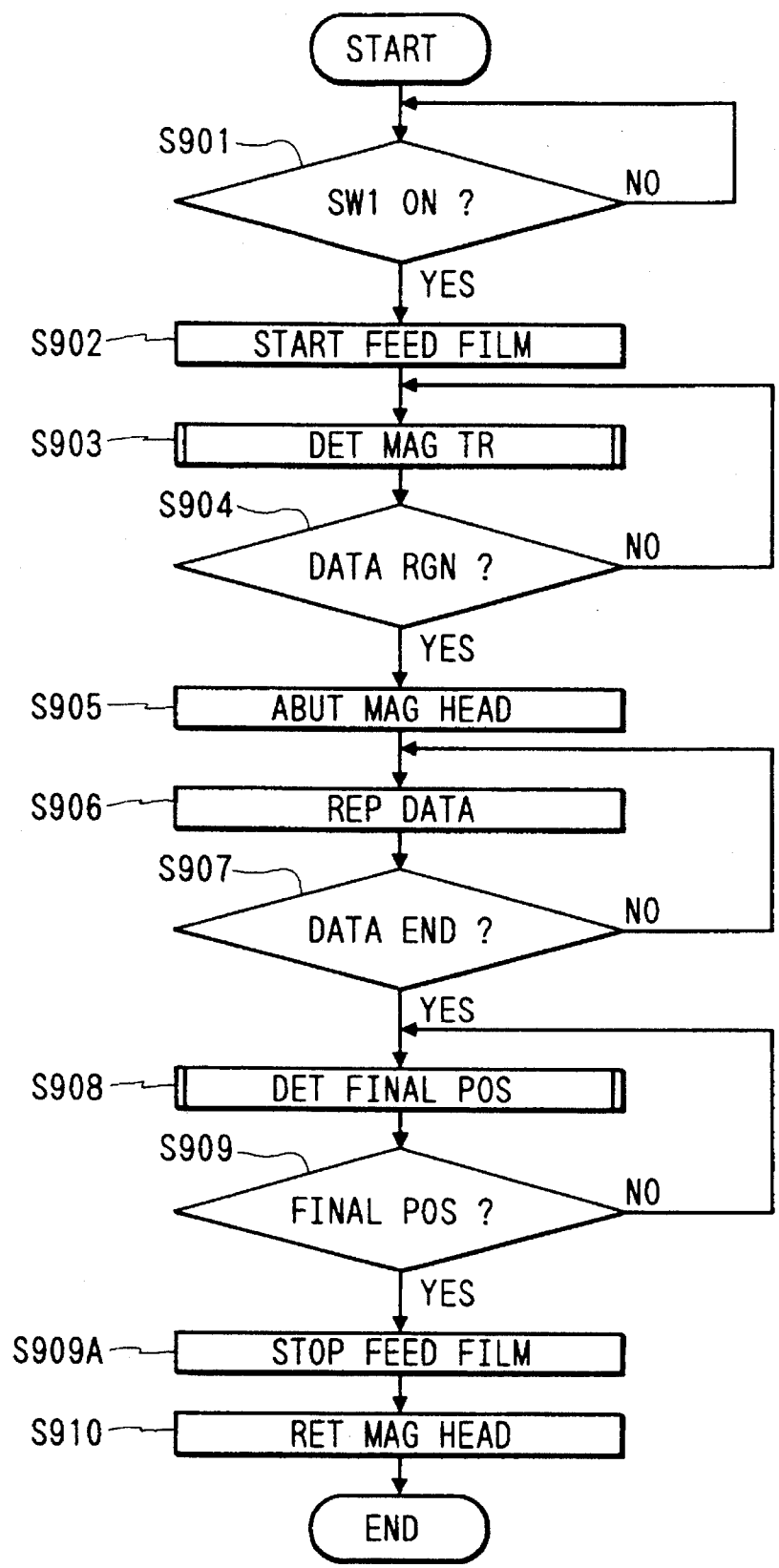

FIG. 9 is a flow chart showing a basic principle of the operation of the arrangements shown in FIGS. 8A and 8B.

In FIG. 9, when the cartridge 11 is loaded in the camera and a rear cover is closed, the switch SW1 is turned on, and YES is determined in step S901. In step S902, a film feed operation is started. In steps S903 and S904, an information recording region where information for one film is recorded is detected, i.e., the first perforations 62 shown in FIGS. 6A and 6B are detected. This detection operation will be described in detail later.

When the information recording region is detected, and YES is determined in step S904, the solenoid 22 is driven to reproduce information from the recording track 63 in step S905, thereby causing the magnetic head 15 to contact the recording track 63. In steps S906 and S907, recorded information is reproduced. A film feed operation is continued after the information reproduction operation. Since this embodiment is premised on the pre-wind type camera, the film 12 is extracted up to its trailing end portion.

In steps S908 and S909, the trailing end portion of the film 12, i.e., the third perforations 70 are detected. When the trailing end portion of the film is detected, and YES is determined in step S909, the feed operation of the film 12 is stopped in step S909A, and the magnetic head 15 is returned from the film 12 in step S910, thus ending operations.

Figure 10:
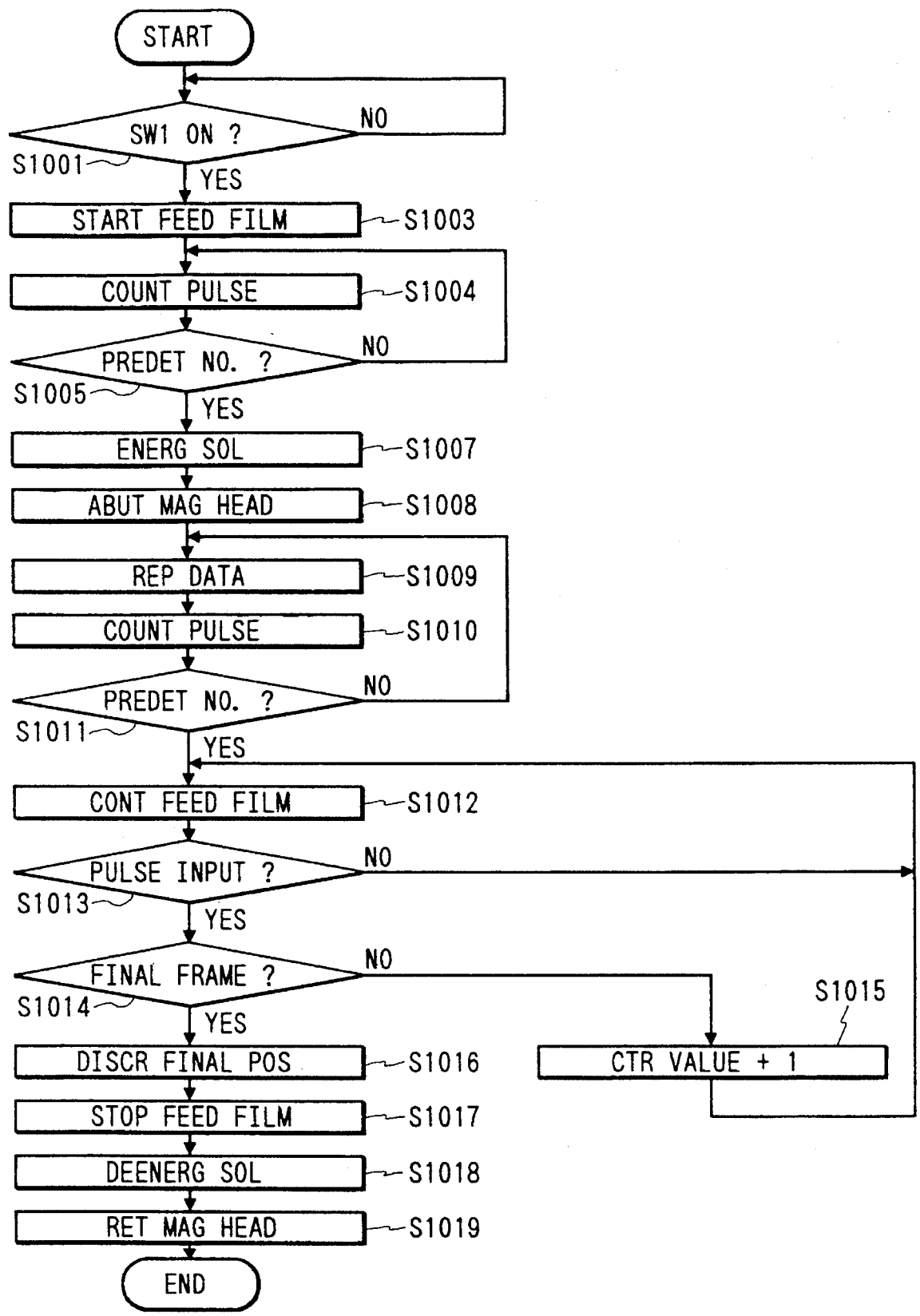

FIG. 10 shows in detail the operations shown in FIG. 9.

In step S1001, an ON event of the switch SW1 is detected as in FIG. 9. If YES in step S1001, the film feed operation is started in step S1003. In step S1004, pulses from the photointerrupter 14 are counted. As a result, if the magnetic track (first magnetic recording medium) 63 for recording information of one film is detected, YES is determined in step S1005. If YES in step S1005, the solenoid 22 is energized in step S1007, and the magnetic head 15 abuts against the recording track 63 in step S1008.

Thereafter, information recorded on the recording track 63 is reproduced in step S1009. In step S1010, pulses are counted. In step S1011, it is checked if the count value has reached a predetermined value, i.e., if an image region of the first frame (corresponding to the final frame in the pre-wind system) is detected.

When the image region immediately after the magnetic track 63 is detected by detecting the second perforations, and YES is determined in step S1011, the film feed operation is continued in step S1012. In step S1013, whether or not pulses are input from the photointerrupter 14, i.e., whether or not the film 12 is fed by one frame is checked. If NO in step S1013, the flow returns to step S1012; otherwise, it is checked in step S1014 if the final frame is detected, i.e., if the pre-wind operation is terminated. This checking operation is attained by checking if the film frame count read from the recording track 63 coincides with the film count value or if the third perforations 70 are detected.

If NO in step S1014, i.e., if it is determined that the final frame is not reached yet, the count value of the film counter is incremented by one, and the flow returns to step S1012. If the final frame is detected in step S1016, the film feed operation is stopped in step S1017, and in steps S1018 and S1019, the solenoid 22 is deenergized to return the head 15 from the film 12.

Figure 11A:
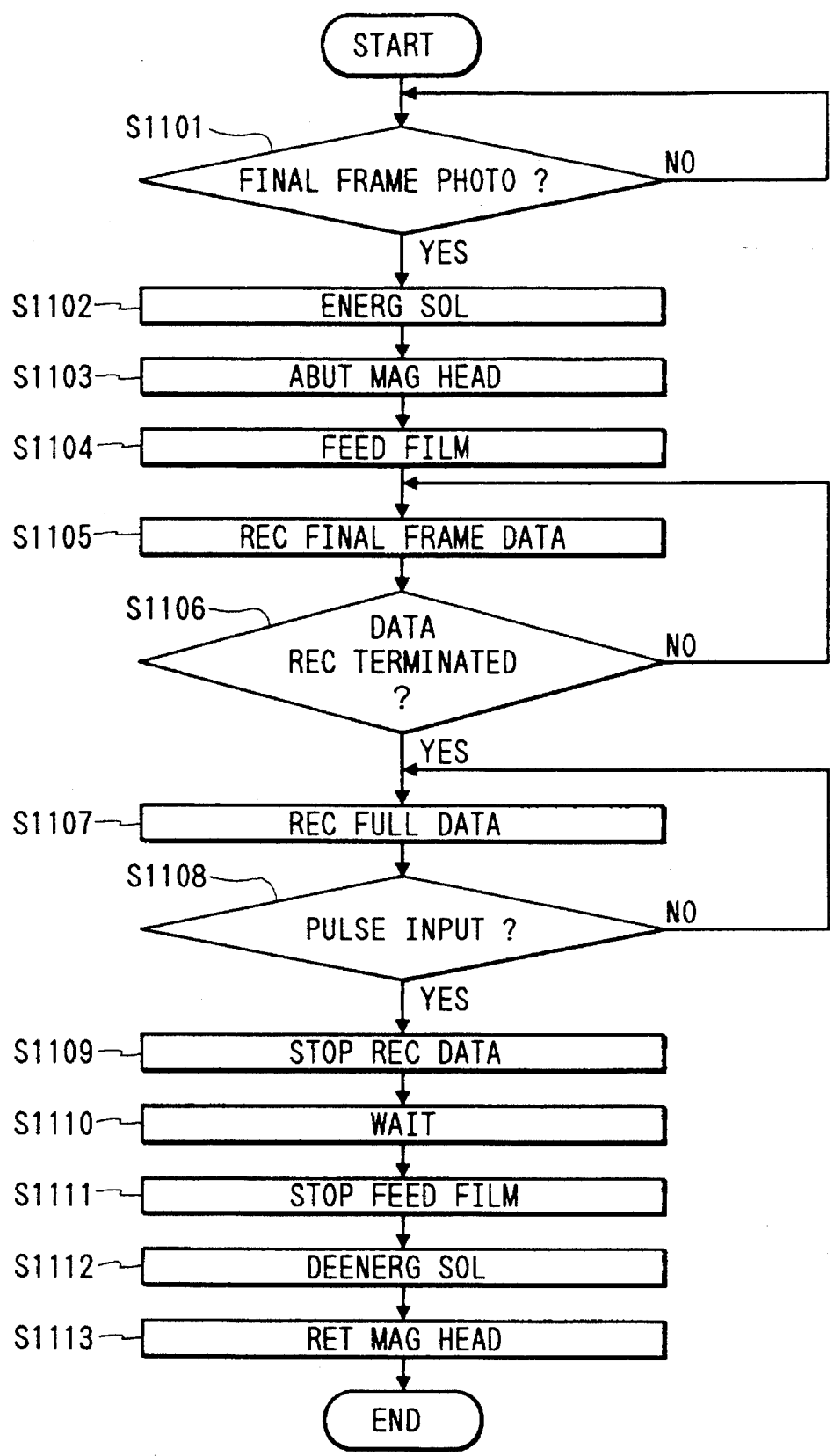
FIGS. 11A to 11D and FIG. 13 are flow charts showing modifications of the processing sequence.

FIG. 11A shows an operation after a photographing operation of the final frame, i.e., a frame closest to a leader portion of the film is completed in the pre-wind type camera.

In step S1101, it is checked if a photographing operation of the final frame is completed. If YES in step S1101, the solenoid 22 is energized to cause the magnetic head 15 to contact the magnetic track 66 in steps S1102 and S1103. Thereafter, the film feed operation is started in step S1104.

In step S1105, information associated with the final photographing frame is recorded. Upon completion of this operation, YES is determined in step S1106, and information associated with one film is recorded in step S1107. Of course, this operation is performed on the information recording track 63 described above. In this case, as described above, the magnetic head 15 successively performs the recording operation without being returned from the film after the information recording operation for the final frame is completed.

In step S1108, it is checked if pulses corresponding to the first perforations are input. If YES in step S1108, the information recording operation is terminated in step S1109. Thereafter, in steps S1110 to S1113, a take-up operation of the film 12 to the cartridge 11 and the return operation of the head 15 from the film 12 are performed.

Figure 11B:
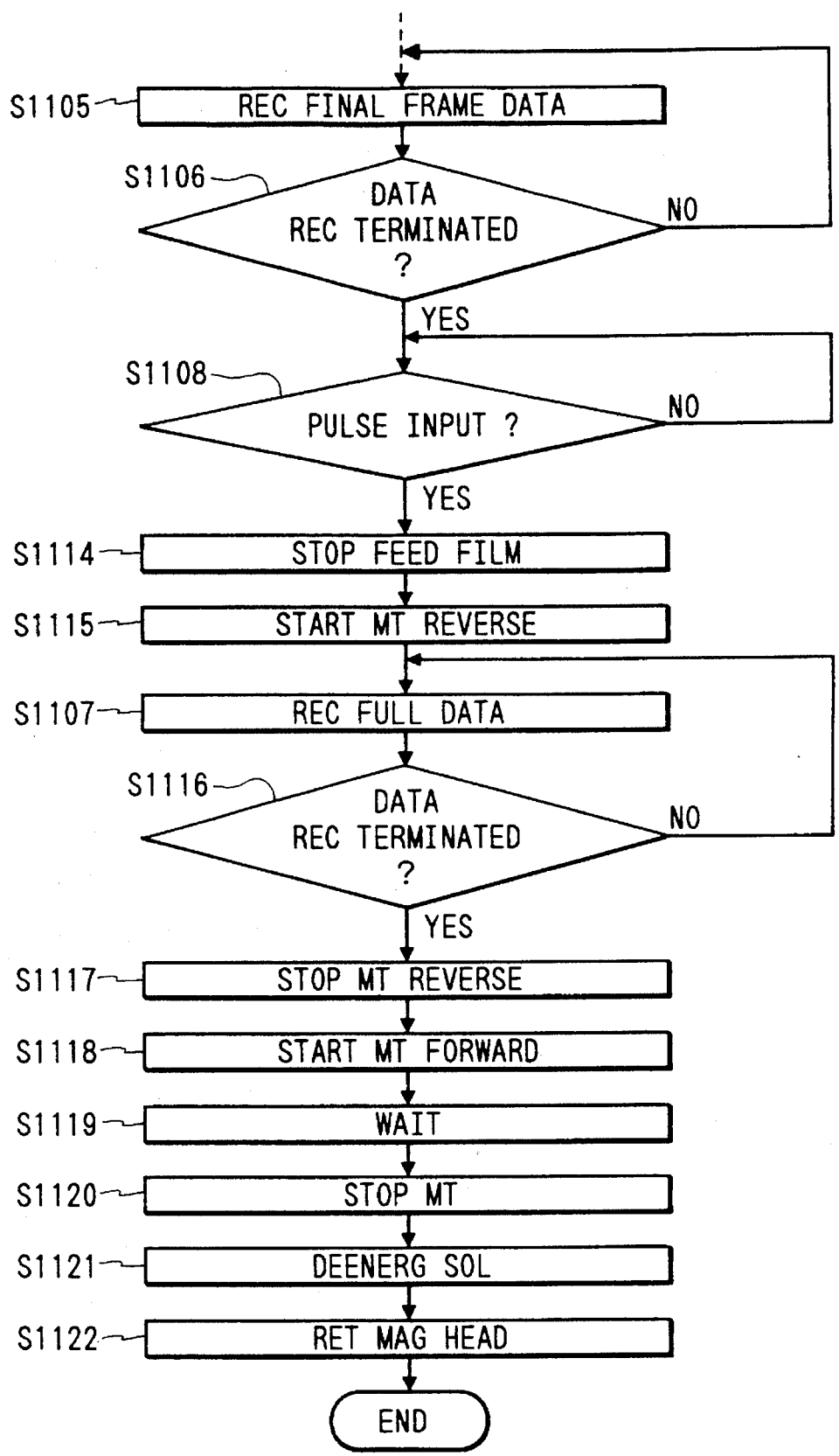

FIG. 11B shows a modification of FIG. 11A.

As the characteristic feature of this modification, information associated with one film is not successively recorded after an information recording operation for the final photographing frame is completed, but is recorded after the head passes the information recording region and a film feed direction is reversed. In this case, assuming that one film is rewound from a certain frame and unloaded without being subjected to photographing operations up to the final frame, information associated with this operation is recorded as information associated with one film. If this film is loaded in the camera again, this information is reproduced and utilized. Thus, this modification pays attention to a reproduction order in this case.

When an information recording operation for the final frame is completed in steps S1105 and S1106, it is checked in step S1108 if pulses indicating that the first perforations 62 for detecting the recording track 63 for recording information associated with one film are detected are input. If YES in step S1108, the film feed operation is stopped in step S1114.

Referring back to FIGS. 6A and 6B and FIG. 7, the first perforations 62 oppose the position 74 of the photointerrupter 14, and as a result, the magnetic head 15 is located at the film leading end side of the recording track 63.

In step S1115, the film feed motor is reversed (in this case, the reversed direction corresponds to the extracting direction from the cartridge), and the magnetic head 15 slides along the recording track 63. In step S1107, information associated with one film (full data) is recorded. Whether or not the information recording operation is terminated may be determined (step S1116) by detecting the second perforations 65 or by detecting the end of recorded information itself.

When the information recording operation is terminated, the reverse drive operation of the motor is stopped in step S1117, and the film feed motor is driven in the forward direction in step S1118. Thus, the film is moved in a direction to be taken up by the cartridge. The operations in steps S1119 to S1122 are the same as those in steps S1110 to S1113 shown in FIG. 11A.

Figure 11C:
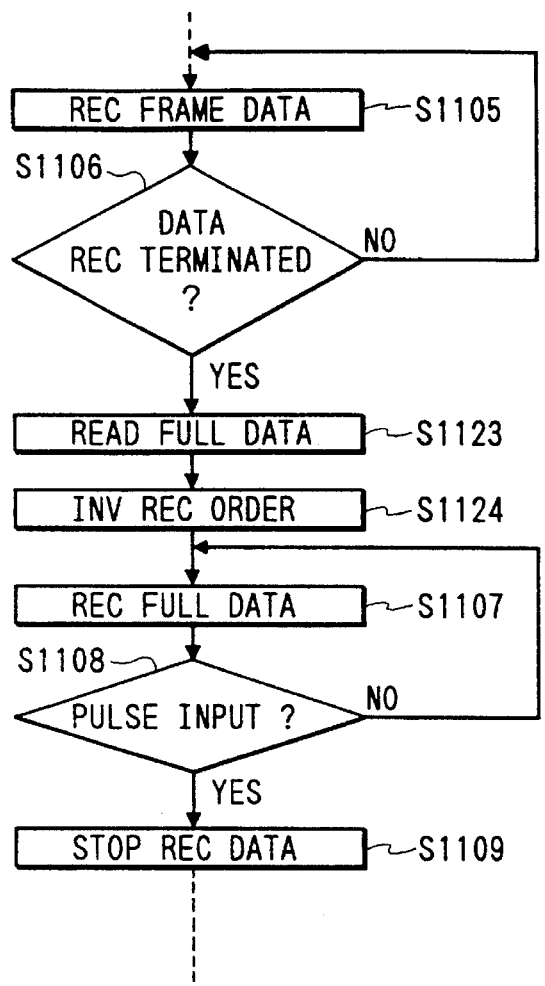

FIG. 11C pays attention to a recording direction of information for one film, i.e., the reproduction order like in the above modification.

In FIG. 11B, a film moving direction is changed before recording, thereby setting a recording direction convenient for reproduction. In this modification, however, information itself to be recorded is reordered to attain the above object.

When a recording operation of information associated with the final photographing frame is terminated in steps S1105 and S1106, full data to be recorded (information loaded immediately after the film is loaded, and stored in the CPU) is read in step S1123, and the recording order of the read data is inverted in step S1124. Thereafter, in steps S1107 to S1109, the inverted data is recorded. This operation is the same as that described above, and a detailed description thereof will be omitted.

In this manner, when reordered information is recorded while rewinding the film 12, the information can be reproduced while extracting the film 12 when the film is loaded again.

Figure 11D:
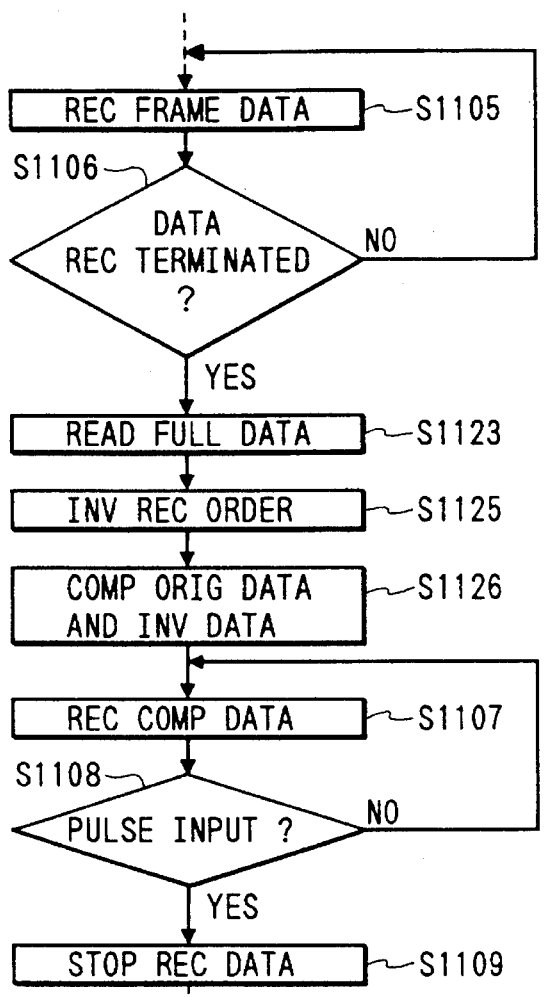
Figure 12:
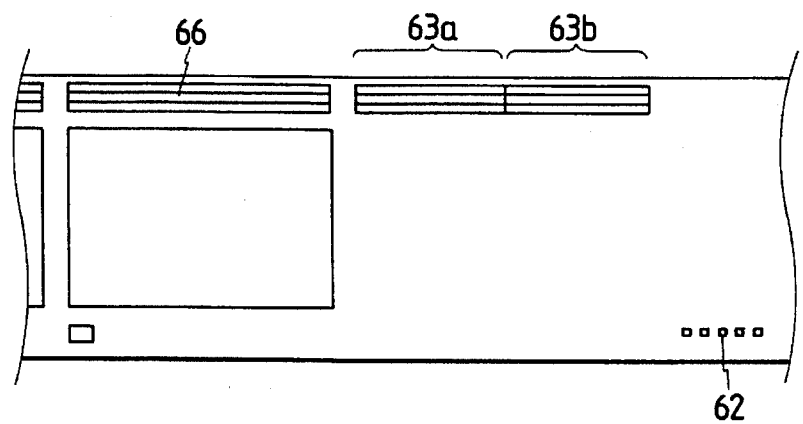
FIG. 12 is a schematic view showing a modification of the film.

FIGS. 11D and 12 show another modification paying attention to a recording order. In this modification, recorded information can be reliably reproduced by the camera regardless of a film moving direction.

As shown in FIG. 12, a recording track 63 of this modification is divided into regions 63a and 63b, and these regions can record full data. The region 63a is arranged to be able to be reproduced from the left side, and the region 63b is arranged to be able to be reproduced from the right side.

In FIG. 11D showing a processing sequence, when the information recording operation of the final photographing frame is terminated in steps S1105 and S1106, full data is read in step S1123 like in the above modification. In step S1125, data obtained by inverting the read data is formed. In step S1126, these data are respectively recorded on the regions 63a and 63b of the magnetic track 63. Thus, information can be reproduced regardless of the moving direction of the film 12.

Figure 13:
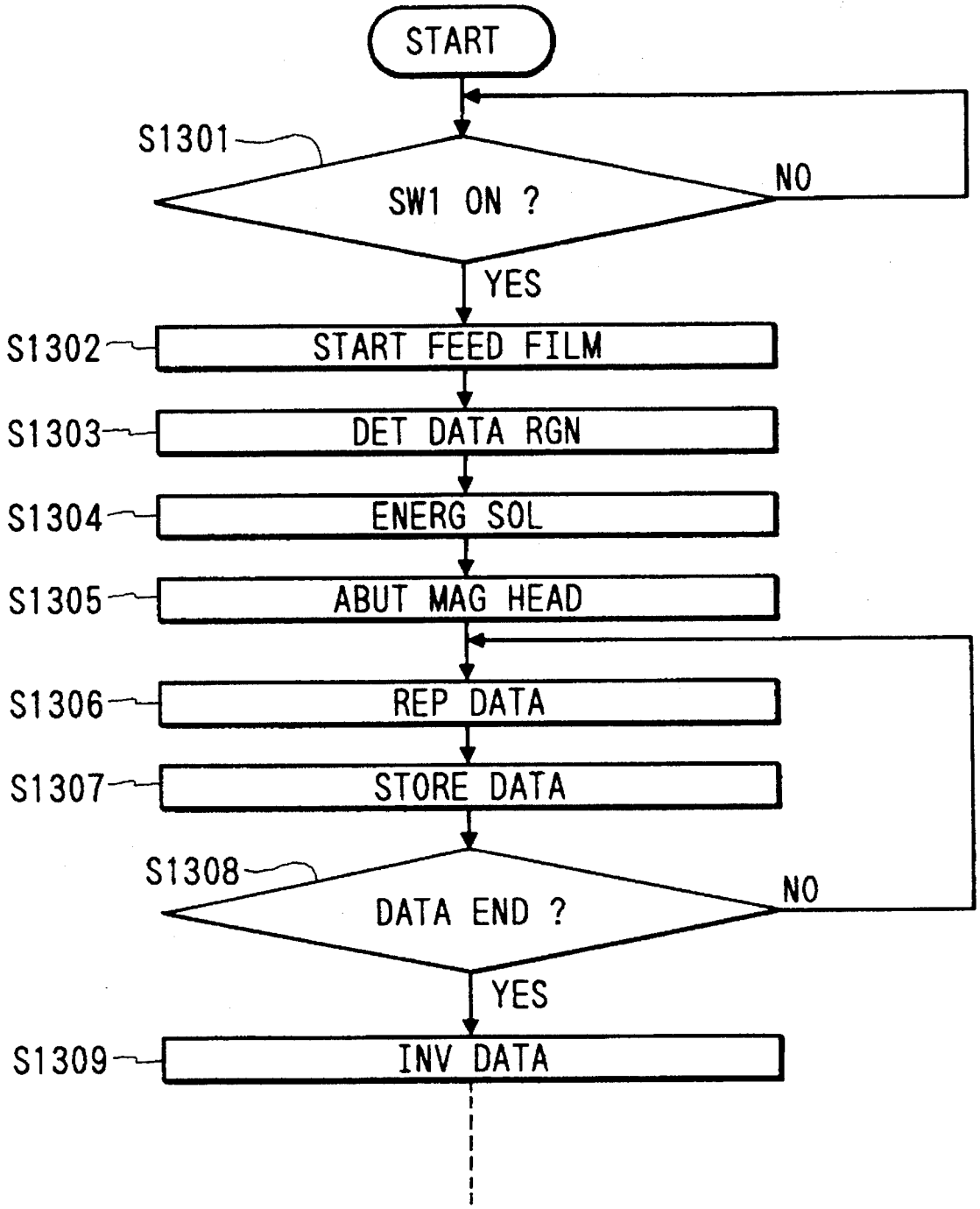

FIG. 13 shows still another modification. In this modification, a recording direction of full data is determined in one direction, e.g., the same direction as information of each photographing frame in a pre-wind type camera, and a camera copes with this during reproduction.

In step S1301, the control waits for an ON event of the switch SW1 which is turned on when a cartridge cover is closed. If YES in step S1301, a film feed operation is started in step S1302. Thereafter, an information recording region is detected, and the head is brought into contact with the film to reproduce information. Upon completion of reproduction of the information, the order of the reproduced information is inverted in the camera in step S1309 to obtain a correct order.

Still another embodiment of the present invention will be described below with reference to FIGS. 14 to 16.

In this embodiment, whether a loaded film is a new one in which none of frames are subjected to a photographing operation (to be referred to as an unused film hereinafter) or one in which at least one frame is subjected to a photographing operation (to be referred to as a used film hereinafter) is discriminated, and processing is performed in accordance with the discrimination result.

Figure 14:
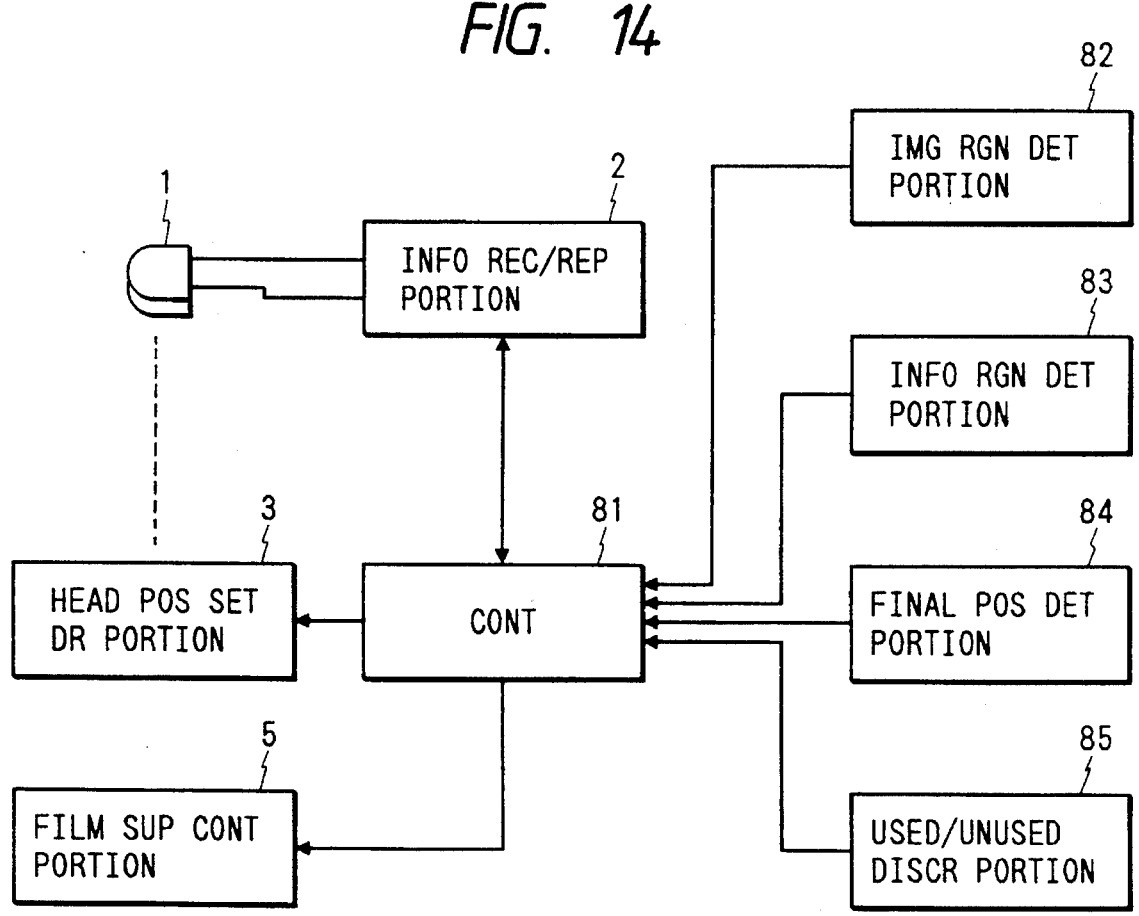

In FIG. 14 showing the principle of this embodiment, a used/unused discrimination portion 85 discriminates whether a loaded film is a used or unused film, and inputs a discrimination result to a control portion 81. The control portion 81 controls a head position setting/driving portion 3 in accordance with the input discrimination result.

The overall arrangement of this embodiment is the same as that shown in FIG. 2, and this embodiment employs the film 12 shown in FIGS. 3A and 3B. Furthermore, when a partially photographed film is rewound, information indicating to which frame photographing operations have been completed is recorded on the magnetic track 36.

Figure 15:
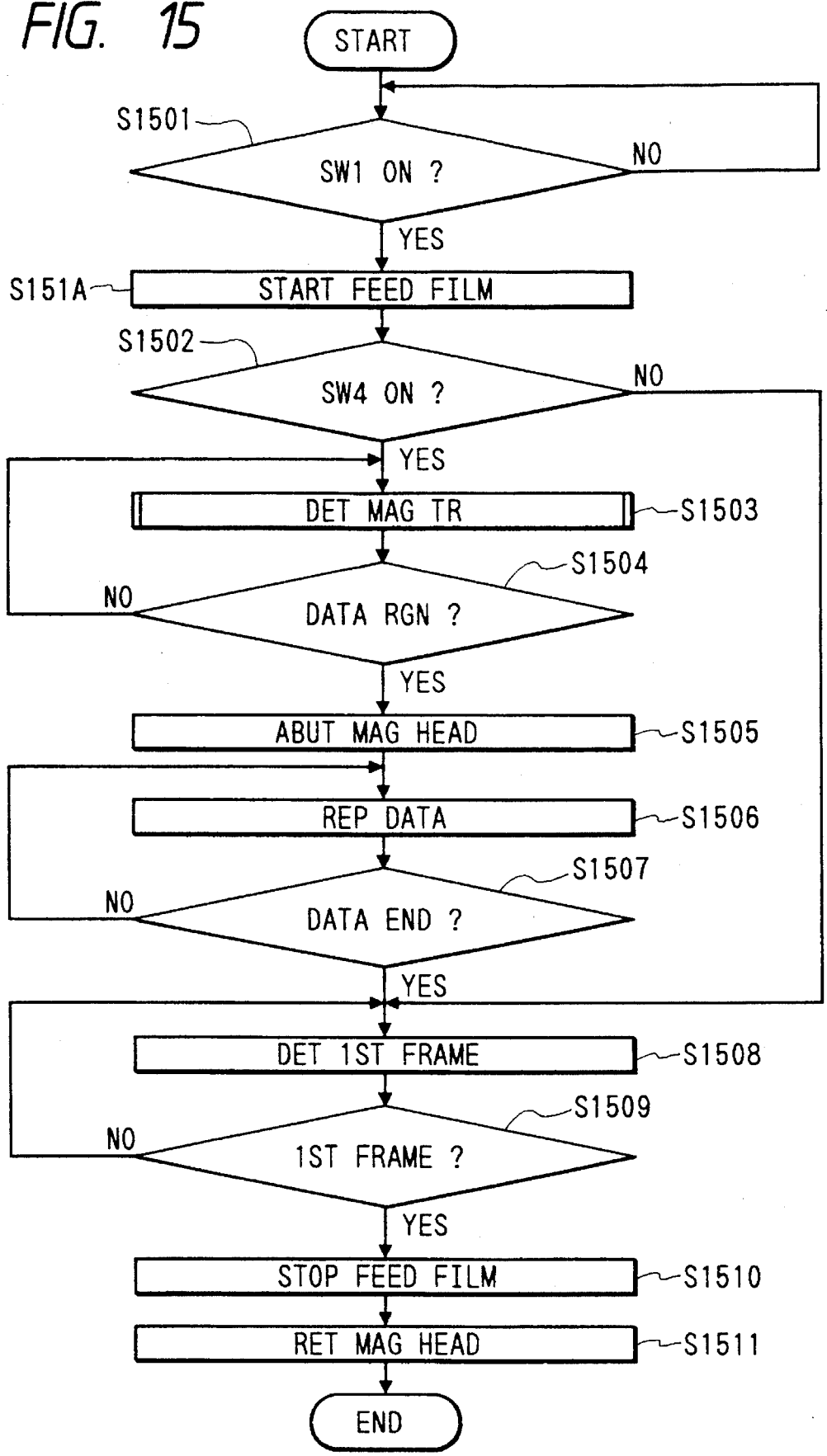
Figure 16:
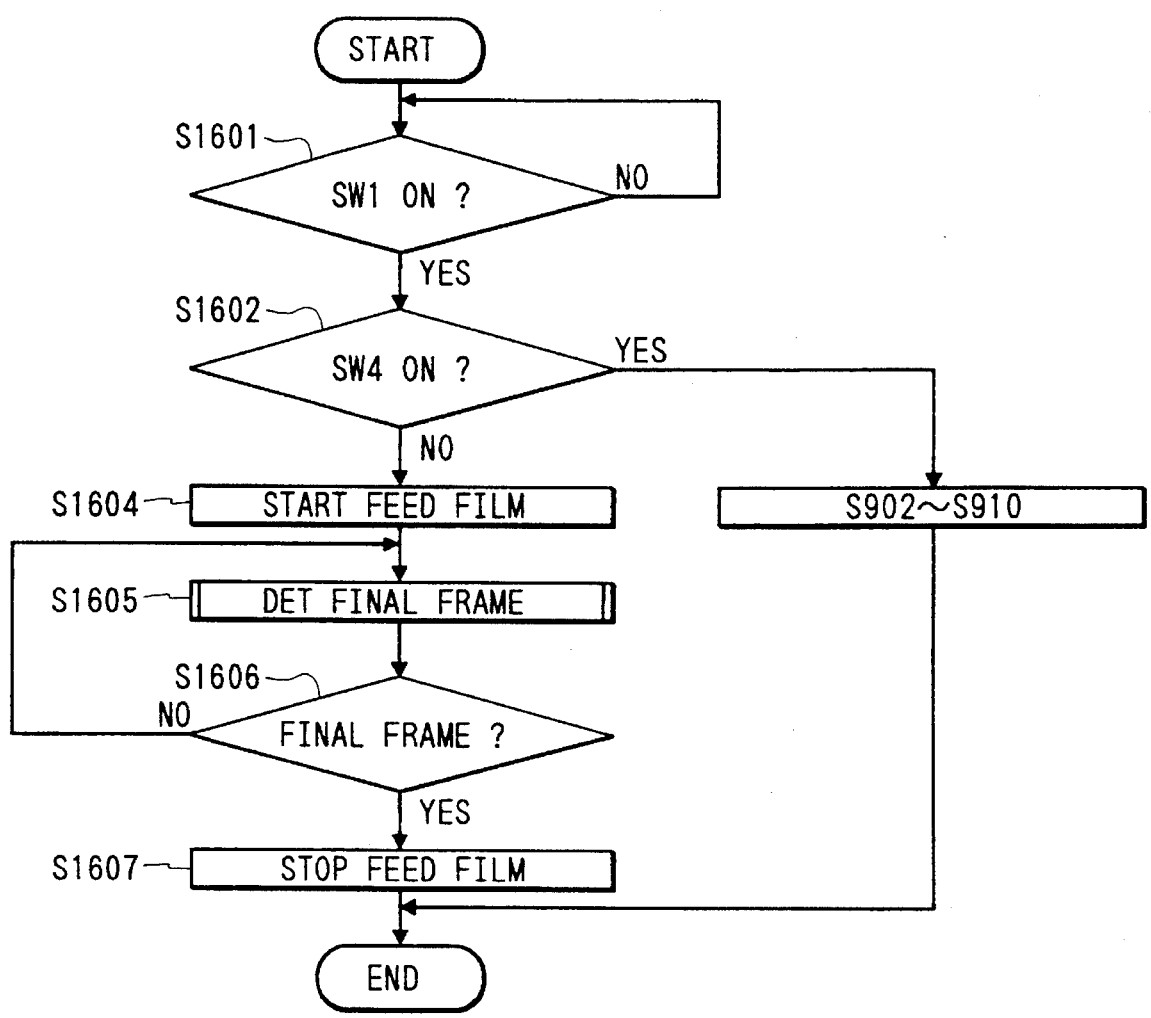

FIGS. 15 and 16 show processing sequences in the film feed operation immediately after the film is loaded. The sequence in FIG. 15 is premised on a standard wind-up system, and the sequence in FIG. 16 is premised on a pre-wind system.

In FIG. 15, when the cartridge 11 is loaded in the camera and a rear cover is closed, the switch SW1 is turned on, and YES is determined in step S1501. In step S1501A, a feed operation of the film 12 is started. It is checked in step S1502 if a switch SW4 (FIG. 2) is ON. The switch SW4 is turned on by a user when the loaded film 12 is a used film. If this switch is OFF, it is determined that the film 12 is an unused film, and the flow advances to step S1508; otherwise, it is determined that the film 12 is a used film, and the flow advances to step S1503.

In another embodiment, the switch SW4 is not a manual switch described above, but is turned on/off by the camera. For this purpose, when an unused film is loaded, information indicating that this film is loaded is recorded on, e.g., a cartridge. When a film is loaded, if this information is recorded, it can be determined that the loaded film is a used film, and the switch SW4 is turned on; otherwise, it can be determined that the loaded film is an unused film, and the switch SW4 is turned off.

In step S1503, pulse signals from the photointerrupter 14 are counted to detect the magnetic track 36 (FIGS. 3A and 3B) as in the above embodiment. When the magnetic track 36 is detected, i.e., when the film 12 is fed to a position where the magnetic head 15 opposes the leading end of the magnetic track 36, YES is determined in step S1504, and the flow advances to step S1505. In step S1505, the solenoid 22 is driven to cause the magnetic head 15 to abut against the magnetic track 36. In steps S1506 and 1507, information is reproduced until the trailing end of the magnetic track 36 is reached.

After the information is reproduced, the film 12 is kept fed. In step S1508, pulse signals from the photointerrupter 14 are counted to detect the first frame. When the first frame is detected, YES is determined in step S1509, and the feed operation of the film 12 is stopped in step S1510. In step S1511, the magnetic head 15 is returned, thus ending processing.

According to this embodiment, when a loaded film is a used film, the magnetic head 15 abuts against the magnetic track 36 to reproduce information indicating to which frame photographing operations have been performed. Thereafter, the film is fed based on the reproduced information until the proximal frame of an unexposed portion opposes the aperture. On the other hand, when a loaded film is an unused film, since a photographing operation is started from the first frame, the information need not be reproduced. Therefore, the magnetic head 15 does not abut against the magnetic track 36, and no information is reproduced. More specifically, the magnetic head 15 abuts against the magnetic track 36 only when information need be reproduced.

FIG. 16 shows a sequence suitable for a pre-wind type camera.

In FIG. 16, when the film 12 is loaded in the camera, the switch SW1 is turned on, and YES is determined in step S1601. In step S1602, an ON/OFF state of the switch SW4 is determined. If YES in step S1602, it is determined that the film 12 is a used film, and the same processing operations as in steps S902 to S910 shown in FIG. 9 are executed; otherwise, it is determined that the film 12 is an unused film, and the flow advances to step S1604.

In step S1604, a feed operation of the film 12 is started. In step S1605, output pulses from the photointerrupter 14 are counted to detect the final frame (first frame in the pre-wind system). If the final frame is detected, YES is determined in step S1606, and the feed operation of the film 12 is stopped in step S1607.

More specifically, in the same manner as in FIG. 15, when a loaded film is a used film, the magnetic head 15 abuts against the magnetic track 36 to reproduce information to which frame photographing operations have been performed; when it is an unused film, no reproduction of information is performed.

Figure 17:
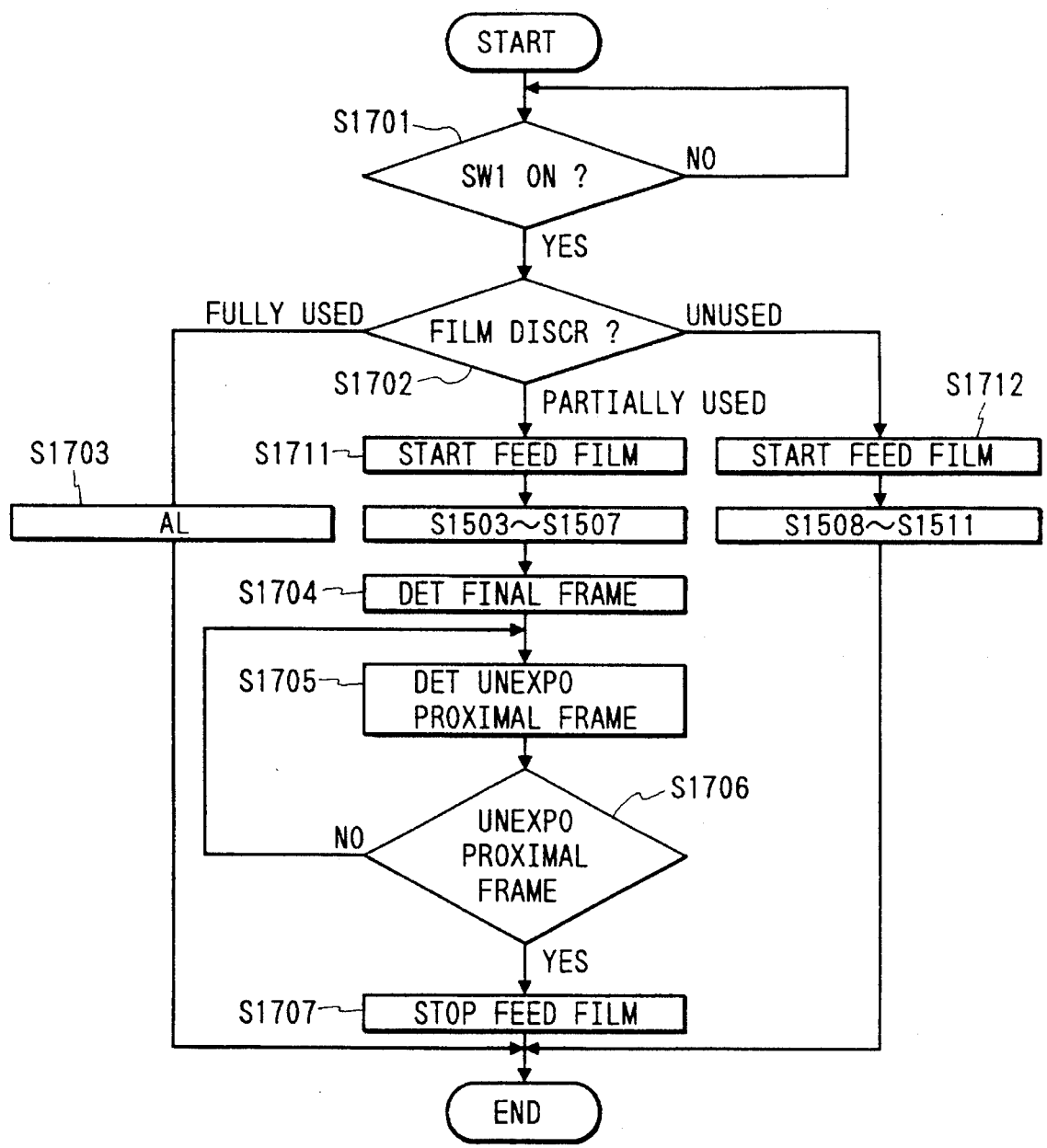
Figure 18:
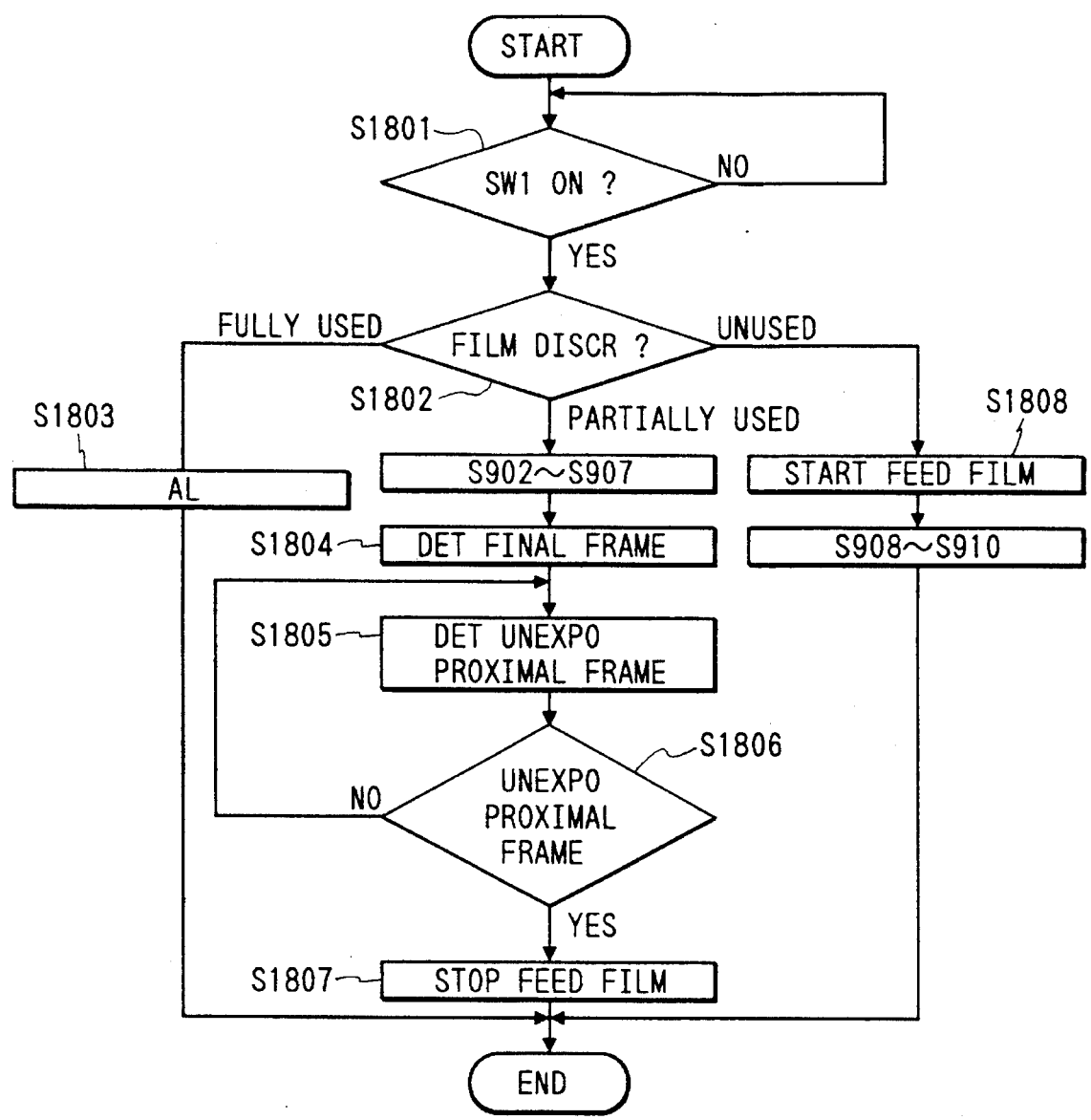

FIGS. 17 and 18 show processing sequences of other modifications. In these embodiments, in addition to discrimination of a used or unused film, when a loaded film is a used film, it can be also discriminated whether the used film is a fully used film, i.e., no photographable frames remain, or it is a partially used film, i.e., frames are partially photographed, and photographable frames still remain. Then, processing is performed according to a discrimination result.

In FIG. 17, this sequence exemplifies a standard wind-up system. When a film is loaded, YES is determined in step S1701, and it is discriminated in step S1702 whether the film is a fully used film, a partially used film, or an unused film. This discrimination operation may be performed based on, e.g., an operation state of a manual switch (not shown) which can be switched among three positions, or based on a content recorded on a cartridge using the switch which can be switched among three positions, as described above.

If a fully used film is detected, an alarm message indicating that there are no photographable frames is generated by, e.g., an alarm device (not shown) in step S1703. Thereafter, processing is ended.

If a partially used film is detected, the film feed operation is started in step S1711. Then, the same processing operations as in steps S1503 to S1507 shown in FIG. 15 are executed, and if YES in step S1507, the flow advances to step S1704. In step S1704, the final photographing frame information reproduced from the magnetic track 36 in step S1506 is read out. In step S1705, output pulses from the photointerrupter 14 are counted to detect a frame next to the final photographing frame, i.e., a proximal frame of an unexposed portion. When the proximal frame of the unexposed portion is detected in step S1706, i.e., when this frame opposes the aperture, the feed operation of the film 12 is stopped in step S1707, thus ending processing.

Furthermore, if an unused film is detected in step S1702, the film feed operation is started in step S1712. Thereafter, the same processing operations as in steps S1508 to S1511 are executed, so that the first frame opposes the aperture, thus ending the processing.

FIG. 18 exemplifies a case wherein the present invention is applied to the pre-wind system. In steps S1801 and S1802, the same processing operations as in steps S1701 and S1702 described above are executed. If a fully used film is detected in step S1802, an alarm is generated in step S1803 in the same manner as described above. If a partially used film is detected in step S1802, after the same processing operations as in steps S902 to S907 (FIG. 9) are executed, the final photographing frame information is read out in step S1804. In step S1805, a proximal frame of an unexposed portion is detected. If it is determined in step S1806 if the proximal frame opposes the aperture, the film feed operation is stopped in step S1707, thus ending processing. In this case, since the pre-wind type camera is assumed, the proximal frame of the unexposed portion corresponds to a frame on the leading end side of the film by one frame from the final photographing frame.

If an unused film is detected in step S1802, the feed operation of the film is started in step S1808, and the same processing operations as in steps S908 to S910 (FIG. 9) are executed, thus ending processing.

In the above embodiments, the motor 23 and the motor drive circuit 26 constitute a film feed means, the photointerrupter 14, the photo/electric conversion circuit 28, and the CPU 24 constitute a detection means, the switch SW4 and the CPU 24 constitute an identification means, the solenoid 22, the solenoid drive circuit 25, and the CPU 24 constitute a drive control means, and the magnetic head drive circuit 27 and the CPU 24 constitute an information recording/reproducing means, respectively.

In the above embodiments, the shaft of the cartridge is rotated to extract a film. However, the present invention is applicable to a conventional camera which rotates its take-up spool to drive a film.

According to the present invention, a region of a film where a magnetic recording medium is arranged is detected, and a use state of the film is discriminated, so that a magnetic head is brought into contact with the recording medium based on the detection result and the discrimination result. Therefore, only when the magnetic head is located at a predetermined position and information need be recorded or reproduced, the magnetic head can be brought into contact with the film. Therefore, degradation in characteristics of the magnetic head can be minimized. In addition, when a film is extracted by rotating the shaft of the cartridge, the magnetic head does not disturb the film extraction operation.

Figure 24A:
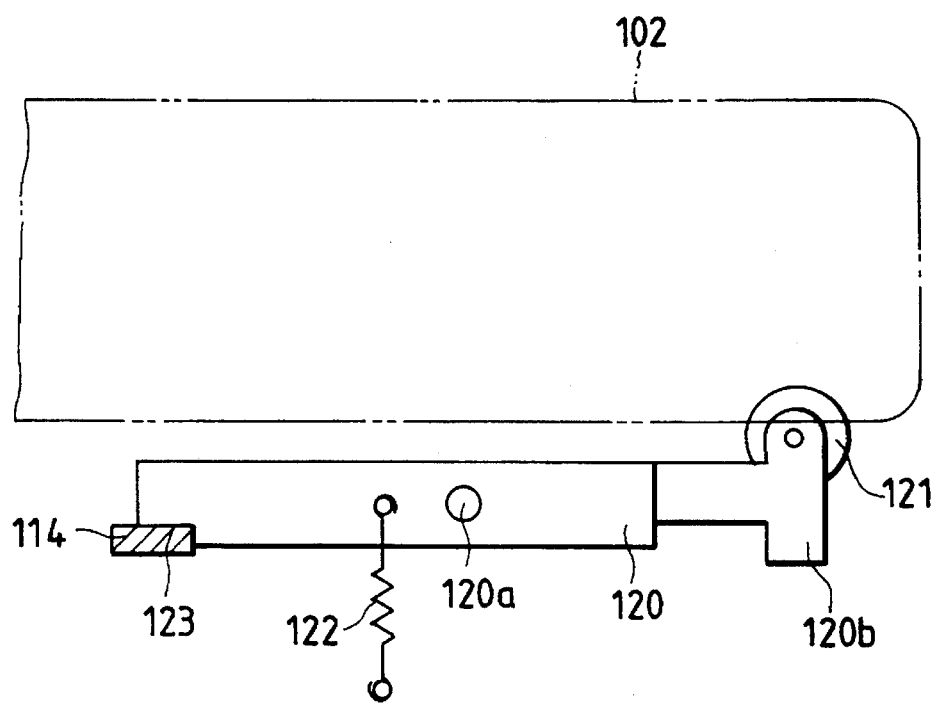
FIGS. 24A and 24B are schematic front views for explaining motion of a film detection lever.
Figure 24B:
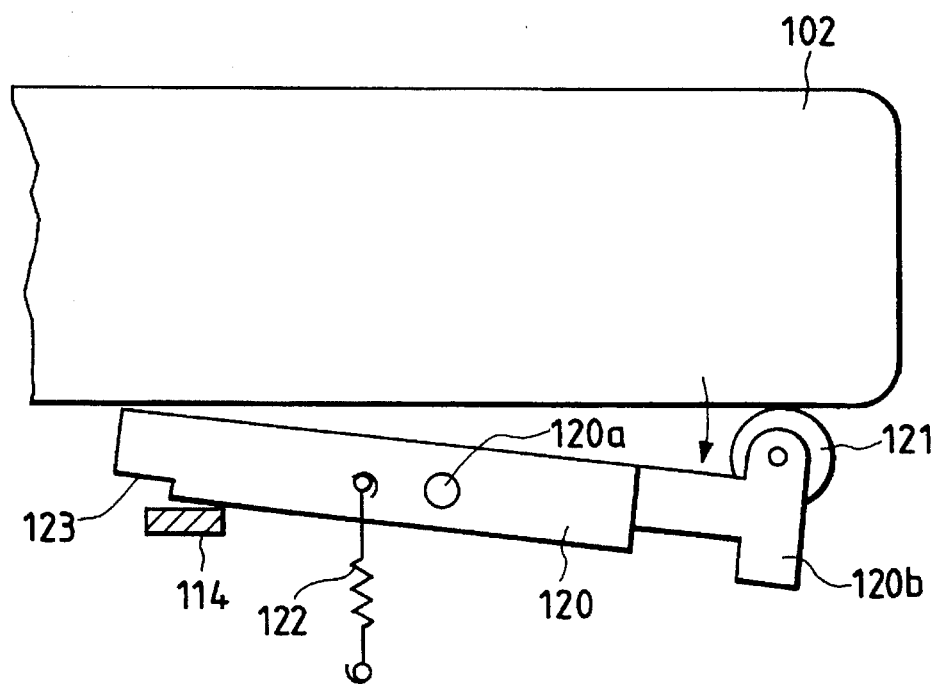
Figure 25:
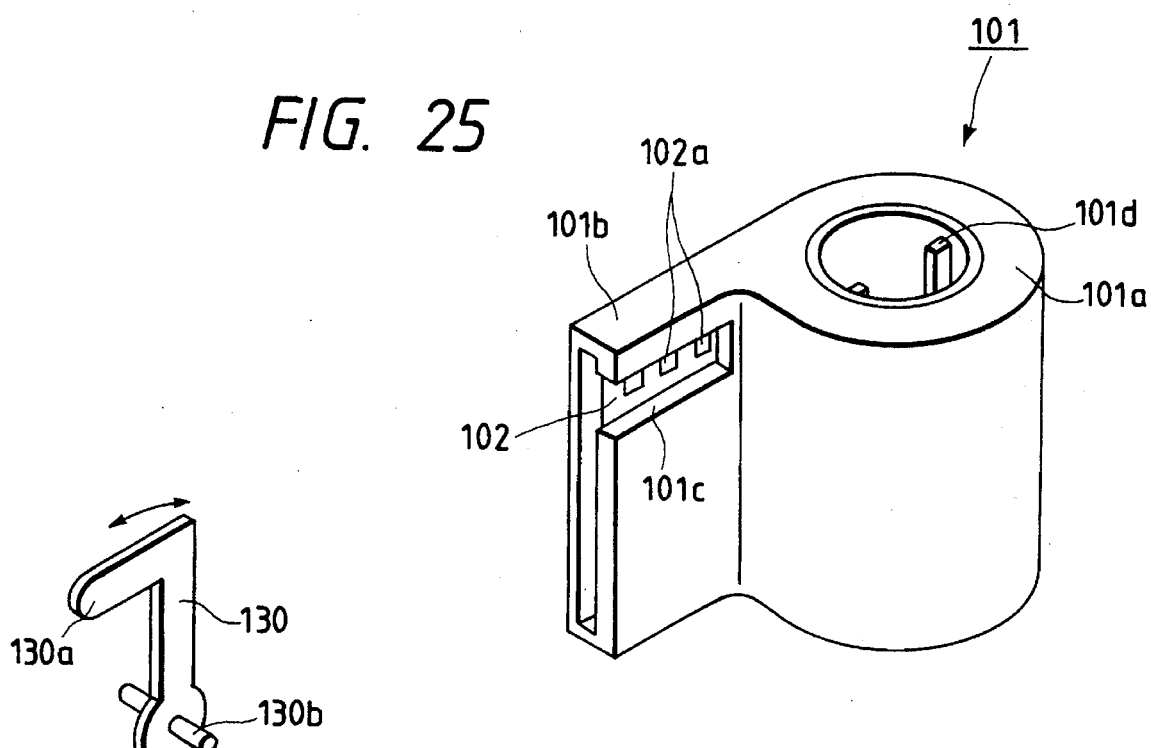

FIGS. 19 to 25 show an embodiment of an information recording/reproduction apparatus for a camera according to the present invention. In this embodiment, a case will be described below wherein a film patrone 101 is employed, and a film feed device (not shown) for performing the following feed operation is adopted. That is, as shown in FIG. 25, in a film feed portion 101b, extending from a cylindrical portion 101a having a spool shaft of the film patrone 101 in a tangential direction, for storing a leading end portion of a film in a linear state, a sprocket in a camera main body (not shown) is meshed with perforations 102a of a film 102 exposed from an opening portion 101c formed by notching an inner portion of the film feed portion 101b. Upon rotation of the sprocket, the film 102 is fed toward a take-up spool (not shown) via a film path facing an aperture 103 (indicated by an alternate long and two short dashed line in FIG. 19) of the camera main body, and is wound around the spool from the leading end side to be taken up around the outer surface of the spool. Note that FIG. 25 also illustrates a spline 101d for rotating the spool shaft of the film patrone 101 in a rewind direction of the film 102 into the patrone 101.

Figure 19:
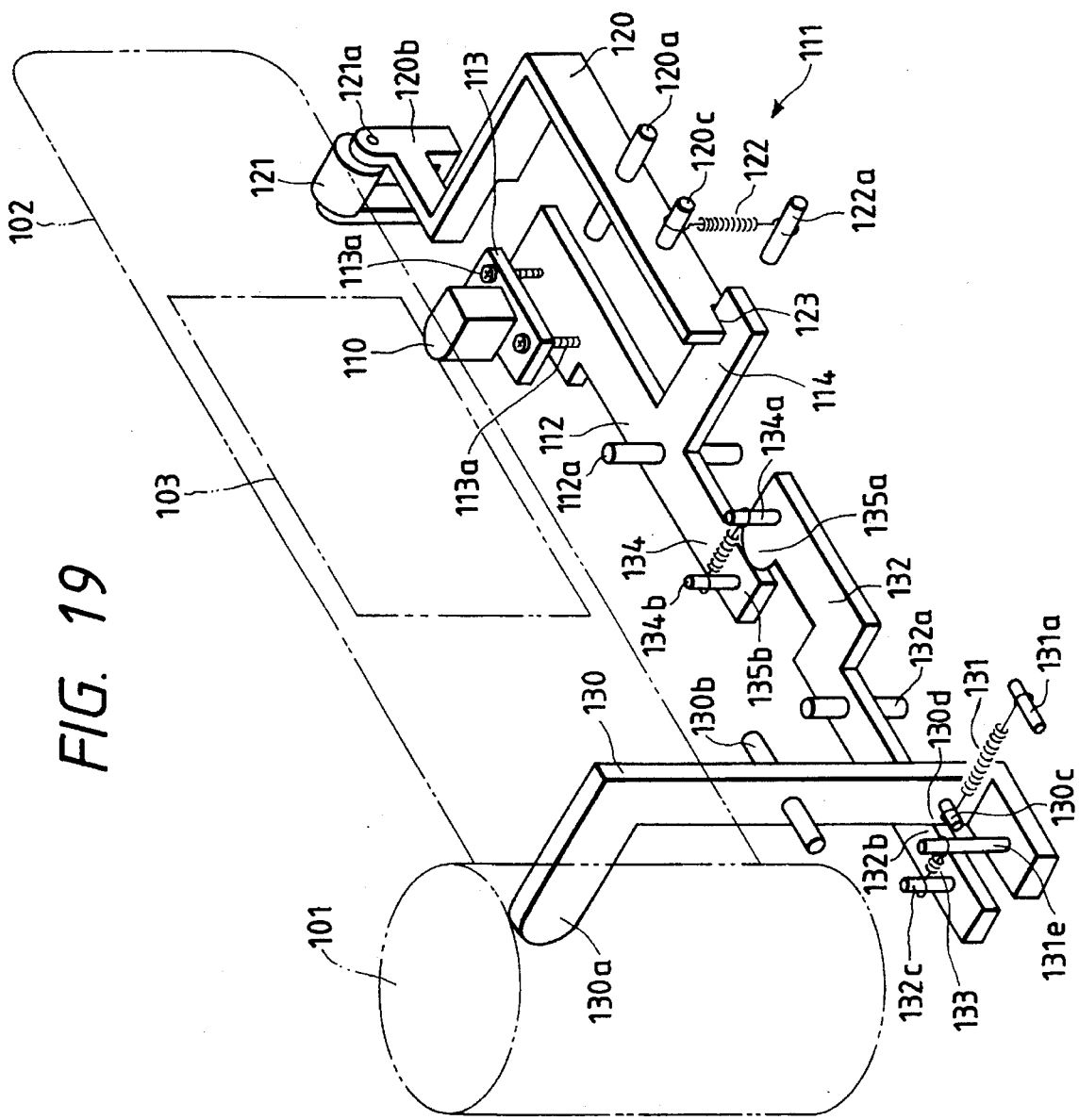

FIG. 19 shows a schematic arrangement of a magnetic head 110 and its moving mechanism 111 as the characteristic feature of the present invention. In FIG. 19, the patrone 101 and the film 102 indicated by alternate long and two short dashed lines are not loaded. Furthermore, FIG. 20 illustrates a state wherein the patrone 101 is loaded, and FIG. 21 shows a state wherein the film 102 is fed from the loaded patrone 101.

Figure 20:
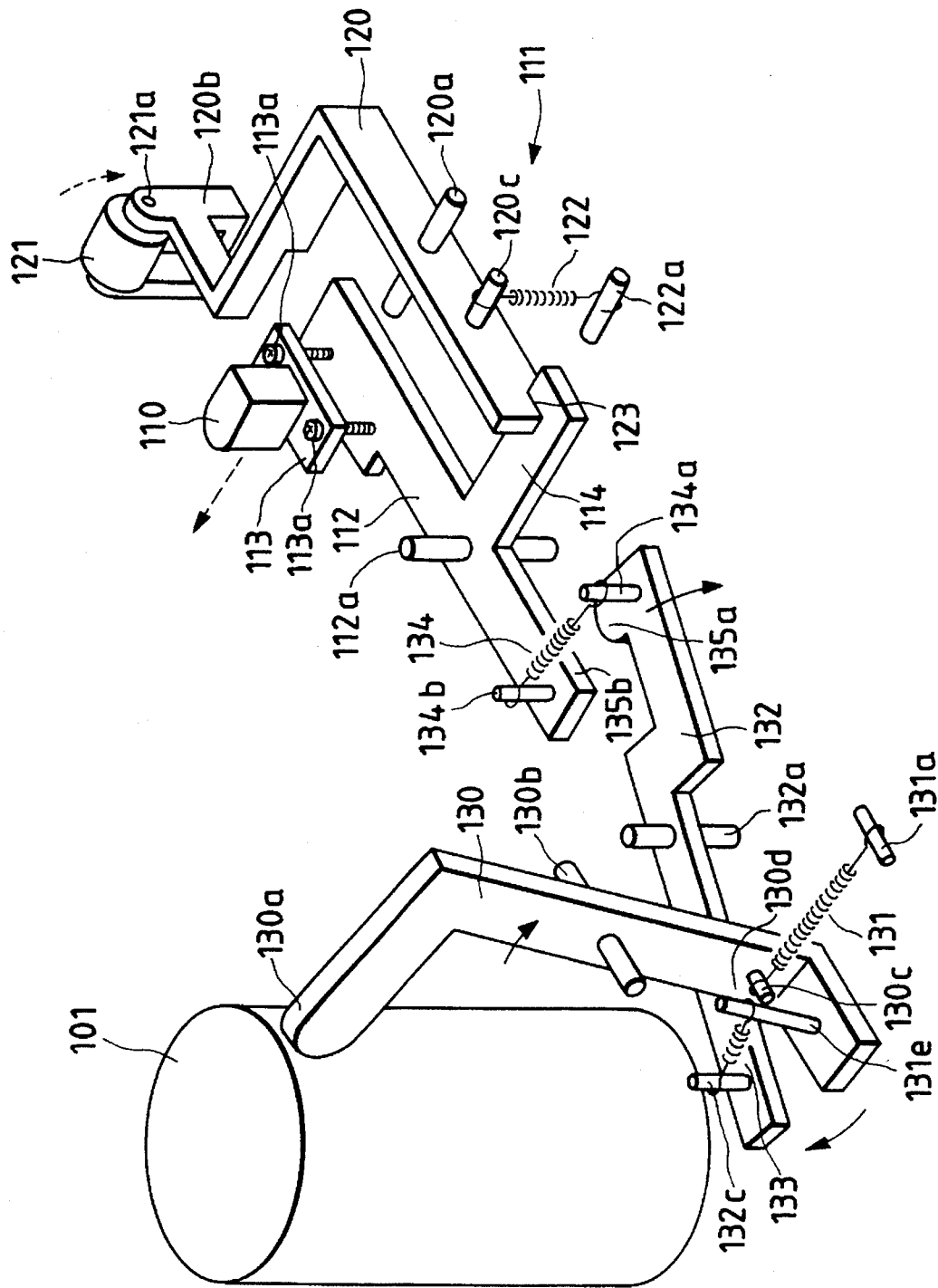
Figure 21:
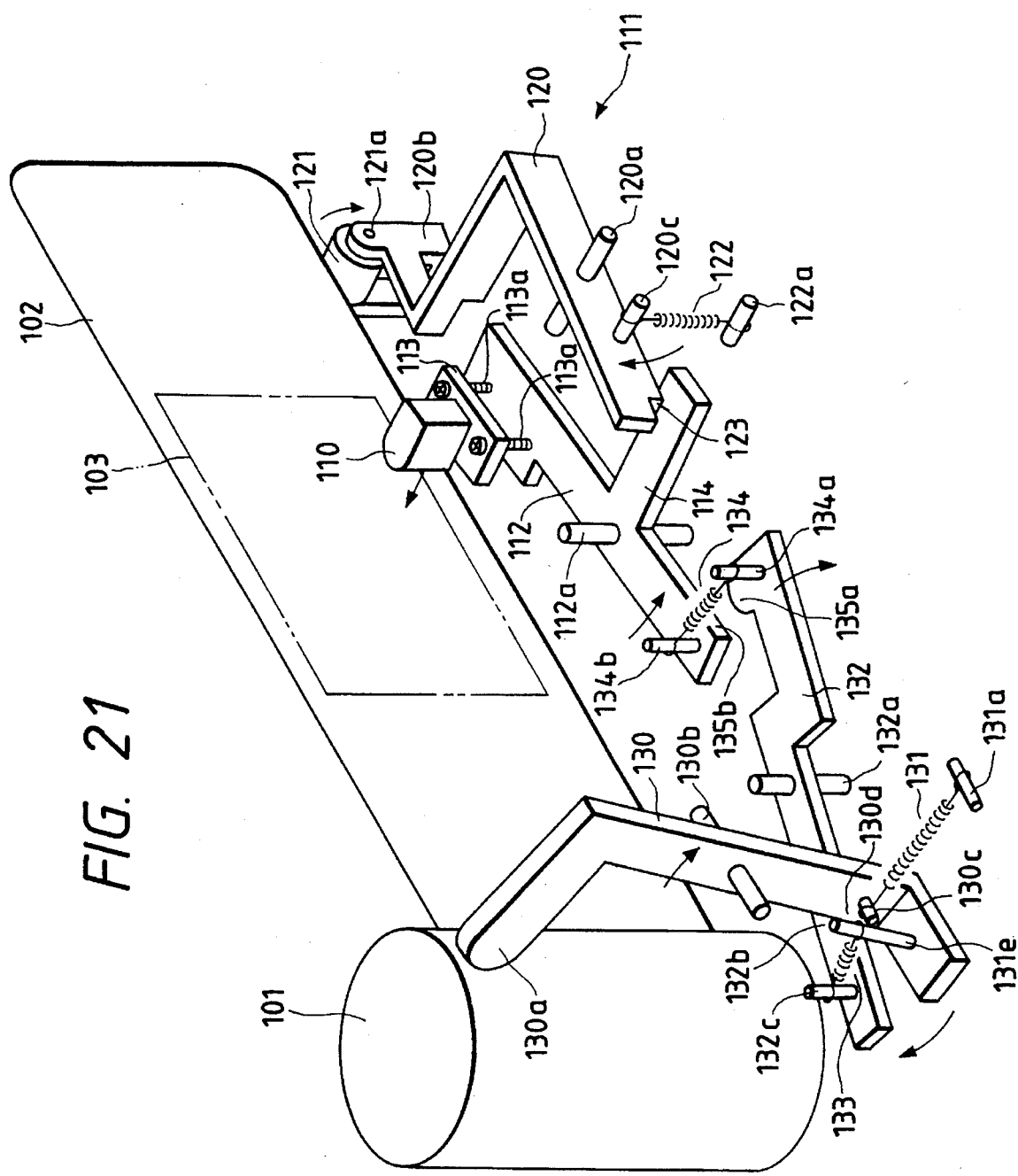

In FIGS. 19 to 21, the magnetic recording head 110 is arranged on a portion adjacent to the aperture 103 corresponding to a prospective photographing frame of the film 102 so as to magnetically record information on a magnetic information recording portion formed on the surface of the film 102 using a magnetic member. The magnetic head 110 is arranged on one end of a head holding lever 112 swingably supported by a support shaft 112a in the camera main body so as to approach or separate from the surface of the film 102 in a direction substantially perpendicular to the surface of the film 102. The head holding lever 112 receives a pivoting force in a direction to urge the magnetic head 110 against the surface of the film 102 from a biasing means (to be described later; a tension spring 134). In FIGS. 19 to 21, a head holding plate 113 holds the magnetic head 110, and fixes it to the lever 112 so that its position can be adjusted. The head holding plate 113 is fixed to the lever 112 by screws 113a.

A film sensor lever 120 is supported on a support shaft 120a to be swingable in a direction parallel to the surface of the film 102. The film sensor lever 120 has a roller holding portion 120b at its one end. The roller holding portion 120b holds a sensor roller 121 serving as a sensor means, engaged with one side edge in the widthwise direction of the film 102, for detecting the presence/absence of the film 102 to be rotatable about a shaft 121a. The film sensor lever 120 is biased by a tension spring 122 bridged between a pin 120c projecting from a portion of the lever 120, and a stationary pin 122a in a direction to insert the sensor roller 121 in a travel path of the film 102, i.e., in a counterclockwise direction in FIGS. 19 to 21. This rotation by the biasing force is restricted by locking a notched portion 123 formed in the other end of this lever 120 and serving as a locking means of the head holding lever 112 with a locking segment 114 extending from a portion of the head holding lever 112. In addition, when the notched portion 123 is engaged with the locking segment 114, movement of the magnetic head 110 on the head holding lever 112 in a direction to be urged against the surface of the film 102 is locked at an escape position. When the film 102 is fed from the patrone 101, passes a portion of the magnetic head 110, and the side edge portion of the film 102 is engaged with the sensor roller 121, the film sensor lever 120 is pushed down, and is pivoted clockwise (FIGS. 19 to 21) against the biasing force of the tension spring 122. The notched portion 123 is then disengaged from the locking segment 114 of the head holding lever 112. As a result, the head holding lever 112 is pivoted counterclockwise (FIGS. 19 to 21) to urge the magnetic head 110 against the film surface.

A patrone sensor lever 130 has an arcuated sensor end 130a for detecting a loading state of the patrone 101 into a patrone chamber (not shown) of the camera main body. The patrone sensor lever 130 is swingably supported by a support shaft 130b, and receives a counterclockwise pivoting force (FIGS. 19 to 21) from a tension spring 131 bridged between a pin 130c projecting from a portion thereof and a stationary pin 131a. The lever 130 is normally biased so that the sensor end 130a is inserted in the patrone chamber. When the patrone 101 is loaded in the patrone chamber, the patrone sensor lever 130 is rotated clockwise (FIGS. 19 to 21) against the biasing force of the tension spring 131, as shown in FIG. 20.

A transmission lever 132 transmits the movement of the patrone sensor lever 130 to the head holding lever 112. The lever 132 is pivotally supported by a support shaft 132a, and has an engaging portion 132b engaged with an engaging portion 130d of the patrone sensor lever 130. Furthermore, a tension spring 133 is bridged between pins 132c and 130e projecting from the transmission lever 132 and the patrone sensor lever 130, so that these levers 132 and 130 are pivoted not to be separated from each other, e.g., to be engaged with and contact each other. When the patrone sensor lever 130 is pivoted clockwise (FIGS. 19 to 21) upon loading of the patrone 101, the engaging portions 130d and 132b of the levers are engaged with each other by a pressing force of the sensor lever 130, thereby rotating the transmission lever 132 clockwise (FIGS. 19 to 21).

The tension spring 134 is bridged between pins 134*a* and 134*b* projecting from the transmission lever 132 and the head holding lever 112, and serves as a biasing means for biasing the head holding lever 112 in a direction to urge the magnetic head 110 against the film surface. With this spring 134, engaging ends 135*a* and 135*b* of these levers 132 and 112 are kept contacting each other, so that these levers 132 and 112 are interlocked with each other.

In the above structure, when the patrone 101 is loaded in the patrone chamber formed in one side of the camera main body, as shown in FIG. 20, the patrone sensor lever 130 is pivoted clockwise (FIGS. 19 to 21) against the biasing force of the spring 131. As can be seen from FIGS. 22A and 22B, the pivoting force of the lever 130 is transmitted to the transmission lever 132, thereby pivoting the transmission lever 132 clockwise (FIG. 20). The transmission lever 132 is moved integrally with the sensor lever 130 while their engaging portions 130*d* and 132*c* are kept in contact with each other by the spring 133. Upon movement of the transmission lever 132, the spring 134 between the head holding lever 112 and the lever 132 is set in a regenerative state since the head holding lever 112 is locked by the notched portion 123 of the film sensor lever 120 and its pivotal movement is restricted. Note that in FIGS. 22A and 22B, a stopper 140 restricts a counterclockwise pivot position of the patrone sensor lever 130.

Figure 23A:
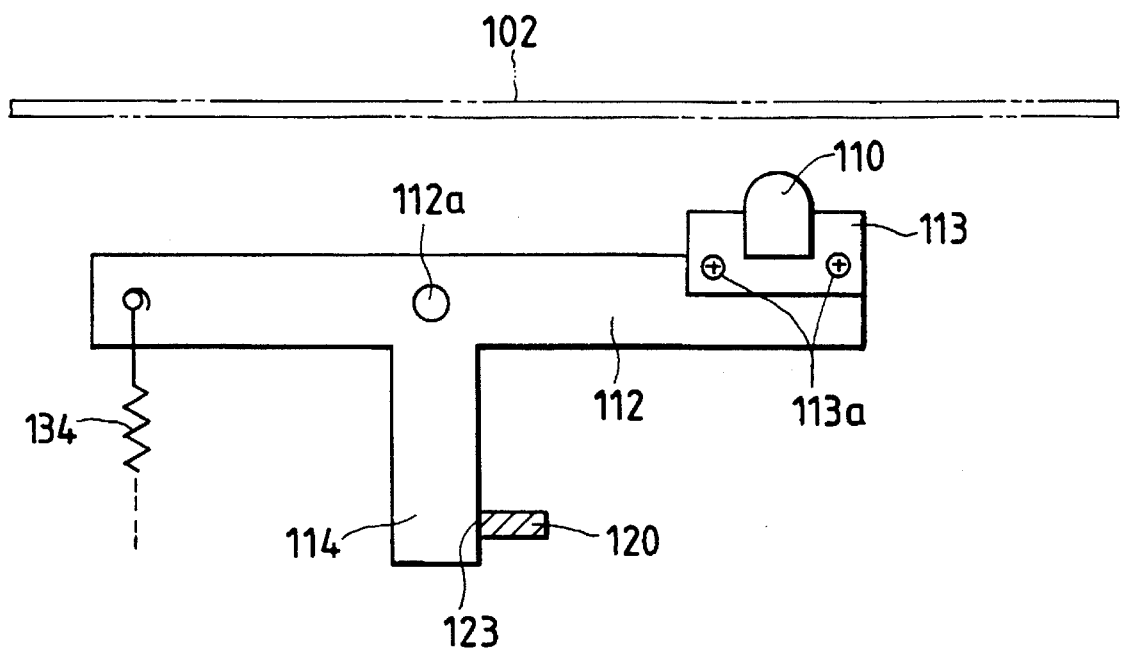
FIGS. 23A and 23B are schematic plan views for explaining movement of a head holding lever.

The head holding lever 112 receives a counterclockwise biasing force from the tension spring 134. In this case, the locking segment 114 of the lever 112 is locked by the notched portion 123 of the film sensor lever 120, and the movement of the lever 112 in a counterclockwise direction, i.e., in a direction to urge the magnetic head 110 against the film surface is restricted. FIG. 23A illustrates this state.

Figure 23B:
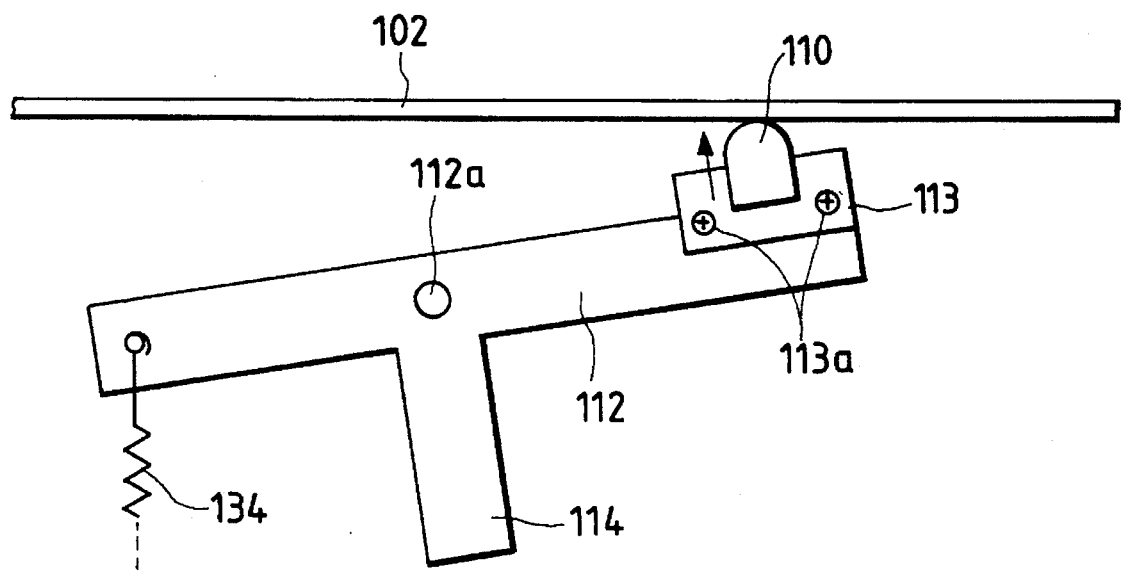

In this state, when the film 102 is fed from the patrone 101, passes a film path corresponding to the magnetic head 110 portion, reaches the sensor roller 121 portion, and pushes down the roller 121 to pivot the film sensor lever 120 clockwise (FIGS. 19 to 21) against the biasing force of the spring 122, as can be seen from FIGS. 24A and 24B, the notched portion 123 is disengaged from the locking segment 114, and the head holding lever 112 is rotated counterclockwise (FIGS. 19 to 21) by the biasing force stored in the spring 134, thereby urging the magnetic head 110 against the film surface. In this manner, magnetic recording (or reading of magnetically recorded information) on the film 102 is allowed. FIG. 23B illustrates this enable state.

Operations of the respective portions performed when the film 102 is taken up into the patrone 101, and the patrone 101 is unloaded from the camera main body in the above-mentioned structure will be described below.

More specifically, when the film 102 is taken up toward the patrone 101, and its leading end passes the sensor roller 121 portion of the film sensor lever 120, a push-down force for the roller 121 from the film 102 is released, and the sensor lever 120 is pivoted counterclockwise (FIG. 21) from a state shown in FIG. 21 by the biasing force of the spring 122. In this case, however, the magnetic head 110 is moved in a direction to be urged against the film 102, and its holding lever 112 is set in a state shown in FIG. 21. Therefore, the pivotal movement of the film sensor lever 120 is restricted halfway by the locking segment 114.

When the film 102 passes the magnetic head 110 and is taken up into the patrone 101, the magnetic head 110 whose pivotal movement is restricted at a predetermined position by the film 102 is further pivoted clockwise (FIG. 21) by the biasing force of the spring 134. In this case, the magnetic head 110 abuts against a pressing pad (not shown), and its pivotal movement is restricted to a small movement. Note that the pressing pad comprises a felt-like member which can be relatively easily deformed. The pressing pad is deformed by the pressing force of the magnetic head 110, so that the magnetic head 110 is brought into tight contact with the film 102.

Figure 22A:
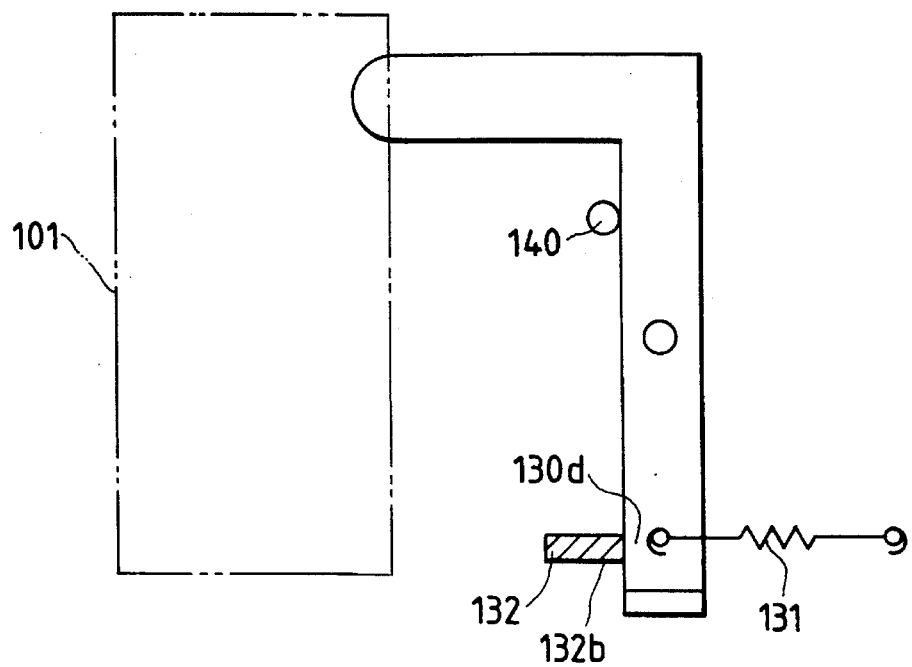
Figure 22B:
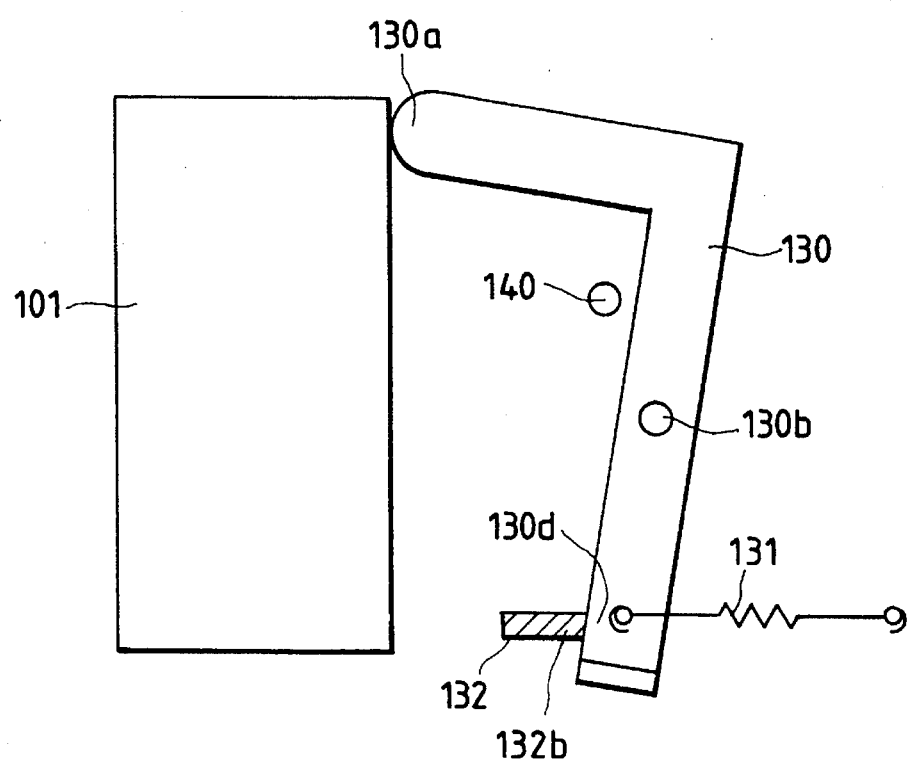

When the patrone 101 is unloaded from the camera main body after the film 102 is completely taken up into the patrone 101, the patrone sensor lever 130 is pivoted and returned to an initial position illustrated in FIG. 19 by the biasing force of the spring 131, and is locked by the stopper 140, as shown in FIG. 22A. The pivot operation of the patrone sensor lever 130 is transmitted to the transmission lever 132 by the spring 133, thus pivoting the lever 132 counterclockwise (FIGS. 19 to 21) from a state shown in FIG. 21 to a state illustrated in FIG. 19. The engaging end 135*a* of the transmission lever 132 is engaged with the engaging end 135*b* of the head holding lever 112, and pivots the head holding lever 112 clockwise (FIGS. 19 to 21), i.e., in a direction to cause the magnetic head 110 to escape from the film path. Furthermore, since the lever 112 is pivoted, its locking segment 114 is located below the notched portion 123 of the film sensor lever 120. In this state, the sensor lever 120 is pivoted counterclockwise (FIGS. 19 to 21) by the biasing force of the spring 122. The notched portion 123 is then locked by the locking segment 114, and the pivotal movement of the lever 120 is restricted and stopped. Thus, the head holding lever 112 side is also locked so that the magnetic head 110 is located at the escape position. This state is illustrated in FIG. 19. Note that the biasing force of the spring 122 described above is set to have a margin enough to further pivot the sensor lever 120 after the notched portion 123 is engaged with the locking segment 114. Thus, a reliable locking state can be assured.

The biasing force of the tension spring 131 is set to be larger than those of the tension springs 133 and 134, and is also set to be large enough to move the sensor lever 130, the transmission lever 132, and the head holding lever 112 from a state shown in FIG. 21 to a state shown in FIG. 19 when the patrone 101 is unloaded. Furthermore, the tension spring 133 has a larger biasing force than that of the tension spring 134, and has a biasing force large enough to return the transmission lever 132 and the head holding lever 112 to the state shown in FIG. 19 when the patrone 101 is unloaded. The tension spring 134 is set to have a biasing force large enough to cause the engaging ends 135*a* and 135*b* of the transmission lever 132 and the head holding lever 112 to be satisfactorily engaged with each other when the pivot operation of the lever 112 is not restricted. The tension spring 122 is set to have a biasing force large enough to apply a rotational force until the locking segment 114 of the head holding lever 112 is satisfactorily locked by the notched portion 123 of the film sensor lever 120.

According to the apparatus of the present invention with the above-mentioned structure, when the film 102 is fed toward the take-up spool, the magnetic head 110 is held at the escape position, and is urged against the film 102 after the film 102 passes. When the film is taken up into the patrone 101, the magnetic head 110 is escaped after the film 102 is completely taken up into the patrone 101. Therefore, when a film patrone of a type for feeding a film from the patrone 101 is used, film travel will not be disturbed by the magnetic head 110 during the feed operation of the film 102.

Figure 26:
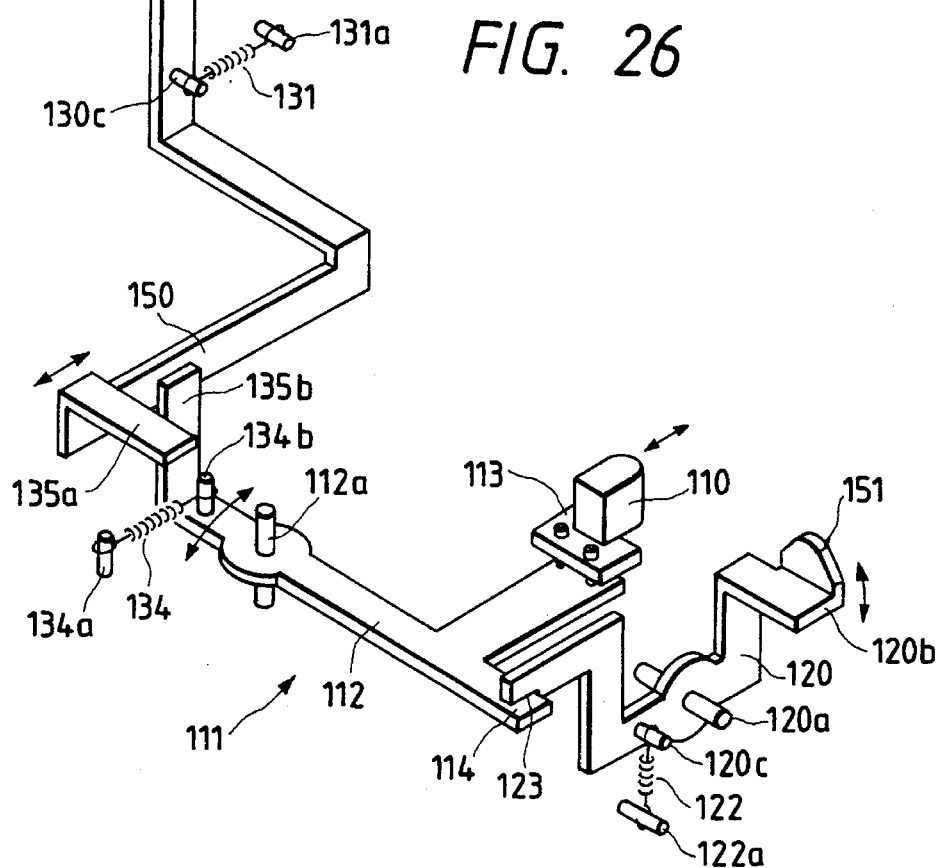

In the above embodiment, since the patrone sensor lever 130 is arranged at the same side as the holding lever 112 for holding the magnetic head 110 (e.g., on a rear lid side in the camera main body), the transmission lever 132 is used. However, if the sensor lever 130 is arranged at a side (e.g., a lens barrel side) opposite to the holding lever 112 to sandwich the film path therebetween, and the engaging end 135a of its distal end portion is engaged with the engaging end 135b of the holding lever 112, as shown in FIG. 26, the transmission lever 132 can be omitted. In this case, the pin 134a for engaging one end of the spring 134 is arranged on a stationary side.

The film sensor roller 121 need only have a structure capable of applying a push-down force to the film sensor lever 120 when the film 102 passes the corresponding portion, and may be replaced with a slidable piece 151, as shown in FIG. 26. In FIG. 26, the same reference numerals denote the same or corresponding parts as in the above-mentioned embodiment, and a structure and effects will be easily understood from the above description.

The present invention is not limited to the structure of the above embodiment, and the shapes and structures of the respective portions may be appropriately modified and changed. For example, in the above embodiment, a case has been exemplified wherein the present invention is applied to an automatic loading type still camera adopting the film patrone 101 which normally stores the leading end of the film 102 in the feed portion 101b, and feeds the film 102 toward the take-up spool in use when the patrone is loaded in the camera main body. However, the present invention is not limited to this. For example, film patrones having various other strictures which feed films from one side of a camera main body toward a take-up spool in use may be desirably used.

In the above embodiment, a biasing means for urging the magnetic head 110 against a film surface is used, and the sensor lever 130 for causing the biasing means to store a biasing force upon loading of the patrone 101 is used. However, various other sensor means capable of detecting a feed operation of the film 102 may be adopted. As a means for moving the magnetic head 110 toward or away from a film surface, various other modifications, e.g., use of a simple slide lever, may be adopted.

Although a description is omitted in the above embodiment, the film passes through a film path as a gap formed by the aperture 103 in the camera main body, a pressing plate (not shown) opposing the aperture, rail portions of the camera main body, for locking upper and lower side edge portions of the pressing plate, and the like. In this case, widthwise movements of the upper and lower side edges of the film are restricted by the rail portions, and restriction in the widthwise direction of the film is also attained by a portion where the sensor roller 121 of the film sensor lever 120 is inserted. Thus, the roller 121 can be pushed down by the side edge of the film 102.

As described above, a magnetic recording apparatus for a camera according to the present invention comprises a magnetic head which is reciprocally arranged from a direction perpendicular to a film surface in a portion adjacent to an aperture located midway along a film path through which a film fed from the patrone loaded in one side of a camera main body travels toward a take-up spool, a locking means for locking movement of the magnetic head in a direction to be urged against the film surface at an escape position, and a sensor means, reciprocally arranged in the film path between the magnetic head and the take-up spool, for detecting a leading end of the film, releasing the locked state by the locking means, and urging the magnetic head against the film surface. Therefore, although a simple structure is employed, the magnetic head which is normally urged against the film surface is locked at an escape position by the locking means during, e.g., an automatic loading operation for feeding the film from the patrone toward the take-up spool. When it is detected that the film passes the magnetic head portion, the locked state is released, and the magnetic head is urged against the film surface, thus setting a magnetic recording enable state. When the film is fed from the patrone side toward the take-up spool, the magnetic head will not disturb this operation, and a reliable film feed state can be attained, thus providing various effects.

According to the present invention, a biasing means for urging the magnetic head against the film surface, and a detection means for detecting loading of the patrone into the camera main body are arranged. Since the biasing means stores a biasing force by the detection operation of this detection means, the reciprocal movement of the magnetic head with respect to the film surface can be performed by only a mechanical means, and no electrical means are required at all.

An arrangement for bringing the magnetic head into contact with a film in response to an ON event of a half-depression switch has already been described. In this arrangement, an excessive load is applied when the half-depression switch is depressed, and the half-depression switch cannot be depressed with a light touch, resulting in poor operability. Addition of a means for actuating an actuator such as a solenoid described above leads to poor economy, and disturbs reduction in size of a camera.

In order to solve the above problem, a magnetic recording/reproduction apparatus for a camera according to another embodiment of the present invention comprises a head drive portion for causing a magnetic head to abut against or return from a film, a setting portion which is moved to positions corresponding to at least two states including a photographing state and a non-photographing state to determine whether or not a photographing operation can be performed, and a setting position information transmission portion for moving the head drive portion in accordance with the position of the setting portion.

In according with the state position of the setting portion, the magnetic head abuts against or returns from the film, and as a result, the magnetic head can abut against the film as needed to record information.

An embodiment of the present invention will be described below with reference to the accompanying drawings.

Figure 27:
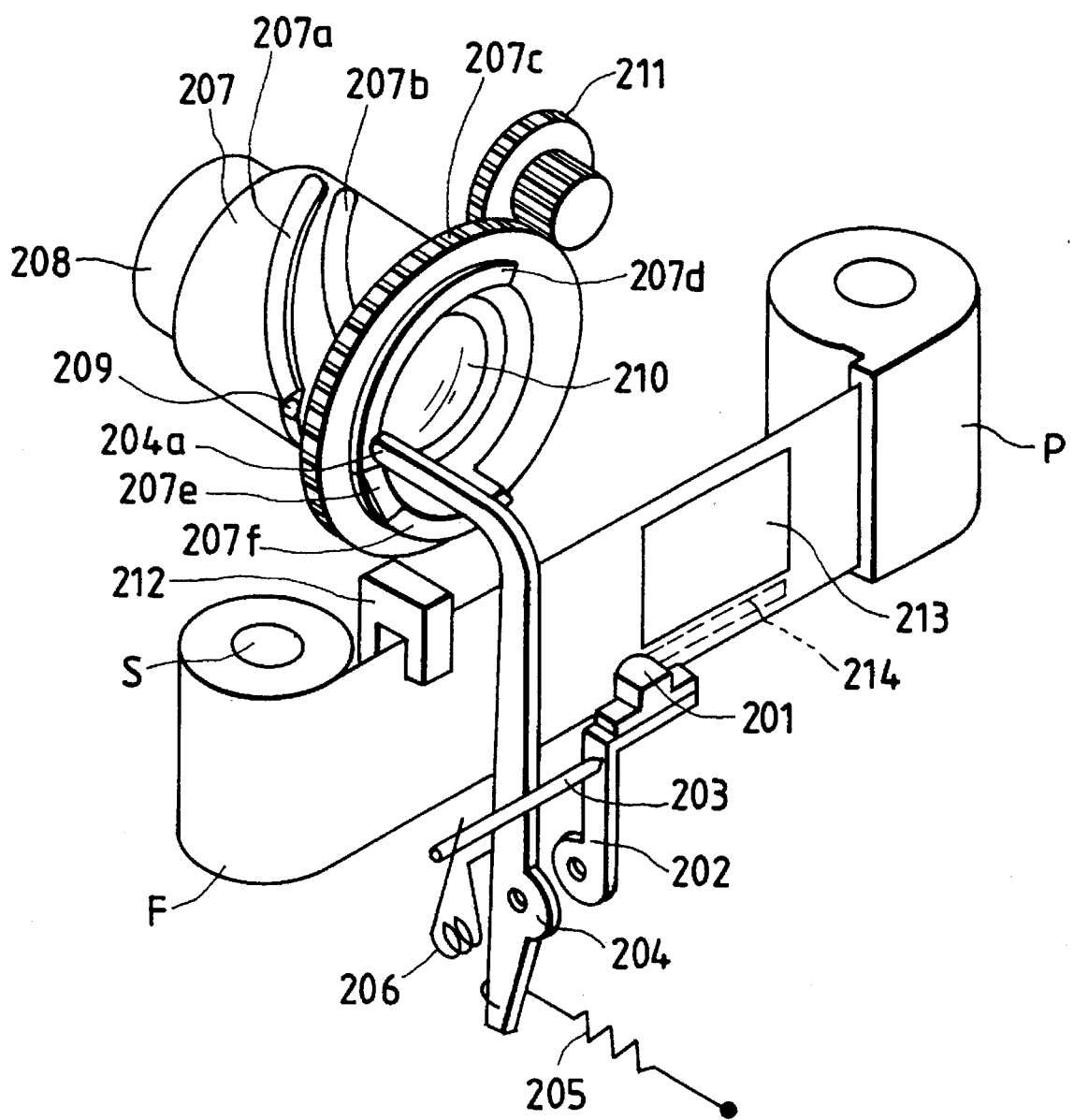

FIG. 27 is a perspective view showing an embodiment of a magnetic recording/reproduction apparatus for a camera according to the present invention. Note that FIG. 27 particularly illustrates the relationship between a lens barrel and a magnetic head. In FIG. 27, a film F is extracted from a patrone P, and is taken up around a spool S. A magnetic head 201 records information (e.g., exposure information, trimming information, photographing date, and the like) corresponding to each photographed frame 213 on a magnetic portion 214 arranged in advance on the film F, or reproduces ISO information, frame count information, and the like recorded in advance on the film F. The apparatus shown in FIG. 27 includes a lever 202 which fixes the magnetic head 201 and can swing to cause the magnetic head 201 to abut against or return from the film F, a pin 203 fixed to the lever 202, a head drive lever 204 one end 204a of which is in contact with a portion of a lens barrel, a spring 205 for causing the drive lever 204 to be in contact with the lens barrel, and a torsion spring 206 for biasing the levers 202 and 204 to approach each other. A pressing pad 228 is arranged at a position opposing the magnetic head 201 to sandwich the film F therebetween.

A lens barrel (setting portion) 207 comprises a two-group type zoom lens structure in this embodiment, but may comprise a unifocal or bifocal type lens. The lens barrel 207 has cams 207a and 207b for driving the two-group lens, and also has a gear portion 207c meshed with a gear 211 directly coupled to a motor (to be described later) for driving these cams. Furthermore, the lens barrel 207 has stepped cams 207d, 207e, and 207f at a position contacting the drive lever 204. A first-group lens chamber 208 has a pin 209 projecting from a portion thereof. The pin 209 is guided by the cam 207a of the lens barrel 207, thereby moving the first-group lenses. A photointerrupter 212 detects, e.g., perforations on the film F to detect a moving amount of the film F.

Figure 28:
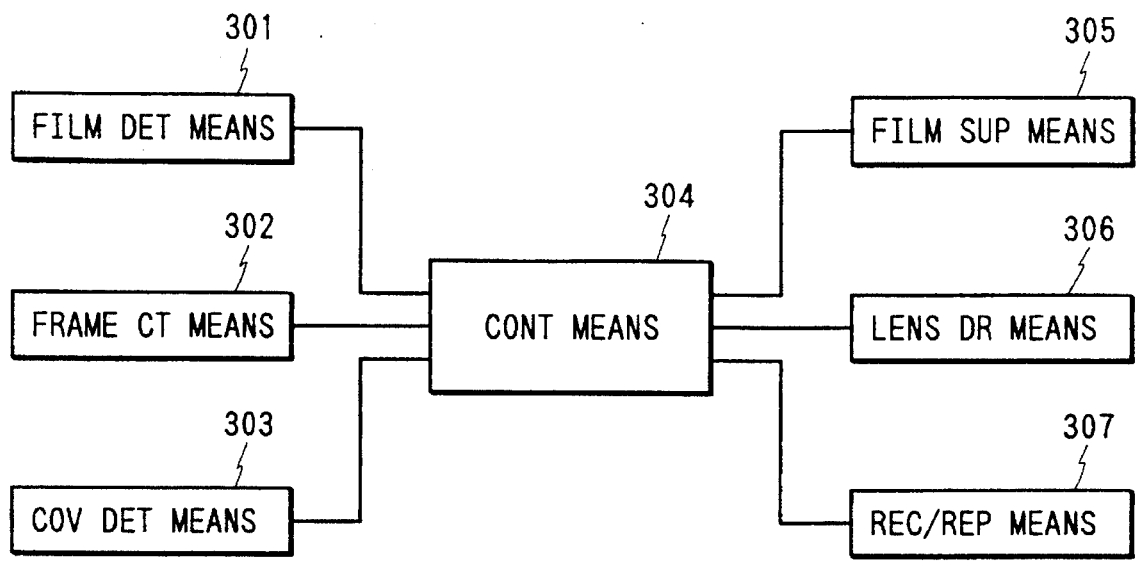

FIG. 28 is a block diagram for explaining the principle of the present invention. A film detection means 301 detects the presence/absence of the film F, and a cover detection means 303 detects an open/closed state of a rear cover. A frame count means 302 determines a feed amount of one frame, and adds or subtracts fed amounts. A control means 304 operates a film supply means 305 and a lens drive means 306 based on these data in association with each other, and a recording/reproduction means 307 exchanges data with the film F.

Figure 29:
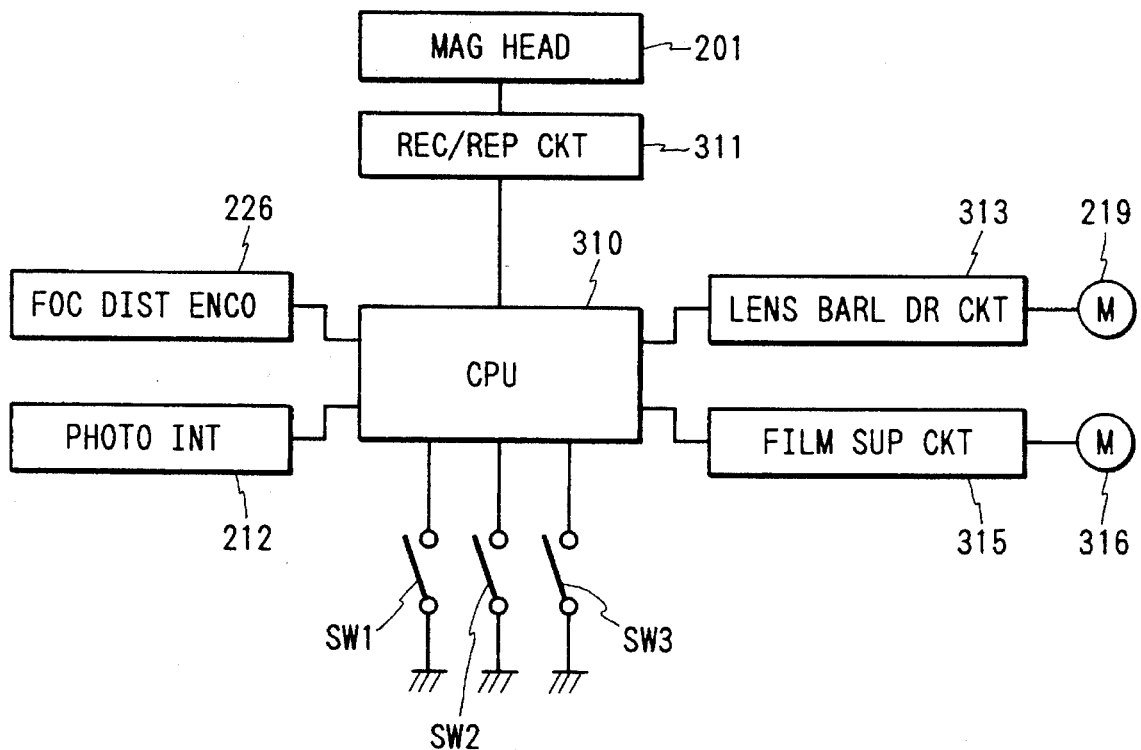

FIG. 29 is a block diagram showing an embodiment of a circuit arrangement of a magnetic recording/reproduction apparatus for a camera according to the present invention. The circuit arrangement will be described in detail below with reference to FIG. 29.

A cover open/close switch SW1, a film presence/absence detection switch SW2, and a main switch SW3 are connected to a CPU 310. A focal distance encoder 226 (setting position information transmission portion) outputs signals representing a focal distance or length based on an extended state of a lens, a lens collapse state, and a state of a magnetic head 201. A photointerrupter 212 outputs passage information of the film F to the CPU 310. The CPU 310 adds or subtracts a feed amount for one frame, and a moving amount of the film F based on the information from the photointerrupter. The apparatus also includes a recording/reproduction circuit 311 (head drive portion), a motor 219 driven by a lens barrel drive circuit 313 to drive the lens barrel, and a motor 316 driven by a film supply circuit 315 to supply a film.

Figure 30:
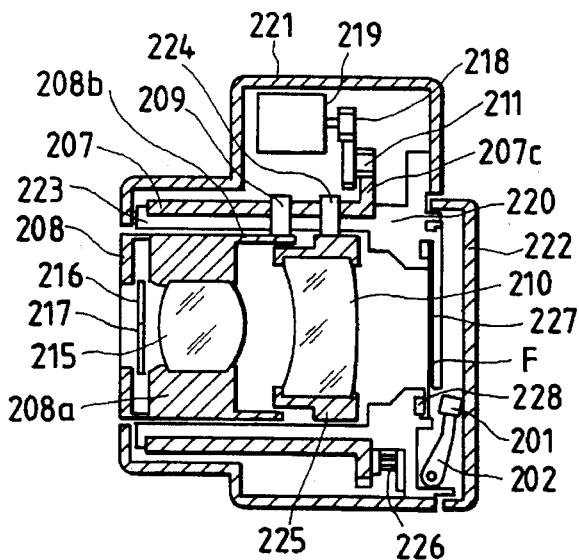

FIG. 30 is a central sectional view of a camera comprising the magnetic recording/reproduction apparatus, and illustrates a state wherein the lens is collapsed. FIG. 30 particularly illustrates a structure of the lens barrel 207, and a state of the magnetic head 201. The first-group lens chamber 208 does not project from a camera main body cover portion 221, and a pair of lens covers 216 and 217 for protecting the lens are closed by a mechanism (not shown), thus setting a photographing disable state. In this case, the magnetic head 201 is returned from the film F by the swing lever 202.

The first-group lens chamber 208 holds one end 208a of a first-group lens 215, and performs focusing by a focusing mechanism (not shown). The pin 209 projects from a collar portion 208b, and is engaged with the cam 207a of the lens barrel 207. A second-group lens chamber 225 fixes a second-group lens 210. A pin 224 similarly projects from the outer peripheral portion of the chamber 225, and is engaged with the cam 207b.

A straight elongated hole is formed in a portion 223 projecting from a camera main body 220 in a ring shape. This hole is associated with the cams 207a and 207b and the pins 209 and 224, and serves as a guide for moving the first- and second-group lens chambers 208 and 225 straight without rotating the pins 209 and 224 when the lens barrel 207 is rotated via the lens barrel motor 219, and gears 218, 211, and 207c. The focal distance encoder 226 detects a rotational position of the lens barrel 207 with respect to the camera main body 220 based on a relative offset amount between a brush and a printed pattern. The camera also includes a film pressing plate 227.

Figure 31:
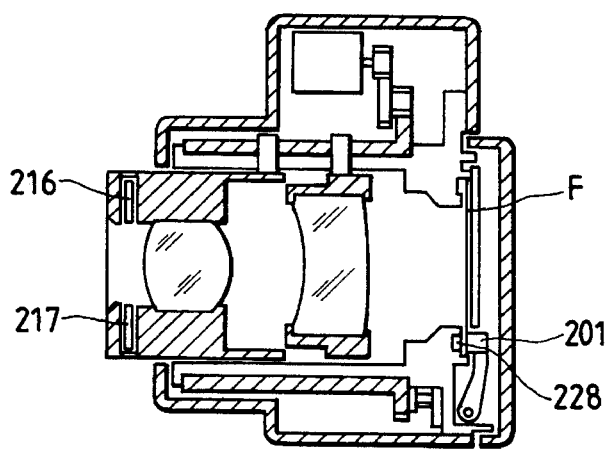

FIG. 31 is a central sectional view when a camera is set in a use state. In this state, the lens groups are extended to predetermined positions, the lens covers 216 and 217 are opened, and the magnetic head 201 abuts against the film F. The film F is clamped between the magnetic head 201 and the pressing pad 228.

Figure 32:
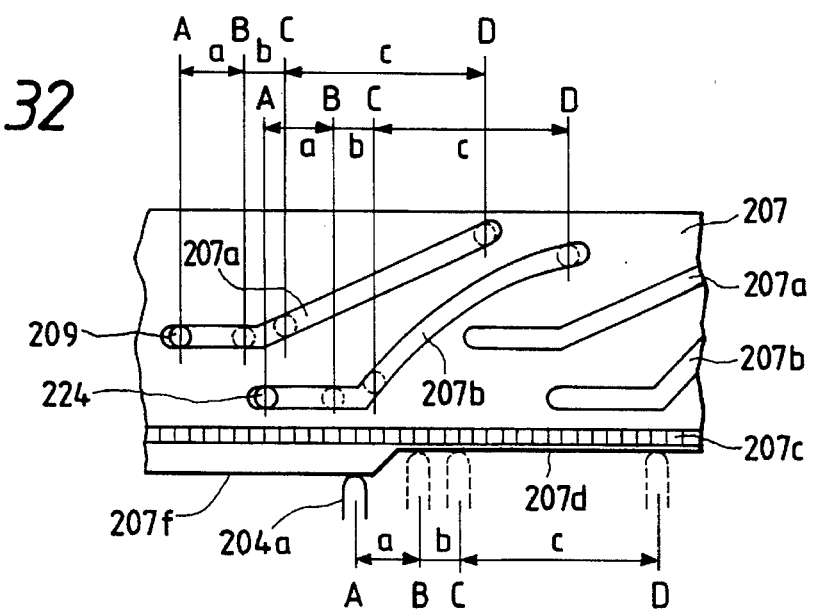

FIG. 32 is a developed view of a lens cam ring for explaining the positional relationship between the positions of the lens in respective states and one end 204a of the head drive lever 204. In FIG. 32, A, B, C, and D represent the positions of characteristic states in a series of lens movements, and a, b, and c represent strokes of the lens barrel 207 for performing various jobs. The state position A corresponds to a lens barrel reset state, as shown in FIG. 30. At this time, the first-group lens chamber 208 is collapsed. Therefore, the lens covers 216 and 217 are closed, the magnetic head 201 escapes from the film F, and the camera does not operate.

The state position B corresponds to a head touch position, and the positional relationship of the lens is left unchanged from the state position A. However, at this position, the magnetic head 201 abuts against the film F. Upon rotation of the lens barrel 207, since one end 204a of the head drive lever 204 opposes the stepped cam 207d lower than the stepped cam 207f, the drive lever 204 is rotated counterclockwise by the spring 205 shown in FIG. 27, and the swing lever 202 is rotated by the torsion spring 206 to follow the lever 204. As a result, the magnetic head 201 abuts against the film F.

The state position C corresponds a state wherein the lens barrel 207 is rotated, and the lens covers 216 and 217 to allow a photographing operation. In this case, the magnetic head 201 is kept in contact with the film F. Note that a focal distance of the lens corresponds to a wide side. At this time, a mechanism portion (not shown) is operated to open the lens covers 216 and 217.

The state position D corresponds a state wherein a focal distance is set at a tele side.

When the magnetic head is kept in contact with the film, information cannot often be precisely recorded or reproduced due to a so-called stress mark. Although the stress mark formation depends on a rigidity of the film F, a degree of deformation of the film F by a pressure of the magnetic head 201, and a density of information to be recorded, the present invention proposes a method of returning the magnetic head 201 in a state wherein stress mark formation does not pose a problem even if the magnetic head is kept in contact with the film F in a mode other than an information recording mode. As a result, a conventional problem can be solved without using a new actuator and without impairing operability.

Since a still camera must perform a rewind operation of the film F unlike in a movie camera, recording/reproduction operations need not be performed during a feed operation of the film F. Thus, the present invention proposes a method of causing the magnetic head 201 to abut against or return from the film F, which method is suitable for a still camera.

Figures 33, 33A, 33B:
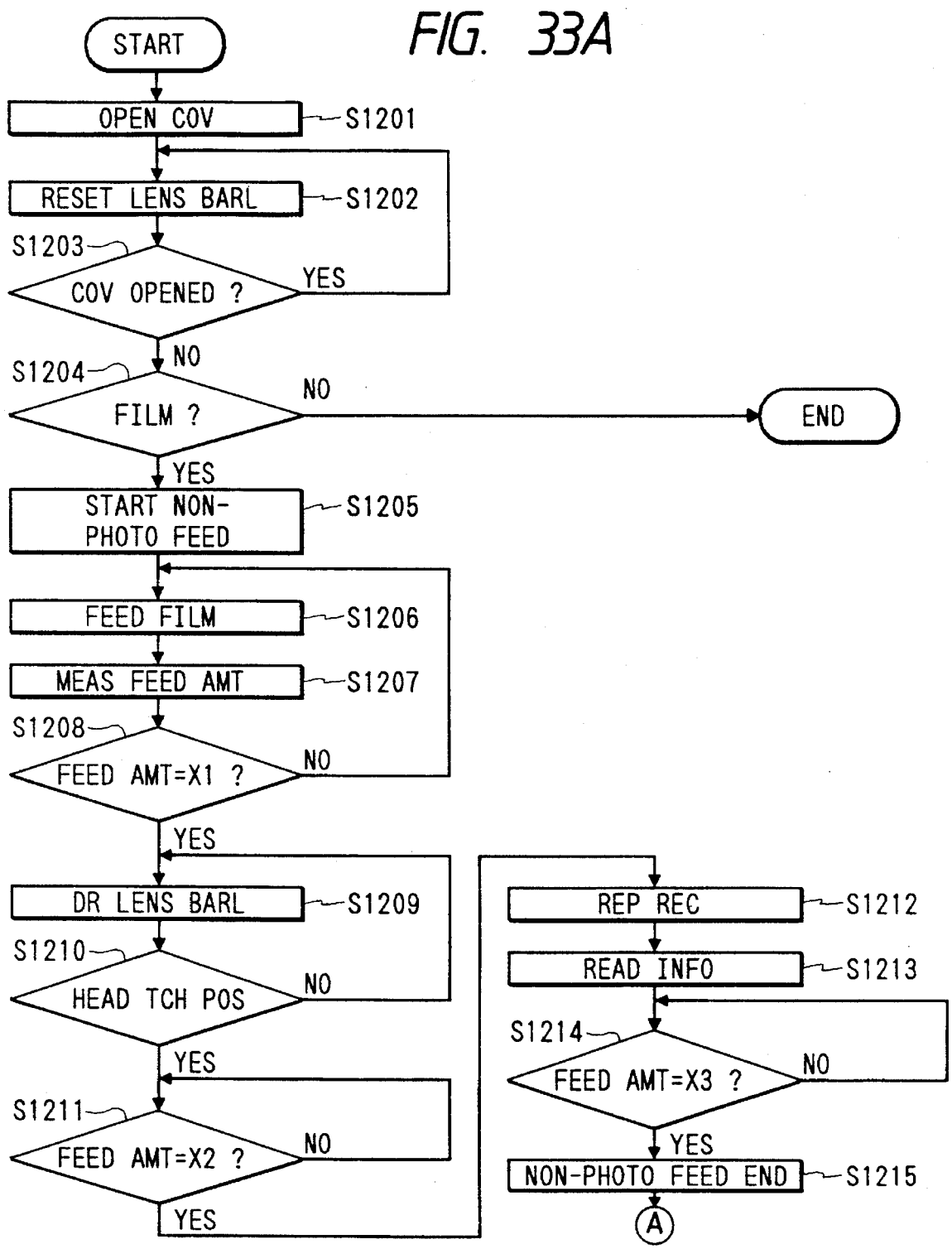
Figure 33B:
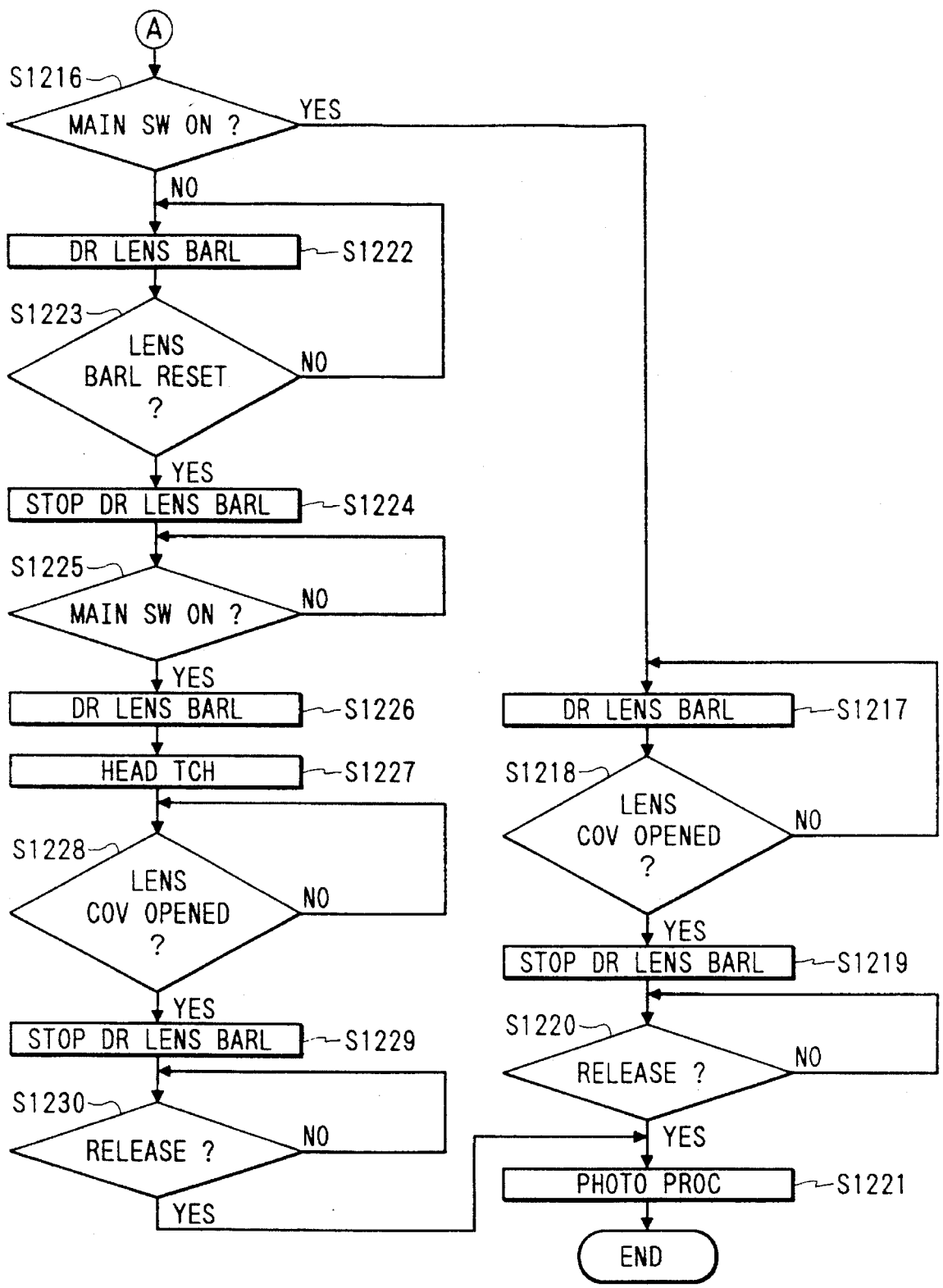

The operation of the magnetic recording/reproduction apparatus for a camera according to the present invention will be described in detail below. FIG. 33 is a flow chart for explaining recording/reproduction operations of information on/from a film during a non-photographing film feed operation of a camera. This flow chart is premised on a case wherein ISO information and frame count information recorded in advance on the film F are read during the non-photographing film feed operation.

In step S1201, a start state of this flow chart is defined as a state before a film is loaded, i.e., a state wherein a rear cover is opened. Therefore, in step S1202, the lens barrel 207 is reset, the first-group lens chamber 208 is collapsed, the lens covers 216 and 217 are closed, and the magnetic head 201 is returned from the film F, thus attaining a state shown in FIG. 30. It is then checked in step S1203 if the rear cover is open. If the rear cover is open, "Y" is determined in step S1203, and the flow returns to step S1202. However, if the rear cover is closed, "N" is determined in step S1203, and the presence/absence of the film F is checked in step S1204.

If there is no film F, "N" is determined in step S1204, and the processing is ended; otherwise, "Y" is determined in step S1204, and a non-photographing feed operation of the film F is started in step S1205. In step S1206, the film F is fed. In step S1207, the feed amount of the film is measured through the photointerrupter 212. It is then checked in step S1208 if the feed amount has reached $x_1$.

If "N" in step S1208, the flow returns to step S1206, and the non-photographing feed operation of the film F is continued. However, if the feed amount of the film F has reached $x_1$ and "Y" is determined in step S1208, the lens barrel drive circuit 313 is operated to drive the lens barrel 207 from the reset position (state position A in FIG. 32) in step S1209. Whether or not the lens barrel 207 has reached the head touch position (state position B in FIG. 32) is checked in step S1210 by detecting an output from the focal distance encoder 226. During this time interval, the feed operation of the film F is continued. However, the film may be slightly decelerated to prepare for the head touch operation, or the film feed operation may be temporarily interrupted.

If the lens barrel 207 reaches the head touch position and "Y" is determined in step S1210, it is checked in step S1211 if the feed amount has reached $x_2$. If the feed amount reaches $x_2$ and "Y" is determined in step S1211, since information of the film F is written here in advance, the recording/reproducing circuit 311 is driven in step S1212, and the information of the film F is read and loaded in the camera in step S1213. It is then checked in step S1214 if the feed amount has reached $x_3$. If the feed amount reaches $x_3$ and "Y" is determined in step S1214, this means that the film has reached a non-photographing feed end position, and the non-photographing feed operation of the film F is ended in step S1215. In step S1216, whether or not the main switch SW3 is ON is checked.

If "Y" in step S1216, i.e., if it is determined that the main switch SW3 is ON, the lens barrel 207 is driven in step S1217. Whether or not the lens covers 216 and 217 are open is checked in step S1218 by detecting an output from the focal distance encoder 226. If these covers are open, and "Y" is determined in step S1218, the drive operation of the lens barrel 207 is stopped in step S1219 (this stop position corresponds to the state position C in FIG. 32). When a release button is depressed to perform a photographing operation, an ON event of the release button is detected, and "Y" is determined in step S1220. Thus, photographing processing is executed in step S1221.

If an ON event of the main switch SW3 cannot be detected and "N" is determined in step S1216, the lens barrel 207 is driven in step S1222. It is then checked in step S1223 if the driven lens barrel 207 has reached a reset position. If "Y" in step S1223, the drive operation of the lens barrel 207 is stopped in step S1224. When a photographing operation is to be performed, the main switch SW3 is turned on in step S1225, and the lens is moved from the state position A to the position C by driving the lens barrel in step S1226. Then, the magnetic head 201 is brought into contact with the film F in step S1227, the lens covers are opened in step S1228, and the drive operation of the lens barrel is stopped in step S1229, thus setting a photographing enable state. If the release button is depressed in step S1230, a photographing operation is executed.

Figure 34:
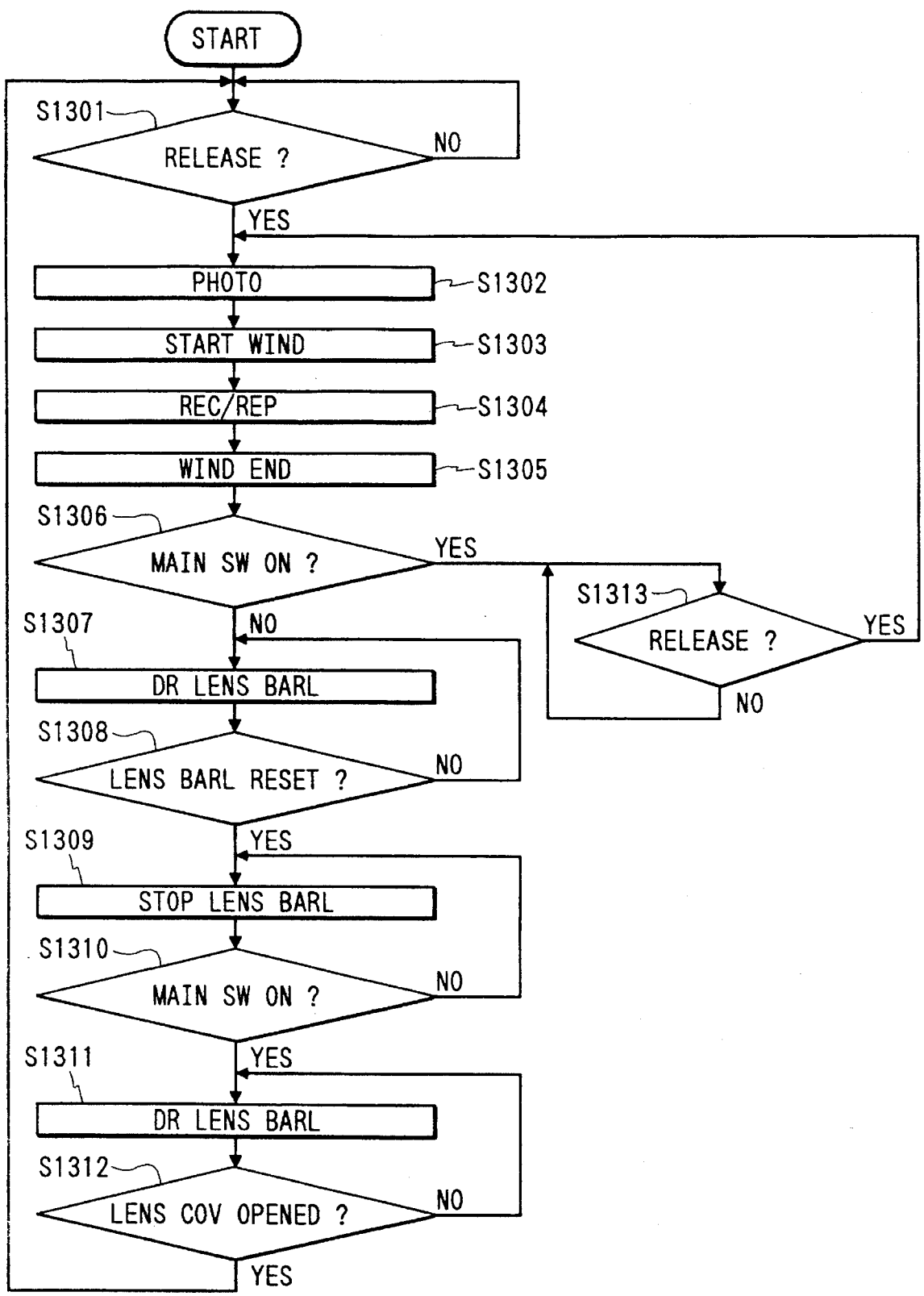

FIG. 34 is a flow chart for explaining a film feed operation and a head touch operation in a normal photographing mode.

Since the magnetic head 201 is kept in contact with the film F during a photographing operation, a method of returning the magnetic head 201 is carried out by the main switch SW3. In step S1301, whether or not the release button is depressed is checked. If the release button is depressed and turned on, "Y" is determined in step S1301, and a photographing operation is executed in step S1302. When the photographing operation is completed, a wind-up operation of the film F is started in step S1303. During movement of the film F, magnetic recording is performed on the film F (information may be reproduced) in step S1304. In step S1305, the wind-up operation is ended.

Whether or not the main switch SW3 is ON is checked in step S1306. If the main switch is turned off and "N" is determined in step S1306, the lens barrel 207 is driven in step S1307, and the lens is stored in a collapsed position. In addition, the magnetic head 201 is returned. In step S1308, whether or not the lens barrel 207 is located at the reset position is checked based on the output from the focal distance encoder 226. If the reset position is detected, and "Y" is determined in step S1308, the drive operation of the lens barrel 207 is stopped in step S1309 (state position A in FIG. 32).

When the main switch SW3 is turned on to perform a photographing operation again from a collapsed state, the ON event is detected, and "Y" is determined in step S1310. In step S1311, the lens barrel 207 is driven to open the lens covers 216 and 217. In addition, the magnetic head 201 is brought into contact with the film (state position C in FIG. 32). In step S1312, it is checked if the lens covers 216 and 217 are open. If these covers are opened and "Y" is determined in step S1312, the flow returns to step S1301 to detect an ON event of the release button, thus executing photographing processing.

If the main switch SW3 is kept ON, "Y" is determined in step S1306, and a normal camera operation is started. In step S1313, whether or not the release button is depressed is checked. If "Y" in step S1313, a photographing operation is performed in step S1302 again.

Figure 35:
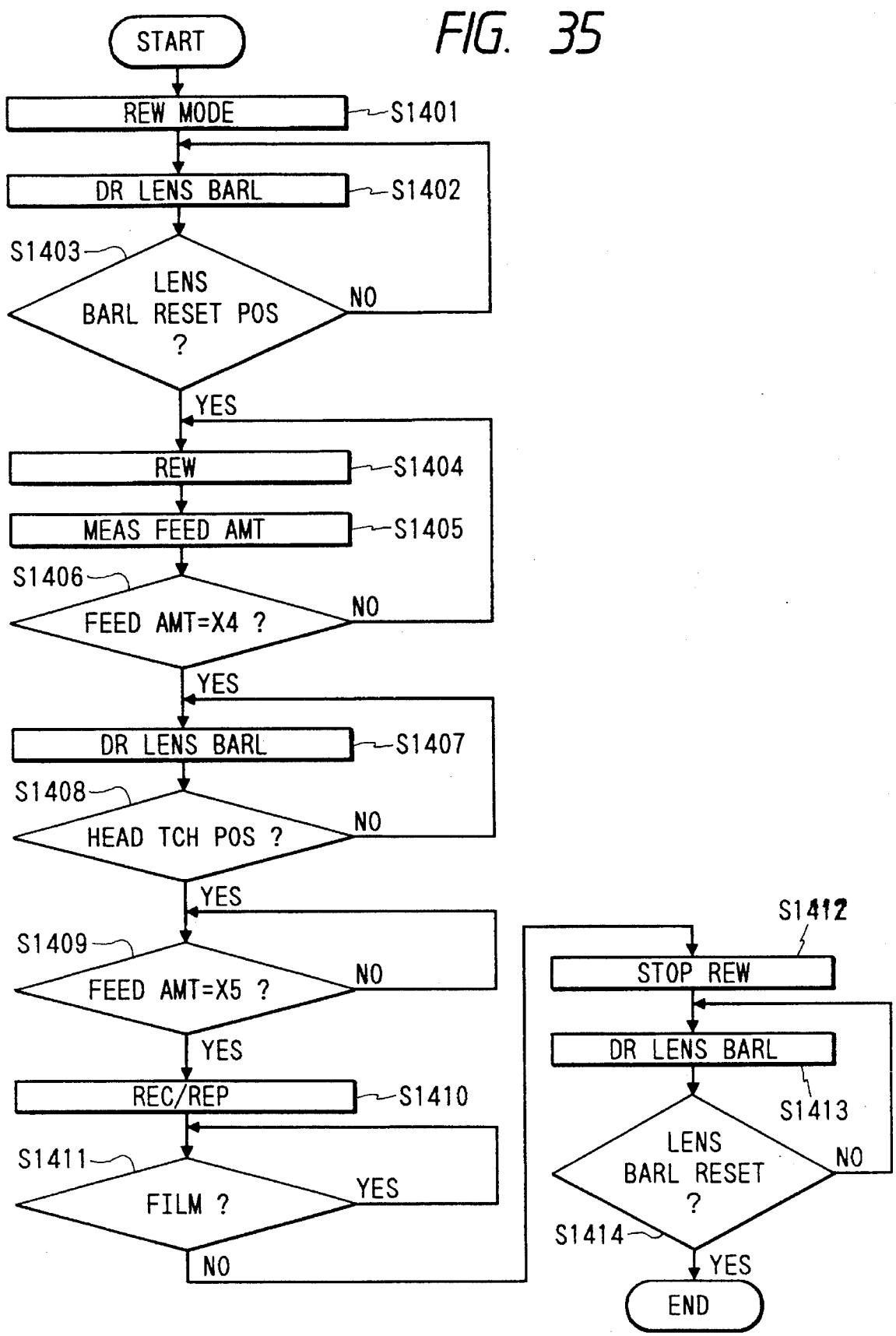

FIG. 35 is a flow chart for explaining a film rewind operation. The rewind operation may be started by automatically detecting a trailing end portion of the film F or may be manually started.

If the rewind mode of the film F is set in step S1401, since the lens is not necessary, the motor 219 for driving the lens barrel 207 is rotated in step S1402 to drive the lens barrel, thus collapsing the lens. In step S1403, whether or not the lens barrel 207 has reached a reset position is checked by detecting an output from the focal distance encoder 226. If the lens barrel 207 reaches the reset position and "Y" is determined in step S1403 (state position A in FIG. 32), the rewind operation of the film F is executed in step S1404. In this case, the feed amount of the film F is measured in step S1405. This is to obtain an information write position before the rewind operation of the film F is ended. Information to be written at the obtained position includes photographed frame information, trimming presence/absence information, and the like.

It is checked in step S1406 if the feed amount has reached $x_4$. If the film comes closer to the write position and "Y" is determined in step S1406, the lens barrel 207 is driven so that the magnetic head 201 at the escape position is brought into contact with the film F. Whether or not a head touch position is reached is checked in step S1408. If the head touch position is reached and "Y" is determined in step S1408, the rewind operation is performed. If the feed amount reaches $x_5$ and "Y" is determined in step S1409, this means that the film has reached the write position. In step S1410, information is written on the film F.

The presence/absence of the film F is determined in step S1411 to detect whether or not the rewind operation of the film F is ended. If there is no film and "N" is determined in step S1411, the rewind operation is stopped in step S1412. In order to return the magnetic head 201 from the film F, the lens barrel 207 is driven in step S1412. If the lens barrel 207 reaches the reset position and "Y" is determined in step S1414, rewind processing of the film F is ended.

In this manner, in the magnetic recording/reproduction apparatus for a camera according to the present invention, the operation of the magnetic head 201 is interlocked with the lens barrel operation when a photographing lens is collapsed, in order to attain an operation of the magnetic head 201 suitable for a still camera without impairing operability and without using a new actuator.

More specifically, a compact camera with a zoom lens has a range for operating, e.g., a lens barrel in a non-photographing range in order to shorten a total length of the camera and to open/close a lens barrier for protecting a lens. If the touch/detouch (abut/return) operation of the magnetic head 201 is performed in association with the above-mentioned operation, the magnetic head 201 can abut against or return from the film in cooperation with actual use of the camera, resulting in neither a time loss nor a malaise upon operation.

An operation range of the lens barrel drive member after the lens is collapsed is increased, and the magnetic head 201 is operated during this increased range. Therefore, since the head can abut against or return from the film without unnecessarily exposing a lens during the non-photographing feed operation or the rewind operation, safety can be improved, and good operability can be provided since an operation is simple. Since the magnetic head 201 is brought into contact with the film F when necessary, wear of the magnetic head 201 due to sliding contact of the film F can be minimized.

In this embodiment, the abut/return operation of the magnetic head 201 with respect to the film F is controlled by detecting a state position of the lens barrel 207, but may be executed in cooperation with an open/close operation of a barrier or an ON/OFF operation of the main switch SW3.

As described above, a magnetic recording/reproduction apparatus for a camera according to the present invention causes the magnetic head to abut against or return from a film in accordance with a state position of the setting portion, and the magnetic head can be brought into contact with the film as needed to record information. Thus, a compact and economic camera with good operability can be provided.

What is claimed is:

1. An information processing apparatus comprising:

a magnetic recorder provided with a magnetic head which reads information on a magnetic recording medium arranged in advance on a film;

a detector for detecting whether a predetermined positional relationship between said film and said magnetic recorder is established; and a controller for changing said magnetic recorder, between a first state where said magnetic head can read the information on said magnetic recording medium and a second state where said magnetic head can not read the information thereon, said controller changing the positional relationship from the second state to the first state in response to the detection result of said detector.

2. An information processing apparatus for a camera, comprising:

film feed means for taking up a film loaded in the camera around a take-up spool;

a magnetic head which can contact a magnetic recording medium arranged in advance on a film;

detection means for detecting that said magnetic recording medium of said film reaches a predetermined position of said camera by a feed operation by said film feed means, and outputting a detection signal;

drive control means for bringing said magnetic head into contact with said magnetic recording medium in accordance with the detection signal from said detection means; and information transfer means, responsive to the magnetic head contact operation by said drive control means, for reproducing information recorded on said magnetic recording medium and/or recording information on said magnetic recording medium.

3. An apparatus according to claim 2, wherein said detection means detects that said recording medium is not located at the predetermined position of the camera, and outputs an absence signal, and said drive control means returns said magnetic head from said magnetic recording medium on the basis of the absence signal.

4. An apparatus according to claim 3, wherein said detection means includes a counter for counting passing perforations of the film, outputs the detection signal when said counter counts a predetermined number of perforations, and outputs the absence signal when said counter detects another predetermined number of perforations.

5. An apparatus according to claim 3, wherein said information transfer means records information in units of photographed frames.

6. An apparatus according to claim 5, wherein said magnetic head is brought into contact with the film after an exposure operation of the camera is performed, and said magnetic head is returned after a frame feed operation is performed.

7. An apparatus according to claim 3, wherein said drive control means does not return said magnetic head after photographing operations of all the frames are completed, and said information transfer means records information associated with all the photographing operations on a magnetic recording medium arranged on a predetermined portion of the film.

8. An apparatus according to claim 3, wherein said drive control means returns said magnetic head after photographing operations of all the frames are completed, and brings said magnetic head into contact with the film again after a rewind operation of the film is performed, and said information transfer means records information associated with all the photographing operations on a magnetic recording medium arranged on a starting portion of the film.

9. An information processing apparatus for a camera, comprising:

film feed means for taking up a film loaded in the camera around a take-up spool;

a magnetic head which can contact a magnetic recording medium arranged in advance on a film;

first detection means for detecting a first region where a magnetic recording medium for recording information associated with the film is arranged, and outputting a first detection signal;

second detection means for detecting a second region for recording image information based on a photographing operation, and outputting a second detection signal;

drive control means for bringing said magnetic head into contact with said magnetic recording medium on the basis of said first and second detection signals; and information transfer means for reproducing information recorded on said magnetic recording medium and/or recording information on said magnetic recording medium in accordance with the magnetic head contact operation by said drive control means.

10. An apparatus according to claim 9, wherein said first detection means detects the first region on the basis of first perforations formed in the film, and said second detection means detects the second region on the basis of second perforations formed in the film.

11. An apparatus according to claim 9, wherein said drive control means does not return said magnetic head after photographing operations of all the frames are completed, and said information transfer means records information associated with all the photographing operations on a magnetic recording medium arranged on an end portion of the film.

12. An apparatus according to claim 9, wherein said drive control means does not return said magnetic head during a rewind operation of the film after photographing operations of all the frames are completed, and said information transfer means records information associated with all the photographing operations on a magnetic recording medium arranged on a starting portion of the film while the rewound film is wound up again.

13. An apparatus according to claim 9, wherein said drive control means does not return said magnetic head during a rewind operation of the film after photographing operations of all the frames are completed, and said information transfer inverts an order of information associated with all the photographing operations and records the information on a magnetic recording medium arranged on a starting portion of the film during the rewind operation.

14. An apparatus according to claim 9, wherein said drive control means does not return said magnetic head during a rewind operation of the film after photographing operations of all the frames are completed, and said information transfer means generates inverted information obtained by inverting an order of information associated with all the photographing operations and records the inverted information on a magnetic recording medium arranged on a starting portion of the film together with original information during the rewind operation.

15. An apparatus according to claim 9, wherein said drive control means does not return said magnetic head during a rewind operation of the film after photographing operations of all the frames are completed, and said information transfer means records information associated with all the photographing operations on a magnetic recording medium arranged on a starting portion of the film during the rewind operation of the film, the information associated with all the photographing operations being read out by said information transfer means while the film is wound up, and an order of the readout information being inverted.

16. An information processing apparatus for a camera, comprising:

film feed means for taking up a film loaded in the camera around a take-up spool;

a magnetic head which is brought into contact with a magnetic recording medium arranged in advance on said film to record/reproduce information;

detection means for detecting that said magnetic recording medium of said film reaches a predetermined position of said camera by a feed operation by said film feed means, and outputting a detection signal;

discrimination means for discriminating a use state of the loaded film, and outputting a discrimination signal;

drive control means for bringing said magnetic head into contact with said magnetic recording medium in accordance with the detection signal and the discrimination signal; and information recording/reproducing means for reproducing/recording information from/on said magnetic recording medium in accordance with the magnetic head contact operation by said drive control means.

17. An apparatus according to claim 16, wherein said discrimination means discriminates a fully photographed film, a partially photographed film, and an unused film.

18. An apparatus according to claim 17, further comprising:

alarm means form, when said discrimination means outputs the discrimination signal indicating the fully photographed film, generating an alarm.

19. An information recording apparatus for a camera, which is used in an automatic loading type camera for feeding a film from a film patrone loaded in one side of a camera main body, comprising:

a take-up spool for taking up the film which is fed from said film patrone and reaches the other side of said camera main body via a film path opposing an aperture of said camera main body;

a magnetic recording magnetic head which is reciprocal in a direction perpendicular to a film surface in a portion adjacent to the aperture;

locking means for locking movement of said magnetic head in a direction to urge said magnetic head against the film surface at an escape position; and urging means, which is reciprocally arranged in a film path between said magnetic head and said take-up spool, for detecting a leading end of the film, releasing a locked state by said locking means, and urging said magnetic head against the film surface.

20. An apparatus according to claim 19, further comprising:

biasing means for urging said magnetic head against the film surface;

detection means for detecting loading of said film patrone into said camera main body; and control means for causing said biasing means to store a biasing force in accordance with a detection operation of said detection means.

21. An information processing apparatus for a camera, which comprises a magnetic head for recording information on a film or reading out information recorded on the film, comprising:

a head drive portion for causing said magnetic head to abut against or return from the film;

a setting portion which is moved to positions corresponding to at least two states including a photographing state and a non-photographing state to determine whether or not a photographing operation can be performed; and a setting position information transmission portion for moving said head drive portion in accordance with the position of said setting portion.

22. An information processing apparatus for a camera, which comprises a magnetic head for recording information on a film or reading out information recorded on the film, and a lens barrel moved in accordance with a photographing state, comprising:

a head drive portion for causing said magnetic head to abut against or return from the film; and a control portion for controlling an abut/return operation of said head drive portion in accordance with a position of said lens barrel.

23. An apparatus according to claim 22, wherein said lens barrel is moved to one of a photographing position for allowing a photographing operation, and a non-photographing position for inhibiting a photographing operation, and said control portion causes said magnetic head to abut against the film in response to movement of said lens barrel to the photographing position, and causes said magnetic head to abut against the film in response to movement of said lens barrel to the non-photographing position.

24. An information reproducing apparatus for a camera, comprising:

film feed means for taking up a film loaded in the camera around a take-up spool;

magnetic reading means which can contact a magnetic recording medium arranged on the film;

detecting means for detecting that a predetermined area of said magnetic recording medium reaches a predetermined position of the camera by a feed operation by said film feed means, and outputting a detection signal; and drive control means responsive to said detection signal for bringing said magnetic reading means into contact with said magnetic recording medium.

25. An information reproducing apparatus for a camera, comprising:

film feed means for taking up a film loaded in the camera around a take-up spool;

magnetic reading means which can contact a magnetic recording medium arranged on the film;

detecting means for outputting a detection signal when said magnetic recording medium reaches a predetermined position of the camera by a feed operation by said film feed means, and outputting an absence signal when said recording medium is not located at said predetermined position; and drive control means for bringing said magnetic reading means into contact with said magnetic recording medium in response to said detection signal, and returning said magnetic reading means from said magnetic recording medium in response to said absence signal.

26. An information recording camera, comprising:

film feed means for taking up a film loaded in the camera around a take-up spool;

a magnetic recording means for recording on a magnetic recording medium arranged on a film; and moving means responsive to the completion of an exposure operation for moving said magnetic recording means to a recording position at which said magnetic recording means can record information on said magnetic recording medium.

27. An information recording camera, comprising:

film feed means for taking up a film loaded in the camera around a take-up spool;

a magnetic recording means for recording on a magnetic recording medium arranged on a film; and moving means, dependent upon an operation of said film feed means, for moving said magnetic recording means from a recording position to a non-recording position before a start of an exposure operation.

28. An information recording camera according to claim 27, which further comprises means for detecting that said film feed means completes a one frame feeding operation after a one frame exposure operation and producing a detection signal, and wherein said moving means moves said magnetic recording means from said recording position to said non-recording position in response to said detection signal.

29. An information recording camera, comprising:

film feed means for taking up a film loaded in the camera around a take-up spool;

a magnetic recording means for recording on a magnetic recording medium arranged on a film;

moving means for moving said magnetic recording means from a non-recording position to a recording position at which said magnetic recording means can record information on said magnetic recording medium; and means for detecting that said moving means has moved said magnetic recording means to said recording position and producing a detection signal, said film feed means performing a one frame feeding operation in response to said detection signal.

30. An information recording camera capable of loading a film cartridge which has a film and a magnetic recording medium arranged on the film, comprising:

detecting means for detecting loading of the film cartridge into said camera and producing a detection signal;

a magnetic recording means for recording on said magnetic recording medium; and moving means responsive to said detection signal for moving said magnetic recording means to a recording position at which said magnetic recording means can record information on said magnetic recording medium.

31. An information processing camera, comprising:

film feed means for taking up a film loaded in the camera around a take-up spool;

a magnetic head which can contact a magnetic recording medium arranged on a film;

discrimination means for discriminating a use state of loaded film;

moving means for moving said magnetic head to a position at which said magnetic head contacts said magnetic recording medium; and control means responsive to said discrimination means for causing said film feed means to take up the film without said magnetic head being moved to said position, for exposing a first frame of film when said discrimination means discriminates an unused film, and causing said film feed means to take up the film with said magnetic head moved to said position, for exposing an unexposed frame of film when said discrimination means discriminates a partially exposed film.

32. A camera comprising:

magnetic recording means provided with a magnetic head for reading information on a magnetic recording medium arranged in advance on a film;

detecting means for detecting whether a predetermined positional relationship between said film and said magnetic recording means is established; and drive control means for changing said magnetic recording means between a first state where said magnetic head can read the information on said magnetic recording medium and a second state where said magnetic head can not read the information thereon, said drive control means changing the positional relationship from the second state to the first state in response to the detection result of said detecting means.

33. A camera comprising:

film feeding means for taking up a film loaded in the camera around a take-up spool;

magnetic reading means provided with a magnetic head which reads information on a magnetic recording medium arranged in advance on a film;

detection means for detecting that the film reaches a predetermined position relating to said magnetic head and outputting a detection signal;

driving control means for changing a position relationship of the film and said magnetic reading means in a direction crossing a film feeding direction between a first state in which said magnetic head reads information on said magnetic recording medium and a second state in which said magnetic head does not read information on said magnetic recording medium, said driving control means changing said magnetic reading means from said second state to said first state in response to said detection signal; and information transfer means, responsive to the change of said magnetic reading means from said second state to said first state, for producing information.

34. A camera comprising:

film feeding means for taking up a film loaded in the camera around a take-up spool;

magnetic reading means provided with a magnetic head which reads information on a magnetic recording medium arranged in advance on a film;

first detection means for detecting a first region where a magnetic recording medium for recording information associated with the film is arranged, and outputting a first detection signal;

second detection means for detecting a second region for recording image information based on a photographing operation, and outputting a second detection signal;

driving control means for changing a position relationship of the film and said magnetic reading means in a direction crossing a film feeding direction between a first state in which said magnetic head reads information on said magnetic recording medium and a second state in which said magnetic head does not read information on said magnetic recording medium, said driving control means changing said magnetic reading means from said second state to said first state on the basis of said first and second detection signals; and information transfer means for producing information on the basis of the change of said magnetic reading means from said second state to said first state.

35. A camera comprising:

film feeding means for taking up a film loaded in the camera around a take-up spool;

magnetic reading means provided with a magnetic head which reads information on a magnetic recording medium arranged in advance on a film;

detection means for detecting that the film reaches a predetermined position relating to said magnetic head and outputting a detection signal;

discrimination means for discriminating a use state of the loaded film, and outputting a discrimination signal;

driving control means for changing a position relationship of the film and said magnetic reading means in a direction crossing a film feeding direction between a first state in which said magnetic head reads information on said magnetic recording medium and a second state in which said magnetic head does not read information on said magnetic recording medium, said driving control means changing said magnetic reading means from said second state to said first state in accordance with said detection signal and said discrimination signal; and information transfer means for producing information on the basis of the change of said magnetic reading means from said second state to said first state.

36. An information processing method of reproducing information on a magnetic recording medium of a film, comprising the steps of:

feeding the film;

detecting whether the film reaches a predetermined position with respect to a magnetic head; and changing a positional relationship between the film and said magnetic head along a direction crossing the film feeding direction, from a first state where the information on said magnetic recording medium can be reproduced, to a second state where the information thereon can not be reproduced.

37. An information reading method of a magnetic head of a camera capable of feeding a film on which a magnetic recording medium is arranged, comprising:

taking up a film loaded in the camera around a take-up spool;

detecting that the film reaches a predetermined position relating to said magnetic head and outputting a detection signal;

changing a position relationship of said magnetic head and the film, when said detection signal is generated, to a first state from a second state in a direction which crosses a film feeding direction, wherein said magnetic head reads information on said magnetic recording medium in said first state and does not read information on said magnetic recording medium in said second state; and producing information in response to the change of said magnetic reading means from said second state to said first state.

38. An information reading method of a magnetic head of a camera capable of feeding a film on which a magnetic recording medium is arranged, comprising:

taking up a film loaded in the camera around a take-up spool;

detecting a first region where a magnetic recording medium for recording information associated with the film is arranged, and outputting a first detection signal;

detecting a second region for recording image information based on a photographing operation, and outputting a second detection signal;

changing a position relationship of said magnetic head and the film on the basis of said first and second detection signals to a first state from a second state in a direction which crosses a film feeding direction, wherein said magnetic head reads information on said magnetic recording medium in said first state and does not read information on said magnetic recording medium in said second state; and producing information in response to the change of said magnetic reading means from said second state to said first state.

39. An information reading method of a magnetic head of a camera capable of feeding a film on which a magnetic recording medium is arranged, comprising:

taking up a film loaded in the camera around a take-up spool;

detecting that the film reaches a predetermined position relating to said magnetic head and outputting a detection signal;

discriminating a use state of the loaded film, and outputting a discrimination signal;

changing a position relationship of said magnetic head and the film in accordance with said detection signal and said discrimination signal to a first state from a second state in a direction which crosses a film feeding direction, wherein said magnetic head reads information on said magnetic recording medium in said first state and does not read information on said magnetic recording medium in said second state; and producing information in response to the change of said magnetic reading means from said second state to said first state.

40. An information processing apparatus, comprising:

a film feeding device which takes up a film loaded in the camera around a take-up spool;

a magnetic head which can contact a magnetic recording medium arranged in advance on a film;

a detector which detects that said magnetic recording medium of said film reaches a predetermined position of said processing apparatus by a feed operation by said film feeding device, and outputs a detection signal;

a drive controller which brings said magnetic head into contact with said magnetic recording medium in accordance with the detection signal from said detector; and an information transfer device, responsive to the magnetic head contact operation by said drive controller, which reproduces information recorded on said magnetic recording medium and/or records information on said magnetic recording medium.

41. An information processing apparatus, comprising:

a film feeding device which takes up a film loaded in the apparatus around a take-up spool;

a magnetic head which can contact a magnetic recording medium arranged in advance on the film;

a first detector which detects a first region where a magnetic recording medium for recording information associated with the film is arranged, and outputting a first detection signal;

a second detector which detects a second region for recording image information based on a photographing operation, and outputting a second detection signal;

a drive controller which brings said magnetic head into contact with said magnetic recording medium based on said first and second detection signals; and an information transfer device which reproduces information recorded on said magnetic recording medium and/or records information on said magnetic recording medium in accordance with the magnetic head contact operation by said drive controller.

42. An information processing apparatus, comprising:

a film feeding device which takes up a film loaded in the apparatus around a take-up spool;

a magnetic head which is brought into contact with a magnetic recording medium arranged in advance on said film to record/reproduce information;

a detector which detects that said magnetic recording medium of said film reaches a predetermined position of said apparatus by a feed operation by said film feeding device, and outputs a detection signal;

a discrimination device which discriminates a use state of the loaded film, and outputs a discrimination signal;

a drive controller which brings said magnetic head into contact with said magnetic recording medium in accordance with the detection signal and the discrimination signal; and an information recording/reproducing device which reproduces/records information from/on said magnetic recording medium in accordance with the magnetic head contact operation by said drive controller.

43. An information recording apparatus, which is used in an automatic loading type apparatus for feeding a film from a film patrone loaded in one side of an apparatus main body, comprising:

a take-up spool for taking up the film which is fed from said film patrone and reaches the other side of said camera main body via a film path opposing an aperture of said camera main body;

a magnetic recording magnetic head which is reciprocative in a direction perpendicular to a film surface in a portion adjacent to the aperture;

a locking device which locks movement of said magnetic head in a direction to urge said magnetic head against the film surface at an escape position; and an urging device, which is reciprocatively arranged in a film path between said magnetic head and said take-up spool, which detects a leading end of the film, releases a locked state by said locking device, and urges said magnetic head against the film surface.

44. An information processing apparatus, which comprises a magnetic head for recording information on a film or reading out information recorded on the film, comprising:
a head drive portion for causing said magnetic head to abut against or return from the film;
a setting portion which is moved to positions corresponding to at least two states including a photographing state and a non-photographing state to determine whether or not a photographing operation can be performed; and
a setting position information transmission portion for moving said head drive portion in accordance with the position of said setting portion.

45. An information processing apparatus, which comprises a magnetic head for recording information on a film or reading out information recorded on the film, and a lens barrel moved in accordance with a photographing state, comprising:
a head drive portion for causing said magnetic head to abut against or return from the film; and
a control portion for controlling an abut/return operation of said head drive portion in accordance with a position of said lens barrel.

46. An information reproducing apparatus, comprising:
a film feeding device which takes up a film loaded in the camera around a take-up spool;
a magnetic reading device which can contact a magnetic recording medium arranged on the film;
a detector which detects that a predetermined area of said magnetic recording medium reaches a predetermined position of the apparatus by a feed operation by said film feeding device, and outputs a detection signal; and
a drive controller responsive to said detection signal which brings said magnetic reading device into contact with said magnetic recording medium.

47. An information reproducing apparatus, comprising:
a film feeding device which takes up a film loaded in a camera around a take-up spool;
a magnetic reading device which can contact a magnetic recording medium arranged on the film;
a detector which outputs a detection signal when said magnetic recording medium reaches a predetermined position of the apparatus by a feed operation by said film feeding device, and outputs an absence signal when said recording medium is not located at said predetermined position; and
a drive controller which brings said magnetic reading device into contact with said magnetic recording medium in response to said detection signal, and returns said magnetic reading device from said magnetic recording medium in response to said absence signal.

48. An information recording apparatus, comprising:
a film feeding device which takes up a film loaded in the apparatus around a take-up spool;
a magnetic recording device which records on a magnetic recording medium arranged on the film; and
a moving device responsive to the completion of an exposure operation which moves said magnetic recording device to a recording position at which said magnetic recording device can record information on said magnetic recording medium.

49. An information recording apparatus, comprising: a film feeding device which takes up a film loaded in a camera around a take-up spool;
a magnetic recording device which records on a magnetic recording medium arranged on the film; and
a moving device, dependent upon an operation of said film feeding device, which moves said magnetic recording device from a recording position to a non-recording position before a start of an exposure operation.

50. An information recording apparatus comprising:
a film feeding device which takes up a film loaded in a camera around a take-up spool;
a magnetic recording device which records on a magnetic recording medium arranged on the film;
a moving device which moves said magnetic recording device from a non-recording position to a recording position at which said magnetic recording device can record information on said magnetic recording medium; and
a detector which detects that said moving device has moved said magnetic recording device to said recording position and produces a detection signal, said film feeding device performing a one frame feeding operation in response to said detection signal.

51. An information recording apparatus capable of loading a film cartridge which has a film and a magnetic recording medium arranged on the film, comprising:
a detector which detects loading of the film cartridge into said apparatus and produces a detection signal;
a magnetic recording device which records on said magnetic recording medium; and
a moving device responsive to said detection signal which moves said magnetic recording device to a recording position at which said magnetic recording device can record information on said magnetic recording medium.

52. An information processing apparatus comprising:
a film feeding device which takes up a film loaded in the apparatus around a take-up spool;
a magnetic head which can contact a magnetic recording medium arranged on the film;
a discrimination device which discriminates a use state of loaded film;
a moving device which moves said magnetic head to a position at which said magnetic head contacts said magnetic recording medium; and
a controller responsive to said discrimination device to cause said film feeding device to take up the film without said magnetic head being moved to said position, to expose a first frame of film when said discrimination device discriminates an unused film, and to cause said film feeding device to take up the film with said magnetic head moved to said position, to expose an unexposed frame of film when said discrimination device discriminates a partially exposed film.

53. An information processing apparatus, comprising:
a film feeding device which takes up a film loaded in the apparatus around a take-up spool;
a magnetic reading device provided with a magnetic head which reads information on a magnetic recording medium arranged in advance on the film:
a detector which detects that the film reaches a predetermined position relating to said magnetic head and outputs a detection signal;
a driving controller which changes a position relationship of the film and said magnetic reading device in a direction crossing a film feeding direction between a first state in which said magnetic head reads information on said magnetic recording medium and a second state in which said magnetic head does not read information on said magnetic recording medium, said driving controller changing said magnetic reading device from said second state to said first state in response to said detection signal; and an information transfer device, responsive to the change of said magnetic reading device from said second state to said first state, which produces information.

54. An information processing apparatus comprising: a film feeding device which takes up a film loaded in the apparatus around a take-up spool;

a magnetic reading device provided with a magnetic head which reads information on a magnetic recording medium arranged in advance on the film;

a first detector which detects a first region where a magnetic recording medium for recording information associated with the film is arranged, and outputs a first detection signal;

a second detector which detects a second region for recording image information based on a photographing operation, and outputs a second detection signal;

a driving controller which changes a position relationship of the film and said magnetic reading device in a direction crossing a film feeding direction between a first state in which said magnetic head reads information on said magnetic recording medium and a second state in which said magnetic head does not read information on said magnetic recording medium, said driving controller changing said magnetic reading device from said second state to said first state based on said first and second detection signals; and an information transfer device which produces information based on the change of said magnetic reading device from said second state to said first state.

55. An information processing apparatus, comprising:

a film feeding device which takes up a film loaded in the apparatus around a take-up spool;

a magnetic reading device provided with a magnetic head which reads information on a magnetic recording medium arranged in advance on the film;

a detector which detects that the film reaches a predetermined position relating to said magnetic head and outputs a detection signal:

a discrimination device which discriminates a use state of the loaded film, and outputs a discrimination signal;

a driving controller which changes a position relationship of the film and said magnetic reading device in a direction crossing a film feeding direction between a first state in which said magnetic head reads information on said magnetic recording medium and a second state in which said magnetic head does not read information on said magnetic recording medium, said driving controller changing said magnetic reading device from said second state to said first state in accordance with said detection signal and said discrimination signal; and an information transfer device which produces information based on the change of said magnetic reading device from said second state to said first state.

56. An information processing apparatus capable of loading a film provided with a recording medium, comprising:

a recording/reproducing device which records information onto or reproduces information from said recording medium;

a driving device which moves said recording/reproducing device between a processing position where the information can be recorded onto or reproduced from said recording medium, and a non-processing position where the information cannot be recorded onto or reproduced from said recording medium; and a controller which judges whether it is necessary to move said recording/reproducing device to the processing or the non-processing position, and which moves said recording/reproducing device to the processing or the non-processing position in accordance with the result of the judgment.

57. An information processing apparatus according to claim 56, wherein said controller discriminates whether the film is exposed, and judges whether to move said recording/reproducing device to the processing or the non-processing position in accordance with the result of the discrimination.

58. An information processing apparatus according to claim 56, further comprising a film feeding device which feeds the film, wherein said film feeding device feeds the film after said driving device moves said recording/reproducing device.

59. An information processing apparatus according to claim 58, wherein said film feeding device feeds the film by one frame.

60. An information processing apparatus capable of loading a film provided with a recording medium, comprising:

a recording/reproducing device which records onto or reproduces from said recording medium, information;

a driving device which moves said recording/reproducing device between a processing position where the information can be recorded onto or reproduced from said recording medium, and a non-processing position where the information cannot be recorded onto or reproduced from said recording medium;

a controller which judges whether it is necessary to move said recording/reproducing device to the processing or the non-processing position, and which moves said recording/reproducing device to the processing or the non-processing position in accordance with the result of the judgment; and a film feeding device which feeds the film after said controller judges and said driving device moves said recording/reproducing device, wherein said recording/reproducing device is maintained, during the film feeding of said film feeding device, at a position to which said driving device moves said recording/reproducing device.

61. An information processing apparatus according to claim 60, wherein said controller discriminates whether the film is exposed, and judges to move said recording/reproducing device to the processing position when said controller discriminates that the film is at least partially exposed, and to move said recording/reproducing device to the non-processing position when said controller discriminates that the film is not exposed.

* * * * *